US012486250B2

(12) United States Patent
Pagano et al.

(10) Patent No.: US 12,486,250 B2
(45) Date of Patent: Dec. 2, 2025

(54) MUSCARINIC RECEPTOR 4 ANTAGONISTS AND METHODS OF USE

(71) Applicant: Neurocrine Biosciences, Inc., San Diego, CA (US)

(72) Inventors: Nicholas Pagano, San Diego, CA (US); Nicole Harriott, San Diego, CA (US); Brian M. Cochran, San Diego, CA (US); Scott Stirn, San Diego, CA (US); Christina Marie Costa, San Diego, CA (US)

(73) Assignee: Neurocrine Biosciences, Inc., San Diego, CA (US)

( * ) Notice: Subject to any disclaimer, the term of this patent is extended or adjusted under 35 U.S.C. 154(b) by 784 days.

(21) Appl. No.: 17/756,888

(22) PCT Filed: Dec. 3, 2020

(86) PCT No.: PCT/US2020/063063
§ 371 (c)(1),
(2) Date: Jun. 3, 2022

(87) PCT Pub. No.: WO2021/113478
PCT Pub. Date: Jun. 10, 2021

(65) Prior Publication Data
US 2023/0046329 A1    Feb. 16, 2023

Related U.S. Application Data

(60) Provisional application No. 63/056,090, filed on Jul. 24, 2020, provisional application No. 62/944,647, filed on Dec. 6, 2019.

(51) Int. Cl.
C07D 401/14    (2006.01)

(52) U.S. Cl.
CPC ........ *C07D 401/14* (2013.01); *C07B 2200/13* (2013.01)

(58) Field of Classification Search
None
See application file for complete search history.

(56) References Cited

U.S. PATENT DOCUMENTS

| 5,399,247 A | 3/1995 | Carey et al. |
| 6,410,566 B1 | 6/2002 | Shiota |

(Continued)

FOREIGN PATENT DOCUMENTS

| EP | 0 718 287 | 6/1996 |
| EP | 1 724 262 | 11/2006 |

(Continued)

OTHER PUBLICATIONS

Patani et al., Chemical Reviews 1996 96 (8), 3147-3176 (Year: 1996).*

(Continued)

*Primary Examiner* — Jeffrey S Lundgren
*Assistant Examiner* — Anthony Joseph Seitz
(74) *Attorney, Agent, or Firm* — Fish & Richardson P.C.

(57) ABSTRACT

Provided herein are compounds of the following Formula (I): or a pharmaceutically acceptable salt thereof. Methods for treating a diseases, disorders, or symptom by antagonizing muscarinic receptors, including specifically antagonizing muscarinic receptor 4 (M4), are also provided.

(Continued)

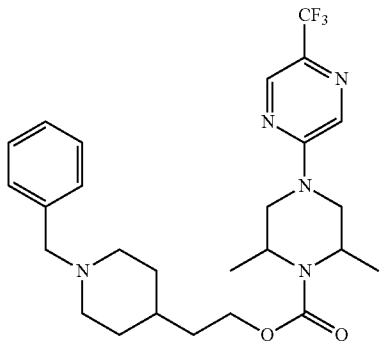

(I)

2 Claims, 12 Drawing Sheets

(56) References Cited

U.S. PATENT DOCUMENTS

| | | | |
|---|---|---|---|
| 6,451,842 B1 | 9/2002 | Shiota | |
| 7,390,830 B1 | 6/2008 | Shiota | |
| 10,239,887 B2 | 3/2019 | Lindsley et al. | |
| 11,033,539 B2* | 6/2021 | Harriott | C07D 401/12 |
| 2007/0249701 A1 | 10/2007 | Shiota | |
| 2010/0292214 A1 | 11/2010 | Deligny | |
| 2015/0266825 A1 | 9/2015 | Hood et al. | |
| 2018/0325887 A1 | 11/2018 | Harriot et al. | |
| 2021/0338653 A1 | 11/2021 | Harriot et al. | |
| 2023/0129359 A1 | 4/2023 | Harriott et al. | |
| 2025/0092022 A1 | 3/2025 | Harriott et al. | |

FOREIGN PATENT DOCUMENTS

| | | |
|---|---|---|
| EP | 3 371 164 | 9/2018 |
| JP | 2006511554 | 4/2006 |
| JP | 2007048370 A | 2/2007 |
| JP | 2007502529 A | 2/2007 |
| JP | 2019-523233 A | 8/2019 |
| WO | WO 1987/005297 | 9/1987 |
| WO | WO 2001/021590 | 3/2001 |
| WO | WO 2003/062234 | 7/2003 |
| WO | WO 2005/011657 | 2/2005 |
| WO | WO 2006/086445 | 8/2006 |
| WO | WO 2007/007282 A2 | 1/2007 |
| WO | WO 2007/075629 | 7/2007 |
| WO | WO 2007/130383 | 11/2007 |
| WO | WO 2008/130570 | 10/2008 |
| WO | WO 2011/059048 | 5/2011 |
| WO | WO 2011/149492 A1 | 12/2011 |
| WO | WO 2012/041158 | 4/2012 |
| WO | WO 2013/076090 | 5/2013 |
| WO | WO 2014/074515 A1 | 5/2014 |
| WO | WO 2014/074517 | 5/2014 |
| WO | WO 2014/079787 | 5/2014 |
| WO | WO 2014/147611 | 9/2014 |
| WO | WO 2014/163161 | 10/2014 |
| WO | WO 2015/036759 | 3/2015 |
| WO | WO 2015/061247 | 4/2015 |
| WO | WO 2015/118342 A1 | 8/2015 |
| WO | WO 2017/021728 A1 | 2/2017 |
| WO | WO 2017/079641 | 5/2017 |
| WO | WO 2017/107089 | 6/2017 |
| WO | WO 2019/060365 | 3/2019 |
| WO | WO 2019/126559 | 6/2019 |
| WO | WO 2019/183636 | 9/2019 |
| WO | WO 2021/113478 | 6/2021 |
| WO | WO 2021/158698 | 8/2021 |
| WO | WO 2021/216949 | 10/2021 |
| WO | WO 2021/216951 | 10/2021 |
| WO | WO 2022/036177 | 2/2022 |
| WO | WO 2022/109099 | 5/2022 |
| WO | WO 2022/140499 | 6/2022 |
| WO | WO 2022/212819 | 10/2022 |
| WO | WO 2022/216655 | 10/2022 |

OTHER PUBLICATIONS

Berge et al., "Pharmaceutical Salts," Journal of Pharmaceutical Sciences, 1977, 66(1):1-9.
Bundgaard, "Design of Prodrugs," Elsevier, 1985, pp. 7-9, 21-24.
Constantino et al., "Modeling of Poly (ADP-ribose)polymerase (PARP) inhibitors. Docking of Ligands and Quantitative Structure—Activity Relationship Analysis," Journal of Medicinal Chemistry, 2001, 44(23):3786-3794.
Croy et al. "Characterization of PCS1055, a novel muscarinic $M_4$receptorantagonist," Manuscript, Eur. J. Pharmacology, 2016, 782:70-76.
Dörwald's Side Reactions in Organic Synthesis—A Guide to Successful Synthesis Design, Wiley-VCH Verlag GmbH & Co. KGaA, 2005, Preface.
Editor's Note Regarding Hoare, et al., "Mechanism of Corticotropin-Releasing Factor Type I Receptor Regulation by Nonpeptide Antagonists," Mol. Pharmacol., 2005, 68(1):260.
Erosa-Rivero et al., "The potency and efficacy of anticholinergics to inhibit haloperidol-induced catalepsy in rats correlates with their rank order of affinities for the muscarinic receptor subtypes," Neuropharmacology, 2014, 81:176-187.
Forest, "Recent advances in the diagnosis and management of congenital adrenal hyperplasia due to 21-hydroxylase deficiency" Human Reproduction Update, 2004, 10(6):469-485.
Higuchi et al., "Prodrugs as Novel Delivery Systems" A.C.S. Symposium Series, vol. 14, 129 pages.
Hoare et al., "Mechanism of Corticotropin-Releasing Factor Type I Receptor Regulation by Nonpeptide Antagonists," Mol. Pharmacol., 2003, 63(3):751-765.
International Preliminary Report on Patentability in International Application No. PCT/US2016/060659, dated May 8, 2018, 8 pages.
International Search Report and Written opinion in International Application No. PCT/US2016/006059, dated Dec. 16, 2016, 15 pages.
Jordan, "Tamoxifen: a most unlikely pioneering medicine," Nature Reviews: Drug Discovery, 2003, 2(3):205-213.
Merke et al., "Future directions in the study and management of congenital adrenal hyperplasia due to 21-hydroxylase deficiency," Ann. Intern. Med., 2002, 136(4):320-334.
Merke et al., "New ideas for medical treatment of congenital hyperplasia," Endocrinology and Metabolism Clinics of North America, 2001, 30(1):121-135.
Moehle et al., "Discovery of first selective M4 muscarinic acetylcholine receptor antagonists with in vivo antiparkinsonian and antidystonic efficacy," ACS Pharmacol. Transl. Sci., 2021, 4:1306-1321 (Abstract Only).
Quik et al., "Potential therapeutic application for nicotinic receptor drugs in movement disorders," Nicotine and Tobacco Research, 2019, 21(3):357-369.
Riffell et al., "Tankyrase-targeted therapeutics: expanding opportunities in PARP family," Nature Reviews Drug Discovery, 2012, 11(12):923-936.
Scarr, "Muscarinic receptors: their roles in disorders of the central nervous system and potential therapeutic targets" CNS Neuroscience & Therapeutics, 2012, 18:369-379.
Singaporean Search report in Singaporean Application No. 11201803757U, dated Jun. 17, 2019, 7 pages.
Spock et al., "Discovery of VU6028418: A highly selective and orally bioavailable M4 muscarinic acetylcholine receptor antagonist," ACS Med. Chem. Letter, 2021, 12:1342-1349.
Vippagunta et al., "Crystalline solids," Advanced Drug Delivery reviews, 2001, 48:3-26.

(56) References Cited

OTHER PUBLICATIONS

Zhu et al., "Synthesis and mode of action of $^{125}$I-and $^{3}$H-labeled thieno [2, 3-c] pyridine antagonists of cell adhesion molecule expression," The Journal of Organic Chemistry, 2002, 67(3):943-948.

Abercrombie et al., "Substantia Nigra D1 Receptors and Stimulation of Striatal Cholinergic Interneurons by Dopamine: A Proposed Circuit Mechanism," J Neuroscience, Nov. 1, 1997, 17(21):8498-8505.

Acquas et al., "Dopamine D1 receptor-mediated control of striatal acetylcholine release by endogenous dopamine," European J Pharmacology, Oct. 27, 1999, 383(2):121-7.

Alcantara et al., "Muscarinic m1 and m2 receptor proteins in local circuit and projection neurons of the primate striatum: anatomical evidence for cholinergic modulation of glutamatergic prefrontostriatal pathways," Journal of Comparative Neurology, Jun. 11, 2001, 434(4):445-60.

Andersson et al., "Motor activity-induced dopamine release in the substantia nigra is regulated by muscarinic receptors," Experimental Neurology, Jan. 1, 2010, 221(1):251-9.

Bell et al., "Synaptic muscarinic response types in hippocampal CA1 interneurons depend on different levels of presynaptic activity and different muscarinic receptor subtypes," Neuropharmacology, Oct. 1, 2013, 73:160-73.

Bender et al., "The muscarinic acetylcholine receptor M5: therapeutic implications and allosteric modulation," ACS Chemical Neuroscience, Oct. 3, 2018, 10(3):1025-34.

Berizzi et al., "Muscarinic M5 receptors modulate ethanol seeking in rats," Neuropsychopharmacology, Feb. 5, 2018, 43(7):1510-7.

Bernard et al., "Phenotypical characterization of the rat striatal neurons expressing muscarinic receptor genes," J Neuroscience, Sep. 1, 1992, 12(9):3591-600.

Bernard et al., "Regulation of the subcellular distribution of m4 muscarinic acetylcholine receptors in striatal neurons in vivo by the cholinergic environment: evidence for regulation of cell surface receptors by endogenous and exogenous stimulation," J Neuroscience, Dec. 1, 1999, 19(23):10237-49.

Bernard et al., "Subcellular redistribution of m2 muscarinic acetylcholine receptors in striatal interneurons in vivo after acute cholinergic stimulation," J Neuroscience, Dec. 1, 1998, 18(23):10207-18.

Billard et al., "Identification of the primary muscarinic autoreceptor subtype in rat striatum as m2 through a correlation of in vivo microdialysis and in vitro receptor binding data," J Pharmacology Experimental Therapeutics, Apr. 1, 1995, 273(1):273-9.

Bonner et al., "Identification of a family of muscarinic acetylcholine receptor genes," Science, Jul. 31, 1987, 237(4814):527-32.

Bonsi et al., "Loss of muscarinic autoreceptor function impairs long-term depression but not long-term potentiation in the striatum," J Neuroscience, Jun. 11, 2008, 28(24):6258-63.

Breakefield et al., "The pathophysiological basis of dystonias," Nature Reviews Neuroscience, Mar. 2008, 9(3):222-34.

Buckley et al., "Localization of a family of muscarinic receptor mRNAs in rat brain," J Neuroscience, Dec. 1, 1988, 8(12):4646-52.

Bymaster et al., "Role of specific muscarinic receptor subtypes in cholinergic parasympathomimetic responses, in vivo phosphoinositide hydrolysis, and pilocarpine-induced seizure activity," European J Neuroscience, Apr. 2003, 17(7):1403-10.

Bymaster et al., "Role of the cholinergic muscarinic system in bipolar disorder and related mechanism of action of antipsychotic agents," Molecular Psychiatry, Jan. 2002, 7(1):S57-63.

Bymaster et al., "Use of M 1-M 5 muscarinic receptor knockout mice as novel tools to delineate the physiological roles of the muscarinic cholinergic system," Neurochemical Research, Apr. 2003, 28(3/4):437-42.

CAS No. 1081119-58-5, "4-Piperidinecarboxamide, N-[2-[1-(phenylmethyl)-4-piperidinyl]ethyl]-1-(1,2,4-triazolo[4,3-b]pyridazin-6-yl)," STN, retrieved on Mar. 27, 2020, dated Dec. 7, 2008, 1 page.

CAS No. 1216662-47-3, "4-Piperidinecarboxamide, 1-[(1-methyl-1H-indol-3-yl)methyl]-N-[2-(4-phenyl-1-piperaxinyl)ethyl]," STN, retrieved on Sep. 23, 2020, dated Apr. 4, 2010, 1 page.

CAS No. 1277586-37-4, "Urea, N-[1-(4-pyridinylmethyl)-4-piperidinyl]-N-[2-(4-(2-pyrimidinyl)-1-piperazinyl)ethyl]," STN, retrieved on Sep. 23, 2020, dated Apr. 10, 2011, 2 pages.

CAS No. 1302253-24-2, Urea, N-[1-[(4-chlorophenyl)methyl]-4-piperidinyl]-N-[2-(4-(3-methylphenyl)-1-piperazinyl)ethyl], STN, retrieved on Sep. 23, 2020, dated May 29, 2011, 1 page.

CAS No. 1322465-14-4, "4-Piperidinecarboxamide, 1-[(2-methyl-4-thiazolyl)methyl]-N-(2-(4-phenyl-1-piperazinyl)ethyl]," STN, retrieved on Sep. 23, 2020, dated Aug. 24, 2011, 2 pages.

CAS No. 1322465-36-0, "4-Piperidinecarboxamide, N-[2-(4-(4-fluorophenyl)-1-piperazinyl)ethyl]-1-[(2-methyl-4-thiazolyl)methyl]," STN, retrieved on Sep. 23, 2020, dated Aug. 24, 2011, 1 page.

CAS No. 1648258-27-8, "4-Piperidinecarboxamide, N-[2-[4-(4-fluorophenyl)-1-piperazinyl]ethyl]-1-[(1-methyl-1H-imidazol-2-yl)methyl]," STN, retrieved on Sep. 23, 2020, dated Feb. 16, 2015, 1 page.

CAS No. 921056-21-5, "4-Piperidinecarboxamide, N-[2-[1-(phenylmethyl)-4-piperidinyl]ethyl]-1-(9H-purin-6-yl)," STN, retrieved on Mar. 27, 2020, dated Feb. 15, 2007, 1 page.

CAS No. 929865-73-6,"4-Piperidinecarboxamide, N-[2-[1-(phenylmethyl)-4-piperidinyl]ethyl]-1-(2-pyrimidinyl)," STN, retrieved on Mar. 27, 2020, dated Apr. 13, 2007, 1 page.

Chapman et al., "The muscarinic M4 receptor is the functionally predominant subtype in rat and mouse striatum as demonstrated using [35S] GTPγS binding.," European J Pharmacology, Feb. 10, 2011, 652(1-3):1-6.

Christopoulos et al., "Pharmacological analysis of the novel mode of interaction between xanomeline and the M1 muscarinic acetylcholine receptor," J Pharmacology Experimental Therapeutics, Jun. 1, 1999, 289(3):1220-8.

Dautan et al., "A major external source of cholinergic innervation of the striatum and nucleus accumbens originates in the brainstem," J Neuroscience, Mar. 26, 2014, 34(13):4509-18.

Dencker et al., "Involvement of a subpopulation of neuronal M4 muscarinic acetylcholine receptors in the antipsychotic-like effects of the M1/M4 preferring muscarinic receptor agonist xanomeline," J Neuroscience, Apr. 20, 2011, 31(16):5905-8.

Dencker et al., "Muscarinic acetylcholine receptor subtypes as potential drug targets for the treatment of schizophrenia, drug abuse, and Parkinson's disease," ACS Chemical Neuroscience, Feb. 15, 2012, 3(2):80-9.

Dewey et al., "Mapping muscarinic receptors in human and baboon brain using [N-11C-methyl]-benztropine," Synapse, 1990, 5(3):213-23.

Dror et al., "Structural basis for modulation of a G-protein-coupled receptor by allosteric drugs," Nature, Nov. 14, 2013, 503(7475):295-9.

Drukarch et al., "Muscarinic receptor activation attenuates D2 dopamine receptor mediated inhibition of acetylcholine release in rat striatum: indications for a common signal transduction pathway," Neuroscience, Jan. 1, 1990, 37(1):1-9.

Erskine et al., "Cholinergic muscarinic M1 and M4 receptors as therapeutic targets for cognitive, behavioural, and psychological symptoms in psychiatric and neurological disorders," Drug Discovery Today, Dec. 1, 2019, 24(12):2307-14.

Fernandez de Sevilla et al., "Selective muscarinic regulation of functional glutamatergic Schaffer collateral synapses in rat CA1 pyramidal neurons," J Physiology, Nov. 2002, 545(1):51-63.

Fink-Jensen et al., "Antipsychotic-induced catalepsy is attenuated in mice lacking the M4 muscarinic acetylcholine receptor," European J Pharmacology, Apr. 10, 2011, 656(1-3):39-44.

Forster et al., "Pedunculopontine tegmental stimulation evokes striatal dopamine efflux by activation of acetylcholine and glutamate receptors in the midbrain and pons of the rat," European J Neuroscience, Feb. 2003, 17(4):751-62.

Foster et al., "Abstract #119.03/A74: M4-muscarinic receptors attenuate dopamine release via production of H2O2 in direct pathway medium spiny neurons," Abstract, Presented at Proceedings of Society for Neuroscience, Chicago, IL, Oct. 18, 2015, 1 page.

(56) References Cited

OTHER PUBLICATIONS

Galvan et al., "GABAergic circuits in the basal ganglia and movement disorders," Progress in Brain Research, Jan. 1, 2007, 160:287-312.
Gantois et al., "Ablation of D1 dopamine receptor-expressing cells generates mice with seizures, dystonia, hyperactivity, and impaired oral behavior," Proceedings National Academy of Sciences, Mar. 6, 2007, 104(10):4182-7.
Gigout et al., "Distinct muscarinic acetylcholine receptor subtypes mediate pre-and postsynaptic effects in rat neocortex," BMC Neuroscience, Dec. 2012, 13:42, 14 pages.
Girasole et al., "Probing striatal microcircuitry to understand the functional role of cholinergic interneurons," Movement Disorders, Sep. 2015, 30(10):1306-18.
Goldberg et al., "Muscarinic modulation of striatal function and circuitry," Muscarinic Receptors, 2012, 2012:223-41.
Gomeza et al., "Enhancement of D1 dopamine receptor-mediated locomotor stimulation in M4 muscarinic acetylcholine receptor knockout mice," Proceedings National Academy of Sciences, Aug. 31, 1999, 96(18):10483-8.
Gould et al., "Cognitive enhancement and antipsychotic-like activity following repeated dosing with the selective M4 PAM VU0467154," Neuropharmacology, Jan. 1, 2018, 128:492-502.
Gunter et al., "Selective inhibition of M5 muscarinic acetylcholine receptors attenuates cocaine self-administration in rats," Addiction Biology, Sep. 2018, 23(5):1106-16.
Haga et al., "Structure of the human M2 muscarinic acetylcholine receptor bound to an antagonist," Nature, Feb. 23, 2012, 482(7386):547-51.
Hamann et al., "Alterations of M1 and M4 acetylcholine receptors in the genetically dystonic (dtsz) hamster and moderate antidystonic efficacy of MI and M4 anticholinergics," Neuroscience, Aug. 15, 2017, 357:84-98.
Hernández-López et al., "D1 receptor activation enhances evoked discharge in neostriatal medium spiny neurons by modulating an L-type Ca2+ conductance," J Neuroscience, May 1, 1997, 17(9):3334-42.
Hersch et al., "Distribution of m1-m4 muscarinic receptor proteins in the rat striatum: light and electron microscopic immunocytochemistry using subtype-specific antibodies," J Neuroscience, May 1, 1994, 14(5):3351-63.
Hersch et al., "Diverse pre-and post-synaptic expression of m1-m4 muscarinic receptor proteins in neurons and afferents in the rat neostriatum," Life Sciences, Feb. 10, 1995, 56(11-12):931-8.
Hörig et al., "From bench to clinic and back: Perspective on the 1st IQPC Translational Research conference," Journal of Translational Medicine, Dec. 2004, 2:1-8.
Hua et al., "A novel muscarinic antagonist R2HBJJ inhibits non-small cell lung cancer cell growth and arrests the cell cycle in G0/G1," PLoS One, Dec. 28, 2012, 7(12):e53170, 11 pages.
Ince et al., "Differential expression of D1 and D2 dopamine and m4 muscarinic acetylcholine receptor proteins in identified striatonigral neurons," Synapse, Dec. 1997, 27(4):357-66.
Izurieta-Sánchez et al., "Muscarinic antagonists in substantia nigra influence the decarboxylation of L-dopa in striatum," European J Pharmacology, Jul. 7, 2000, 399(2-3):151-60.
Jeon et al., "A subpopulation of neuronal M4 muscarinic acetylcholine receptors plays a critical role in modulating dopamine-dependent behaviors," J Neuroscience, Feb. 10, 2010, 30(6):2396-405.
Karasawa et al., "Loss of anti-cataleptic effect of scopolamine in mice lacking muscarinic acetylcholine receptor subtype 4," European J Pharmacology, May 2, 2003, 468(1):15-9.
Kimura et al., "Distinct muscarinic receptor subtypes suppress excitatory and inhibitory synaptic responses in cortical neurons," J Neurophysiology, Feb. 1, 1997, 77(2):709-16.
Kow et al., "Structural biology: Muscarinic receptors become crystal clear," Nature, Feb. 2012, 482(7386):480-1.
Kreitzer, "Physiology and pharmacology of striatal neurons," Annual Review Neuroscience, Jul. 21, 2009, 32(1):127-47.
Kruse et al., "Activation and allosteric modulation of a muscarinic acetylcholine receptor," Nature, Dec. 5, 2013, 504(7478):101-6.
Kruse et al., "Structure and dynamics of the M3 muscarinic acetylcholine receptor," Nature, Feb. 23, 2012, 482(7386):552-6.
Langmead et al., "Muscarinic acetylcholine receptors as CNS drug targets," Pharmacology & Therapeutics, Feb. 1, 2008, 117(2):232-43.
Langmead et al., "Probing the molecular mechanism of interaction between 4-n-butyl-1-[4-(2-methylphenyl)-4-oxo-1-butyl]-piperidine (AC-42) and the muscarinic M1 receptor; direct pharmacological evidence that AC-42 is an allosteric agonist," Molecular pharmacology, Jan. 1, 2006, 69(1):236-46.
Lazareno et al., "Detection, quantitation, and verification of allosteric interactions of agents with labeled and unlabeled ligands at G protein-coupled receptors: interactions of strychnine and acetylcholine at muscarinic receptors," Molecular Pharmacology, Aug. 1, 1995, 48(2):362-78.
Lester et al., "Acetylcholine-dopamine interactions in the pathophysiology and treatment of CNS disorders," CNS Neuroscience & Therapeutics, Jun. 2010, 16(3):137-62.
Levey et al., "Identification and localization of muscarinic acetylcholine receptor proteins in brain with subtype-specific antibodies," J Neuroscience, Oct. 1, 1991, 11(10):3218-26.
Li et al., "Discovery and first-in-human evaluation of M4 PAM PET tracer [11C] MK-6884," J Labelled Compounds & Radiopharmaceuticals, May 1, 2019, 62:S87-8.
Li et al., "Distribution of m2 muscarinic receptors in rat brain using antisera selective for m2 receptors," Molecular Pharmacology, Jul. 1, 1991, 40(1):28-35.
Liste et al., "Acute and chronic acetylcholinesterase inhibition regulates in vivo the localization and abundance of muscarinic receptors m2 and m4 at the cell surface and in the cytoplasm of striatal neurons," Molecular and Cellular Neuroscience, Jun. 1, 2002, 20(2):244-56.
Liu et al., "Muscarinic acetylcholine M4 receptors play a critical role in oxotremorine-induced DARPP-32 phosphorylation at threonine 75 in isolated medium spiny neurons," Neuropharmacology, May 1, 2017, 117:376-86.
Maltese et al., "Anticholinergic drugs rescue synaptic plasticity in DYT1 dystonia: role of M1 muscarinic receptors," Movement disorders, Nov. 2014, 29(13):1655-65.
Mena-Segovia et al., "Cholinergic modulation of midbrain dopaminergic systems," Brain Research Reviews, Aug. 1, 2008, 58(2):265-71.
Moehle et al., "Discovery of the first selective M4 muscarinic acetylcholine receptor antagonists with in vivo antiparkinsonian and antidystonic efficacy," ACS Pharmacology & Translational Science, Aug. 2, 2021, 4(4):1306-21.
Moehle et al., "Roles of the M4 acetylcholine receptor in the basal ganglia and the treatment of movement disorders," Movement Disorders, Aug. 2019, 34(8):1089-99.
Nakamura et al., "Muscarinic M4 receptors regulate GABAergic transmission in rat tuberomammillary nucleus neurons," Neuropharmacology, Nov. 1, 2012, 63(6):936-44.
Oki et al., "Quantitative analysis of binding parameters of [3H] N-methylscopolamine in central nervous system of muscarinic acetylcholine receptor knockout mice," Molecular Brain Research, Jan. 5, 2005, 133(1):6-11.
Olianas et al., "PD 102807, a novel muscarinic M4 receptor antagonist, discriminates between striatal and cortical muscarinic receptors coupled to cyclic AMP," Life Sciences, Oct. 15, 1999, 65(21):2233-40.
Pancani et al., "Abstract #516.04/E3: Characterization of Novel M4 PAM in Huntington's disease mouse model," Abstract, Presented at Proceedings of Society for Neuroscience, San Diego, CA, Nov. 12, 2013, 2 pages.
Pancani et al., "Abstract #795.08/L8: Age dependent changes in M4-mediated control of striatal glutamate and dopamine signaling in the YAC128 mouse model of Huntington's disease," Abstract, Presented at Proceedings of Society for Neuroscience, Washington, D.C., Nov. 19, 2014, 2 pages.
Pancani et al., "M4 mAChR-mediated modulation of glutamatergic transmission at corticostriatal synapses," ACS chemical neuroscience, Apr. 16, 2014, 5(4):318-24.

(56) References Cited

OTHER PUBLICATIONS

Peterson et al., "Convergent evidence for abnormal striatal synaptic plasticity in dystonia," Neurobiology of Disease, Mar. 1, 2010, 37(3):558-73.
Piggott et al., "Comparative distribution of binding of the muscarinic receptor ligands pirenzepine, AF-DX 384,(R, R)-I-QNB and (R, S)-I-QNB to human brain," Journal of Chemical Neuroanatomy, Sep. 1, 2002, 24(3):211-23.
Pisani et al., "Re-emergence of striatal cholinergic interneurons in movement disorders," Trends in Neurosciences, Oct. 1, 2007, 30(10):545-53.
Prudente et al., "Dystonia as a network disorder: what is the role of the cerebellum?," Neuroscience, Feb. 28, 2014, 260:23-35.
Rouse et al., "Differential presynaptic and postsynaptic expression of m1-m4 muscarinic acetylcholine receptors at the perforant pathway/granule cell synapse," Neuroscience, May 21, 1998, 86(1):221-32.
Rouse et al., "Muscarinic receptor subtypes involved in hippocampal circuits," Life Sciences, Jan. 8, 1999, 64(6-7):501-9.
Salovich et al., "Discovery of N-(4-methoxy-7-methylbenzo [d] thiazol-2-yl) isonicatinamide, ML293, as a novel, selective and brain penetrant positive allosteric modulator of the muscarinic 4 (M4) receptor," Bioorganic & Medicinal Chemistry Letters, Aug. 1, 2012, 22(15):5084-8.
Sánchez et al., "M4 muscarinic receptors are involved in modulation of neurotransmission at synapses of Schaffer collaterals on CAI hippocampal neurons in rats," J Neuroscience Research, Feb. 15, 2009, 87(3):691-700.
Santiago et al., "Biotinylated m4-toxin demonstrates more M4 muscarinic receptor protein on direct than indirect striatal projection neurons," Brain Research, Mar. 9, 2001, 894(1):12-20.
Schäfer et al., "Failure is an option: learning from unsuccessful proof-of-concept trials," Drug Discovery Today, Nov. 1, 2008, 13(21-22):913-6.
Sciamanna et al., "Cholinergic dysregulation produced by selective inactivation of the dystonia-associated protein torsinA," Neurobiology of Disease, Sep. 1, 2012, 47(3):416-27.
Shen et al., "Cholinergic modulation of Kir2 channels selectively elevates dendritic excitability in striatopallidal neurons," Nature Neuroscience, Nov. 2007, 10(11):1458-66.
Shin et al., "Muscarinic regulation of dopamine and glutamate transmission in the nucleus accumbens," Proceedings National Academy of Sciences, Jun. 30, 2015, 112(26):8124-9.
Shirey et al., "An allosteric potentiator of M4 mAChR modulates hippocampal synaptic transmission," Nature Chemical Biology, Jan. 2008, 4(1):42-50.
Spalding et al., "Discovery of an Ectopic Activation Site on the M1 Muscarinic Receptor," Molecular Pharmacology, Jun. 1, 2002, 61(6):1297-302.
Spalding et al., "Structural requirements of transmembrane domain 3 for activation by the M1 muscarinic receptor agonists AC-42, AC-260584, clozapine, and N-desmethylclozapine: evidence for three distinct modes of receptor activation," Molecular Pharmacology, Dec. 1, 2006, 70(6):1974-83.
Stahly, "Diversity in single-and multiple-component crystals. The search for and prevalence of polymorphs and cocrystals," Crystal Growth & Design, 2007, 7(6):1007-1026.
Steinfeld et al., "A novel multivalent ligand that bridges the allosteric and orthosteric binding sites of the M2 muscarinic receptor," Molecular Pharmacology, Aug. 1, 2007, 72(2):291-302.
Strang et al., "Muscarinic acetylcholine receptor localization and activation effects on ganglion response properties," Investigative Ophthalmology & Visual Science, May 1, 2010, 51(5):2778-89.
Sumiyoshi et al., "Discovery of novel N-substituted oxindoles as selective m1 and m4 muscarinic acetylcholine receptors partial agonists," ACS Medicinal Chemistry Letters, Feb. 14, 2013, 4(2):244-8.

Surmeier et al., "D1 and D2 dopamine-receptor modulation of striatal glutamatergic signaling in striatal medium spiny neurons," Trends in Neurosciences, May 1, 2007, 30(5):228-35.
Tanabe et al., "Primary dystonia: molecules and mechanisms," Nature Reviews Neurology, Nov. 2009, 5(11):598-609.
Testini et al., "Treatment of tardive dystonia: a review," Dystonia, 2023, 2:10957, 13 pages.
Thomsen et al., "Modulation of prepulse inhibition through both M 1 and M 4 muscarinic receptors in mice," Psychopharmacology, Feb. 2010, 208:401-16.
Tsolias et al., "Muscarinic acetylcholine receptor localization on distinct excitatory and inhibitory neurons within the ACC and LPFC of the rhesus monkey," Frontiers in Neural Circuits, Jan. 11, 2022, 15:795325.
Tzavara et al., "M4 muscarinic receptors regulate the dynamics of cholinergic and dopaminergic neurotransmission: relevance to the pathophysiology and treatment of related central nervous system pathologies," The FASEB Journal, Sep. 2004, 18(12):1410-2.
Valant et al., "A Novel Mechanism of G Protein-coupled Receptor Functional Selectivity: Muscarinic Partial Agonist Mcn-A-343 as a Bitopic Orthosteric/Allosteric Ligand," J Biological Chemistry, Oct. 24, 2008, 283(43):29312-21.
Vilaro et al., "Muscarinic M2 receptor mRNA expression and receptor binding in cholinergic and non-cholinergic cells in the rat brain: a correlative study using in situ hybridization histochemistry and receptor autoradiography," Neuroscience, Mar. 1, 1992, 47(2):367-93.
Volpicelli et al., "Muscarinic acetylcholine receptor subtypes in cerebral cortex and hippocampus," Progress in Brain Research, Jan. 1, 2004, 145:59-66.
Volpicelli-Daley et al., "Altered striatal function and muscarinic cholinergic receptors in acetylcholinesterase knockout mice," Molecular Pharmacology, Dec. 1, 2003, 64(6):1309-16.
Weiner et al., "Expression of muscarinic acetylcholine and dopamine receptor mRNAs in rat basal ganglia," Proceedings of the National Academy of Sciences, Sep. 1990, 87(18):7050-4.
Wess et al., "M1-M5 muscarinic receptor knockout mice as novel tools to study the physiological roles of the muscarinic cholinergic system," Receptors and Channels, Jan. 1, 2003, 9(4):279-90.
Wess et al., "Muscarinic acetylcholine receptors: mutant mice provide new insights for drug development," Nature Reviews Drug Discovery, Sep. 2007, 6(9):721-33.
Wirtshafter et al., "The distribution of m4 muscarinic acetylcholine receptors in the islands of Calleja and striatum of rats and cynomolgus monkeys," Journal Chemical Neuroanatomy, Nov. 1, 2004, 28(3):107-16.
Wonnacott, "Presynaptic nicotinic ACh receptors," Trends in Neurosciences, Feb. 1, 1997, 20(2):92-8.
Woolley et al., "Attenuation of amphetamine-induced activity by the non-selective muscarinic receptor agonist, xanomeline, is absent in muscarinic M4 receptor knockout mice and attenuated in muscarinic M1 receptor knockout mice," European J Pharmacology, Jan. 28, 2009, 603(1-3):147-9.
Yajeya et al., "Muscarinic agonist carbachol depresses excitatory synaptic transmission in the rat basolateral amygdala in vitro," Synapse, Nov. 2000, 38(2):151-60.
Zhang et al., "Characterization of central inhibitory muscarinic autoreceptors by the use of muscarinic acetylcholine receptor knockout mice," J Neuroscience, Mar. 1, 2002, 22(5):1709-17.
Zhang et al., "Control of glycinergic input to spinal dorsal horn neurons by distinct muscarinic receptor subtypes revealed using knockout mice," J Pharmacology Experimental Therapeutics, Dec. 1, 2007, 323(3):963-71.
Zhang et al., "Regulation of striatal dopamine release by presynaptic auto-and heteroreceptors," Basal Ganglia, Mar. 1, 2012, 2(1):5-13.
Zhou et al., "Endogenous nicotinic cholinergic activity regulates dopamine release in the striatum," Nature Neuroscience, Dec. 1, 2001, 4(12):1224-9.

\* cited by examiner

MUSCARINIC RECEPTOR 4 ANTAGONISTS AND METHODS OF USE

TECHNICAL FIELD

This disclosure relates generally to muscarinic receptor 4 (M4) antagonist compounds, compositions and methods related thereto.

BACKGROUND

Muscarinic acetylcholine receptors are autonomic receptors that form G protein-receptor complexes in the cell membranes of certain neurons and other cell types (e.g., endothelial cells of blood vessels). Muscarinic receptors are located postsynaptically at the parasympathetic neuroeffector junction, from where the receptors function to increase or decrease the activity of the effector cells. Extrapyramidal symptoms are observed in patients treated with antipsychotic therapeutics and in patients who have neuroleptic malignant syndrome, brain damage (e.g., athetotic cerebral palsy), encephalitis, and meningitis. Drugs other than antipsychotics also cause extrapyramidal symptoms, for example antidopaminergic drugs (e.g., the antiemetic metoclopramide and the antidepressant amoxapine) and selective serotonin reuptake inhibitors (SSR*), which indirectly decrease dopamine. Conditions associated with extrapyramidal symptoms include acute dystonic reactions, akathisia, pseudoparkinsonism, and tardive dyskinesia. Extrapyramidal symptoms caused by antipsychotic therapeutics are being treated with anticholinergic drugs that lack selectivity for any of the five muscarinic receptor subtypes (see, e.g., Erosa-Rivero et al., *Neuropharmacology* 81:176-87 (2014)). Classical muscarinic receptor antagonists (e.g., atropine and scopolamine) and 3-quinuclidinyl benzilate (QNB) lack selectivity for human muscarinic acetylcholine receptors subtypes (i.e., M1, M2, M3, M4 and M5) (see, e.g., Bolden et al., *J Pharmacol Exp Ther.* 260(2):576-580 (1992)). Because anticholinergic drugs that effect multiple muscarinic receptors may cause distinct and in certain instances opposing effects, therapeutics that exhibit selectivity for particular receptors are desired. For example, M4 antagonists inhibit striatal acetylcholine release and M2 antagonists increase striatal acetylcholine release (see, e.g., Quik et al., *Nicotine & Tobacco Research* 21(3):357-369 (2019)). In addition, the muscarinic receptor pan antagonist trihexyphenidyl (M1 (Ki=1 nM), M2 (Ki=20 nM), M3 (Ki=10 nM), M4 (Ki=10 nM) and M5 (Ki=30 nM)) is thought to have use-limiting side effects such as cognitive impairment, tachycardia and gastrointestinal tract function associated with antagonism of M1, M2, and M3.

Compounds that antagonize muscarinic acetylcholine receptors subtype 4 (M4) have been disclosed in WO2017/079641. Some compounds show selectivity for M4 over other muscarinic acetylcholine receptors subtypes (e.g., M1, M2, M3, and M5). Despite the advances that have been made in this field, a need remains in the art for compounds with improved M4 selectivity and/or drug-like properties, and compositions and methods related thereto. The present disclosure fulfills these and other needs, as evident in reference to the following disclosure.

SUMMARY

Some embodiments provide a compound of Formula (I):

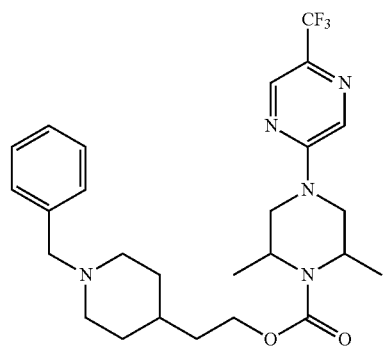

(I)

or a pharmaceutically acceptable salt thereof.

Some embodiments provide pharmaceutical compositions comprising a compound of Formula (I), or a pharmaceutically acceptable salt thereof, including one or more of the specific compounds described herein, or a pharmaceutically acceptable salt, or a polymorph thereof, and at least one pharmaceutically acceptable excipient.

Some embodiments provide a method of antagonizing an activity of a muscarinic receptor (e.g., muscarinic receptor 4) comprising contacting the receptor with a compound provided herein, or a pharmaceutically acceptable salt thereof.

Some embodiments provide a method for treating or preventing a neurological disease, disorder, or symptom comprising administering a compound or a pharmaceutical composition described herein to a subject in need thereof. In some further embodiments, the neurological disease, disorder, or symptom is selected from Tourette's syndrome (TS), Alzheimer's Disease (AD), schizophrenia, Lewy Body Dementia (LBD), cognitive deficits associated with schizophrenia, Parkinson's Disease, parkinsonism, tremor, dyskinesias, excessive daytime sleepiness, dystonia, chorea, levodopa induced dyskinesia, attention deficit hyperactivity disorder (ADHD), cerebral palsy, progressive supranuclear palsy (PSP), Multiple System Atrophy (MSA), Huntington's disease (HD), and chorea associate with Huntington's disease.

Some embodiments provide a method of treating a disease or disorder associated with abnormal expression or activity of a muscarinic receptor, such as (e.g., muscarinic receptor 4 (M4) in a patient, comprising administering to the patient a therapeutically effective amount of a compound provided herein, or a polymorph thereof, or a pharmaceutically acceptable salt thereof.

Some embodiments provide a crystalline form of 2-(1-benzylpiperidin-4-yl)ethyl (2R,6S)-2,6-dimethyl-4-[5-(trifluoromethyl)pyrazin-2-yl]piperazine-1-carboxylate (Compound 1), represented by the Formula (Ia):

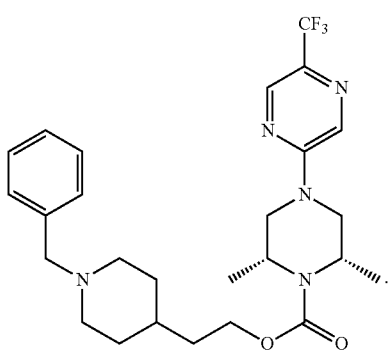

In some embodiments, the crystalline form of Compound 1 is Form I. In some embodiments, the From I of 2-(1-benzylpiperidin-4-yl)ethyl (2R,6S)-2,6-dimethyl-4-[5-(trifluoromethyl)pyrazin-2-yl]piperazine-1-carboxylate has one or more characteristic Powder X-Ray Diffraction (PXRD) diffraction peaks at two-theta angles selected from 6.3±0.2, 17.2±0.2, 18.0±0.2, 18.5±0.2, and 23.4±0.2. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has a Differential Scanning Calorimetry (DSC) thermogram comprising a peak with an onset temperature of 91.6±3° C. and a peak with an onset temperature of 116.0±3° C.

In some embodiments, the crystalline form of Compound 1 is Form II. In some embodiments, the From II of 2-(1-benzylpiperidin-4-yl)ethyl (2R,6S)-2,6-dimethyl-4-[5-(trifluoromethyl)pyrazin-2-yl]piperazine-1-carboxylate has one or more characteristic PXRD diffraction peaks at two-theta angles selected from 10.8±0.2, 16.0±0.2, 20.8±0.2, 21.7±0.2, and 25.1±0.2. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 115.1±3° C. and substantially free of a peak with an onset temperature of 91.6±3° C.

DETAILED DESCRIPTION

Compounds

Figure 1:
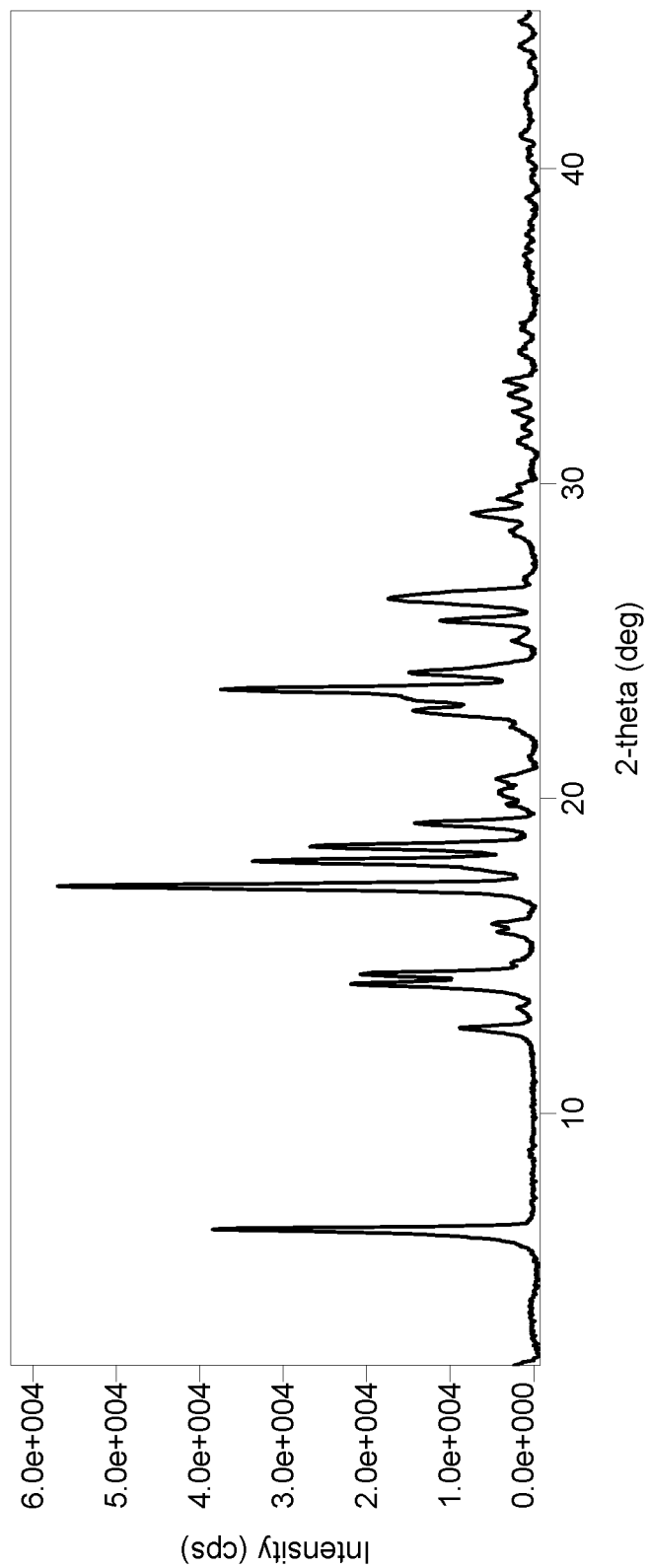
FIG. 1 depicts an exemplary Powder X-Ray Diffraction (PXRD) diffractogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) free base in crystalline Form I.

Some embodiments provide a compound of Formula (I):

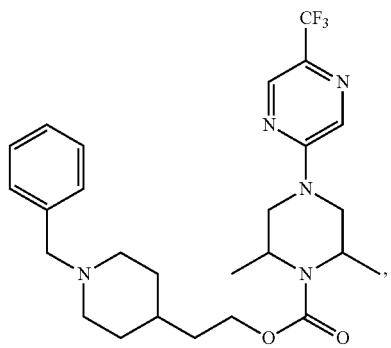

or a pharmaceutically acceptable salt thereof.

Some embodiments provide Compound 1, having a structure of the following Formula (Ia):

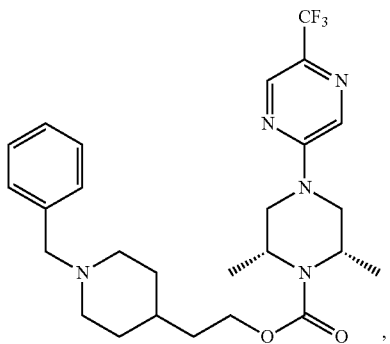

(Ia)

or a pharmaceutically acceptable salt thereof.

Some embodiments provide Compound 2, having a structure of the following Formula (Ib):

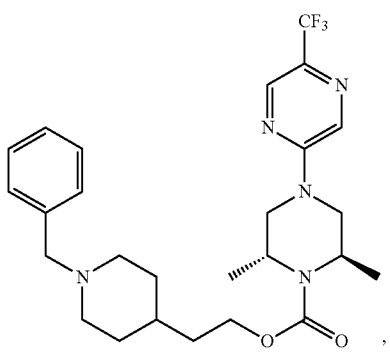

(Ib)

or a pharmaceutically acceptable salt thereof.

Some embodiments provide a pharmaceutically acceptable salt of 2-(1-benzylpiperidin-4-yl)ethyl (2R,6S)-2,6-dimethyl-4-[5-(trifluoromethyl)pyrazin-2-yl]piperazine-1-carboxylate (Compound 1, represented by Formula (Ia)). In some embodiments, the pharmaceutically acceptable salt is an acid addition salt. In some embodiments, the acid is selected from hydrochloric, hydrobromic, sulfuric, nitric, phosphoric, sulfamic, acetic, trifluoroacetic, trichloroacetic, propionic, hexanoic, cyclopentylpropionic, glycolic, glutaric, pyruvic, lactic, malonic, succinic, sorbic, ascorbic, malic, maleic, fumaric, tartaric, citric, benzoic, 3-(4-hydroxybenzoyl)benzoic, picric, cinnamic, mandelic, phthalic, lauric, methanesulfonic, ethanesulfonic, 1,2-ethane-disulfonic, 2-hydroxyethanesulfonic, benzenesulfonic, 4-chlorobenzenesulfonic, 2-naphthalenesulfonic, 4-toluenesulfonic, camphoric, camphorsulfonic, 4-methylbicyclo[2.2.2]-oct-2-ene-1-carboxylic, glucoheptonic, 3-phenylpropionic, trimethylacetic, tert-butylacetic, lauryl sulfuric, gluconic, oxalic, benzoic, glutamic, hydroxynaphthoic, salicylic, stearic, cyclohexylsulfamic, quinic, and muconic acid. In a further embodiment, the acid is hydrochloric acid. In another further embodiment, the acid is oxalic acid.

Some embodiments provide a pharmaceutically acceptable salt of 2-(1-benzylpiperidin-4-yl)ethyl (2R,6R)-2,6-dimethyl-4-[5-(trifluoromethyl)pyrazin-2-yl]piperazine-1-carboxylate (Compound 2, represented by Formula (Ib)). In some embodiments, the pharmaceutically acceptable salt is an acid addition salt. In some embodiments, the acid is selected from hydrochloric, hydrobromic, sulfuric, nitric, phosphoric, sulfamic, acetic, trifluoroacetic, trichloroacetic, propionic, hexanoic, cyclopentylpropionic, glycolic, glutaric, pyruvic, lactic, malonic, succinic, sorbic, ascorbic, malic, maleic, fumaric, tartaric, citric, benzoic, 3-(4-hydroxybenzoyl)benzoic, picric, cinnamic, mandelic, phthalic, lauric, methanesulfonic, ethanesulfonic, 1,2-ethane-disulfonic, 2-hydroxyethanesulfonic, benzenesulfonic, 4-chlorobenzenesulfonic, 2-naphthalenesulfonic, 4-toluenesulfonic, camphoric, camphorsulfonic, 4-methylbicyclo[2.2.2]-oct-2-ene-1-carboxylic, glucoheptonic, 3-phenylpropionic, trimethylacetic, tert-butylacetic, lauryl sulfuric, gluconic, oxalic, benzoic, glutamic, hydroxynaphthoic, salicylic, stearic, cyclohexylsulfamic, quinic, and muconic acid. In a further embodiment, the acid is hydrochloric acid. In another further embodiment, the acid is oxalic acid.

As used herein, Compound 1, represented by Formula (Ia), is referred to as 2-(1-benzylpiperidin-4-yl)ethyl (2R,6S)-2,6-dimethyl-4-[5-(trifluoromethyl)pyrazin-2-yl]piperazine-1-carboxylate. Alternatively, Compound 1 is also referred to as 2-(1-benzylpiperidin-4-yl)ethyl (2S,6R)-2,6-dimethyl-4-[5-(trifluoromethyl)pyrazin-2-yl]piperazine-1-carboxylate or 2-(1-benzylpiperidin-4-yl)ethyl cis-2,6-dimethyl-4-[5-(trifluoromethyl)pyrazin-2-yl]piperazine-1-carboxylate.

The compounds described herein can be asymmetric (e.g., having one or more stereocenters) or racemic. All stereoisomers, such as enantiomers and diastereomers, are intended unless otherwise indicated. It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure, enantiomerically enriched, a racemic mixture, diastereomerically pure, diastereomerically enriched, or a stereoisomeric mixture. Preparation of enantiomerically pure or enantiomerically enriched forms may be accomplished by resolution of racemic mixtures or by using enantiomerically pure or enriched starting materials or by stereoselective or stereospecific synthesis. Stereochemical definitions are available in E. L. Eliel, S. H. Wilen & L. N. Mander "Stereochemistry of Organic Compounds" John Wiley & Sons, Inc., New York, NY, 1994 which is incorporated herein by reference in its entirety. In some embodiments, where the compound of the invention is chiral or otherwise includes one or more stereocenters, the compound can be prepared with an enantiomeric excess or diastereomeric excess of greater than about 75%, greater than about 80%, greater than about 85%, greater than about 90%, greater than about 95%, or greater than about 99%.

Resolution of racemic mixtures of compounds can be carried out by any of numerous methods known in the art. An example method includes fractional recrystallization using a chiral resolving acid which is an optically active, salt-forming organic acid. Suitable resolving agents for fractional recrystallization methods are, for example, optically active acids, such as the D and L forms of tartaric acid, diacetyltartaric acid, dibenzoyltartaric acid, mandelic acid, malic acid, lactic acid or the various optically active camphorsulfonic acids. Other resolving agents suitable for fractional crystallization methods include stereoisomerically pure forms of methylbenzylamine (e.g., S and R forms, or diastereomerically pure forms), 2-phenylglycinol, norephedrine, ephedrine, N-methylephedrine, cyclohexylethylamine, 1,2-diaminocyclohexane, and the like.

Resolution of racemic mixtures can also be carried out by elution on a column packed with an optically active resolving agent (e.g., dinitrobenzoylphenylglycine). Suitable elution solvent composition can be determined by one skilled in the art.

In some embodiments, a compound of the invention can be prepared having at least about 5%, at least about 10%, at least about 20%, at least about 30%, at least about 40%, at least about 50%, at least about 60%, at least about 70%, at least about 80%, at least about 90%, at least about 95%, at least about 99%, or at least about 99.9% enantiomeric excess, or an enantiomeric excess within a range defined by any of the preceding numbers.

The compounds described herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone-enol pairs, amide-imidic acid pairs, lactam-lactim pairs, enamine-imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

Solvate Forms

The compounds described herein and their pharmaceutically acceptable salts thereof may be found together with other substances, such as water and solvents, for example, in the form of hydrates or solvates. When in the solid state, the compounds described herein and salts thereof may occur in various forms and may, e.g., take the form of solvates, including hydrates.

As used herein, the term "solvate" refers to a solid form of a compound of the present invention (or a pharmaceutically acceptable salt thereof), which includes one or more molecules of a solvent in stoichiometric or non-stoichiometric amount. Wherein the solvent is water, the solvate is a hydrate. Alternatively, the solvent may be an organic solvent. The organic solvent includes, but is not limited to, methanol, ethanol, 1-propanol, 2-propanol, t-butanol, acetone, ethyl methyl ketone, 4-methyl-2-pentanone, cyclohexanone, acetonitrile, N,N-dimethylformamide, dimethylsulfoxide and ethyl acetate.

Processes for preparing a solvate of a compound of the present invention (or a pharmaceutically acceptable salt thereof) may include: (a) reaction of a compound of the present invention (or a pharmaceutically acceptable salt thereof) with a solvent; (b) precipitation of a complex from a solution of a compound of the present invention (or a pharmaceutically acceptable salt thereof) and a solvent; and (c) crystallization of a complex from a solution of a compound of the present invention (or a pharmaceutically acceptable salt thereof) and a solvent. The solvate may be in a crystalline form. Alternatively, the solvate may be in an amorphous form.

Polymorph Forms

The compounds described herein and their pharmaceutically acceptable salt thereof may be in any solid-state form, such as a crystalline form, amorphous form, etc. So unless clearly indicated otherwise, reference in the specification to compounds and salts thereof should be understood as reading on any solid-state form of the compound and their pharmaceutically acceptable salts. Crystalline forms of the compounds described herein and their pharmaceutically acceptable salts thereof may be characterized by techniques well known in the art, for example, Powder X-Ray Diffraction (PXRD), Differential Scanning Calorimetry (DSC) and Thermal Gravimetric Analysis (TGA).

As used herein to describe a peak in a DSC thermogram, the term "onset temperature" refers to the temperature at which the tangent of the peak intersects with the extrapolated baseline.

Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1)

In some embodiments, provided herein is a crystalline form of 2-(1-benzylpiperidin-4-yl)ethyl (2R,6S)-2,6-dimethyl-4-[5-(trifluoromethyl)pyrazin-2-yl]piperazine-1-carboxylate (Compound 1), represented by the Formula (Ia):

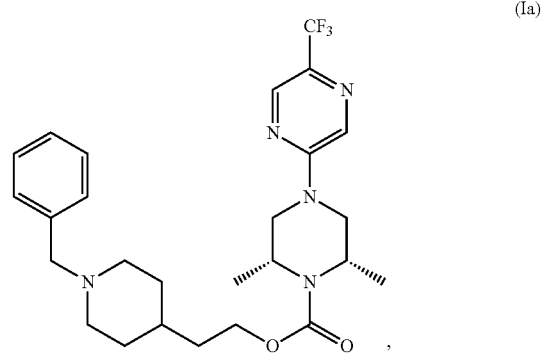 [SMILES: C[C@@H]1CN(c2cnc(C(F)(F)F)cn2)C[C@H](C)N1C(=O)OCCC1CCN(Cc2ccccc2)CC1]

(Ia)

wherein the crystalline form is Form I.

The crystalline Form I of 2-(1-benzylpiperidin-4-yl)ethyl (2R,6S)-2,6-dimethyl-4-[5-(trifluoromethyl)pyrazin-2-yl]piperazine-1-carboxylate has an X-ray diffraction pattern. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristic PXRD diffraction peaks at two-theta angles selected from 6.3±0.2, 17.2±0.2, 18.0±0.2, 18.5±0.2, and 23.4±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has characteristic PXRD diffraction peaks at two-theta angles of 6.3±0.2, 17.2±0.2, 18.0±0.2, 18.5±0.2, and 23.4±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has four characteristic PXRD diffraction peaks at two-theta angles selected from 6.3±0.2, 17.2±0.2, 18.0±0.2, 18.5±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has characteristic PXRD diffraction peaks at two-theta angle of 17.2±0.2, 18.0±0.2, 18.5±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has characteristic PXRD diffraction peaks at two-theta angle of 6.3±0.2, 18.0±0.2, 18.5±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has characteristic PXRD diffraction peaks at two-theta angle of 6.3±0.2, 17.2±0.2, 18.5±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has characteristic PXRD diffraction peaks at two-theta angle of 6.3±0.2, 17.2±0.2, 18.0±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has characteristic PXRD diffraction peaks at two-theta angle of 6.3±0.2, 17.2±0.2, 18.0±0.2, and 18.5±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle selected from 6.3±0.2, 17.2±0.2, 18.0±0.2, 18.5±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 6.3±0.2 and 17.2±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 6.3±0.2 and 18.0±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peak at two-theta angles of 6.3±0.2 and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 6.3±0.2 and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 17.2±0.2 and 18.0±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 17.2±0.2 and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peak at two-theta angles of 17.2±0.2 and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 18.0±0.2 and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 18.0±0.2 and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has two characteristic PXRD diffraction peaks at two-theta angle of 18.5±0.2 and 23.4±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 6.3±0.2, 17.2±0.2, and 18.0±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 6.3±0.2, 17.2±0.2, and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 6.3±0.2, 17.2±0.2 and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 17.2±0.2, 18.0±0.2, and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 17.2±0.2, 18.5±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 17.2±0.2, 18.0±0.2, and 23.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 18.0±0.2, 18.5±0.2, and 23.4±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has a PXRD diffractogram as shown in FIG. 1. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate has a PXRD diffractogram substantially similar as shown in FIG. 1. As used herein, the term "substantially similar" means that the numeric values of the two-theta angles may vary up to ±0.2 although the absolute and/or relative intensity of each peak may vary substantially.

Figure 2:
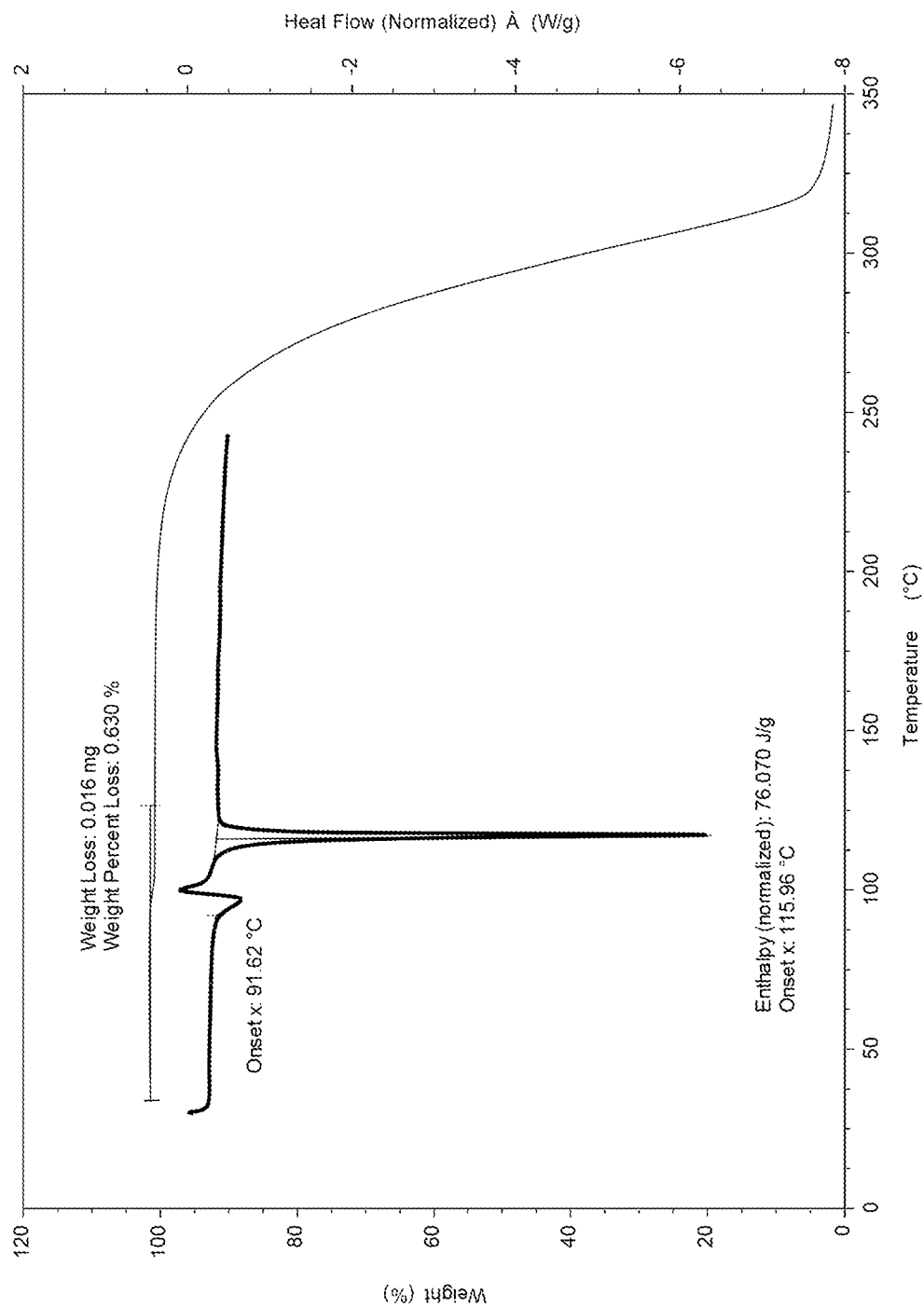
FIG. 2 depicts exemplary Thermogravimetric Analysis (TGA) thermogram and Differential Scanning Calorimetry (DSC) thermogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) free base in crystalline Form I.

The crystalline Form I of 2-(1-benzylpiperidin-4-yl)ethyl (2R,6S)-2,6-dimethyl-4-[5-(trifluoromethyl)pyrazin-2-yl]piperazine-1-carboxylate may have a differential scanning calorimetric (DSC) thermogram. In some embodiments, the crystalline Form I has a DSC thermogram as shown in FIG. 2. In some embodiments, the crystalline Form I has a DSC thermogram substantially similar as shown in FIG. 2. As used herein, the term "substantial similar" means that the onset temperature in a DSC thermogram may vary up to ±3° C. and the enthalpy may vary up to ±2 J/g.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 91.6±3° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 91.6±2° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 91.6±1° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 116.0±3° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 116.0±2° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 116.0±1° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising two peaks, one with an onset temperature of 91.6±3° C. and another with an onset temperature of 116.0±3° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising two peaks, one with an onset temperature of 91.6±2° C. and another with an onset temperature of 116.0±2° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising two peaks, one with an onset temperature of 91.6±1° C. and another with an onset temperature of 116.0±1° C.

In some embodiments, the crystalline Form I has a TGA thermogram with a weight loss of less than 2%, less than 1.5%, less than 1% or less than 0.8% up to about 115° C. In some embodiments, the crystalline Form I has a TGA thermogram with a weight loss of less than 2%, less than 1.5%, less than 1% or less than 0.8% up to about 120° C. according. In some embodiments, the crystalline Form I has a TGA thermogram with a weight loss of less than 2%, less than 1.5%, less than 1% or less than 0.8% up to about 125° C. In some embodiments, the crystalline Form I has a TGA thermogram with a weight loss of less than 2%, less than 1.5%, less than 1% or less than 0.8% up to about 130° C. In some embodiments, the crystalline Form I has a TGA thermogram with a weight loss of less than 1% up to about 120° C. In some embodiments, the crystalline Form I has a TGA thermogram with a weight loss of less than 1% up to about 130° C.

In some embodiments, the crystalline Form I has a TGA thermogram as shown in FIG. 2. In some embodiments, the crystalline Form I has a TGA thermogram substantially similar as shown in FIG. 2. As used herein, the term "substantial similar" means that the weight %-temperature curve in a TGA thermogram may vary up to ±10%.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
  a PXRD diffractogram with one or more peaks at two-theta angle selected from 6.3±0.2, 17.2±0.2, 18.0±0.2, 18.5±0.2, and 23.4±0.2 degrees;
  a DSC thermogram comprising two peaks, one with an onset temperature of 91.6±3° C. and another with an onset temperature of 116.0±3° C.; and
  a TGA thermogram with a weight loss of less than 1% up to about 120° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
  a PXRD diffractogram with two or more peaks at two-theta angle selected from 6.3±0.2, 17.2±0.2, 18.0±0.2, 18.5±0.2 and 23.4±0.2 degrees;
  a DSC thermogram comprising two peaks, one with an onset temperature of 91.6±3° C. and another with an onset temperature of 116.0±3° C.; and
  a TGA thermogram with a weight loss of less than 1% up to about 120° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
  a PXRD diffractogram with three or more peaks at two-theta angle selected from 6.3±0.2, 17.2±0.2, 18.0±0.2, 18.5±0.2 and 23.4±0.2 degrees;
  a DSC thermogram comprising two peaks, one with an onset temperature of 91.6±3° C. and another with an onset temperature of 116.0±3° C.; and
  a TGA thermogram with a weight loss of less than 1% up to about 120° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
  a PXRD diffractogram with four or more peaks at two-theta angle selected from 6.3±0.2, 17.2±0.2, 18.0±0.2, 18.5±0.2 and 23.4±0.2 degrees;
  a DSC thermogram comprising two peaks, one with an onset temperature of 91.6±3° C. and another with an onset temperature of 116.0±3° C.; and
  a TGA thermogram with a weight loss of less than 1% up to about 120° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
  a PXRD diffractogram with peaks at two-theta angle of 6.3±0.2, 17.2±0.2, 18.0±0.2, 18.5±0.2 and 23.4±0.2 degrees;
  a DSC thermogram comprising two peaks, one with an onset temperature of 91.6±3° C. and another with an onset temperature of 116.0±3° C.; and
  a TGA thermogram with a weight loss of less than 1% up to about 120° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
  a PXRD diffractogram with one or more peaks at two-theta angle selected from 6.3±0.2, 17.2±0.2, 18.0±0.2, 18.5±0.2 and 23.4±0.2 degrees;
  a DSC thermogram comprising two peaks, one with an onset temperature of 91.6±3° C. and another with an onset temperature of 116.0±3° C.; and
  a TGA thermogram with a weight loss of less than 1% up to about 130° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
  a PXRD diffractogram with one or more peaks at two-theta angle selected from 6.3±0.2, 17.2±0.2, 18.0±0.2, 18.5±0.2 and 23.4±0.2 degrees;
  a DSC thermogram comprising two peaks, one with an onset temperature of 91.6±3° C. and another one with an onset temperature of 116.0±3° C.; and
  a TGA thermogram substantially similar as shown in FIG. 2.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:

a PXRD diffractogram as shown in FIG. 1;
a DSC thermogram as shown in FIG. 2; and
a TGA thermogram as shown in FIG. 2.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:
a PXRD diffractogram substantially similar as shown in FIG. 1;
a DSC thermogram substantially similar as shown in FIG. 2; and
a TGA thermogram substantially similar as shown in FIG. 2.

Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1)

In some embodiments, provided herein is a crystalline form of 2-(1-benzylpiperidin-4-yl)ethyl (2R,6S)-2,6-dimethyl-4-[5-(trifluoromethyl)pyrazin-2-yl]piperazine-1-carboxylate (Compound 1), represented by the Formula (Ia):

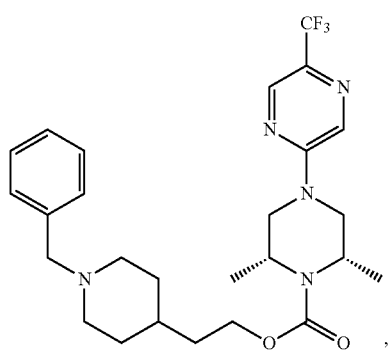

(Ia)

wherein the crystalline form is Form II.

The crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) have an X-ray diffraction pattern. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristic PXRD diffraction peaks at two-theta angle selected from 10.8±0.2, 16.0±0.2, 20.8±0.2, 21.7±0.2, and 25.1±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has characteristic PXRD diffraction peaks at two-theta angle of 10.8±0.2, 16.0±0.2, 20.8±0.2, 21.7±0.2, and 25.1±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has four characteristic PXRD diffraction peaks at two-theta angle selected from 10.8±0.2, 16.0±0.2, 20.8±0.2, 21.7±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has four characteristic PXRD diffraction peaks at two-theta angle of 10.8±0.2, 16.0±0.2, 20.8±0.2, and 21.7±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has four characteristic PXRD diffraction peaks at two-theta angle of 10.8±0.2, 16.0±0.2, 20.8±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has four characteristic PXRD diffraction peaks at two-theta angle of 10.8±0.2, 16.0±0.2, 21.7±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has four characteristic PXRD diffraction peaks at two-theta angle of 10.8±0.2, 20.8±0.2, 21.7±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has four characteristic PXRD diffraction peaks at two-theta angle of 16.0±0.2, 20.8±0.2, 21.7±0.2, and 25.1±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle selected from 10.8±0.2, 16.0±0.2, 20.8±0.2, 21.7±0.2 and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 16.0±0.2 and 20.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 16.0±0.2 and 21.7±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 16.0±0.2 and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 10.8±0.2 and 16.0±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 10.8±0.2 and 20.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 10.8±0.2 and 21.7±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 10.8±0.2 and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 20.8±0.2 and 21.7±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 20.8±0.2 and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has two characteristic PXRD diffraction peaks at two-theta angle of 21.7±0.2 and 25.1±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has three characteristic PXRD diffraction peaks at two-theta angle selected from 10.8±0.2, 16.0±0.2, 20.8±0.2, 21.7±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2yl]piperazine-1-carboxylate has three characteristic PXRD diffraction peaks at two-theta angle of 10.8±0.2, 16.0±0.2, and 20.8±0.2 degrees. In some embodiments, the Form II of 2-(1-benzylpiperidin-4-yl) ethyl (2R,6S)-2,6-dimethyl-4-[5-(trifluoromethyl)pyrazin-2-yl]piperazine-1-carboxylate has three characteristic PXRD diffraction peaks at two-theta angle of 10.8±0.2, 16.0±0.2, and 21.7±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has three characteristic PXRD diffraction peaks at two-theta angle of 10.8±0.2, 16.0±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 16.0±0.2, 20.8±0.2, and 21.7±0.2 degrees. In some embodiments, the Form II of 2-(1-benzylpiperidin-4-yl) ethyl (2R,6S)-2,6-dimethyl-4-[5-(trifluoromethyl)pyrazin-2-yl]piperazine-1-carboxylate has three characteristic PXRD diffraction peaks at two-theta angle of 16.0±0.2, 20.8±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 16.0±0.2, 21.7±0.2, and 25.1±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate has three characteristic PXRD diffraction peaks at two-theta angle of 20.8±0.2, 21.7±0.2, and 25.1±0.2 degrees.

Figure 3:
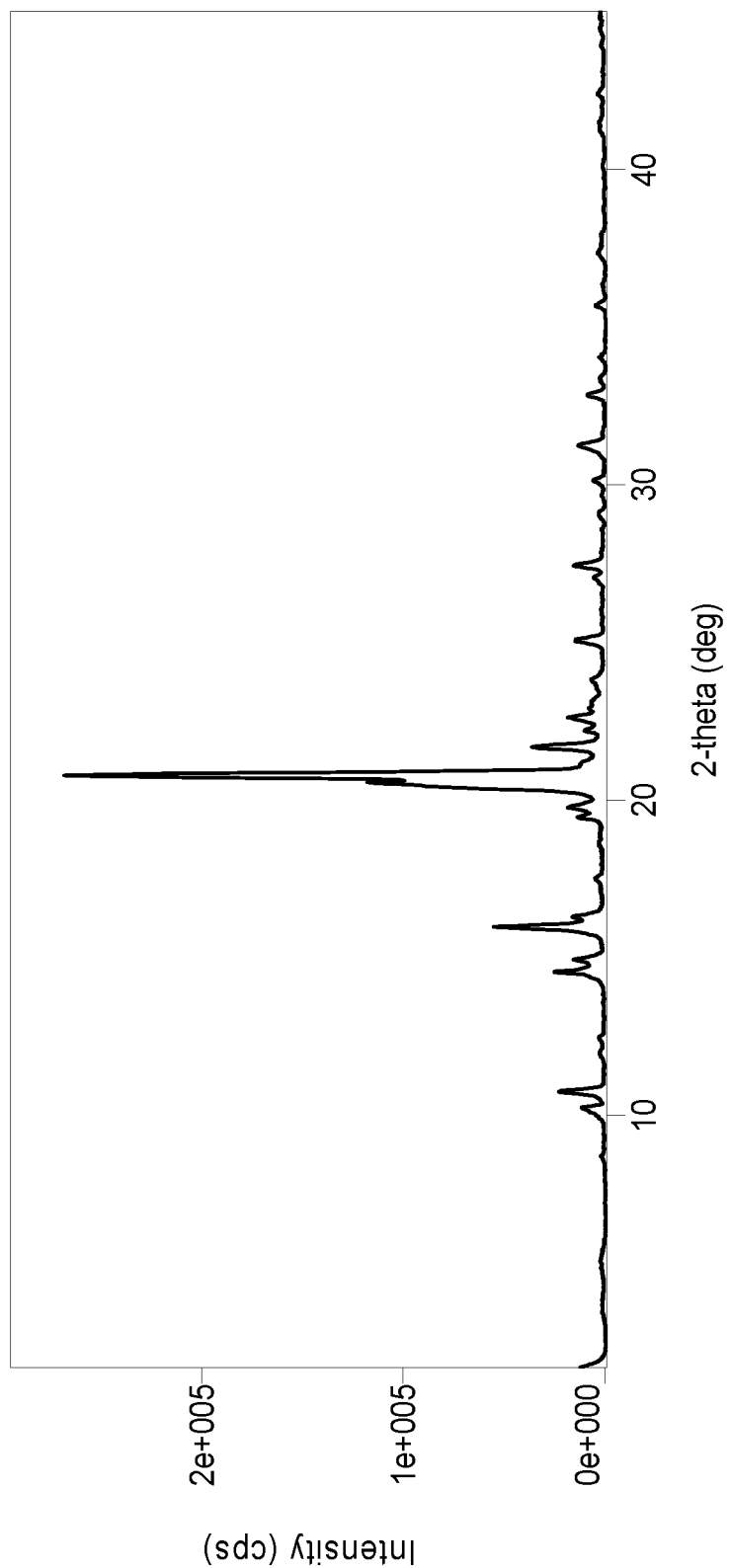
FIG. 3 depicts an exemplary Powder X-Ray Diffraction (PXRD) diffractogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) free base in crystalline Form II.

In some embodiments, the crystalline Form II of Compound 1 has a PXRD diffractogram as shown in FIG. 3. In some embodiments, the crystalline Form II has a PXRD diffractogram substantially similar as shown in FIG. 3. As used herein, the term "substantially similar" means that the numeric values of the two-theta angles may vary up to ±0.2 although the absolute and/or relative intensity of each peak may vary substantially.

Figure 4:
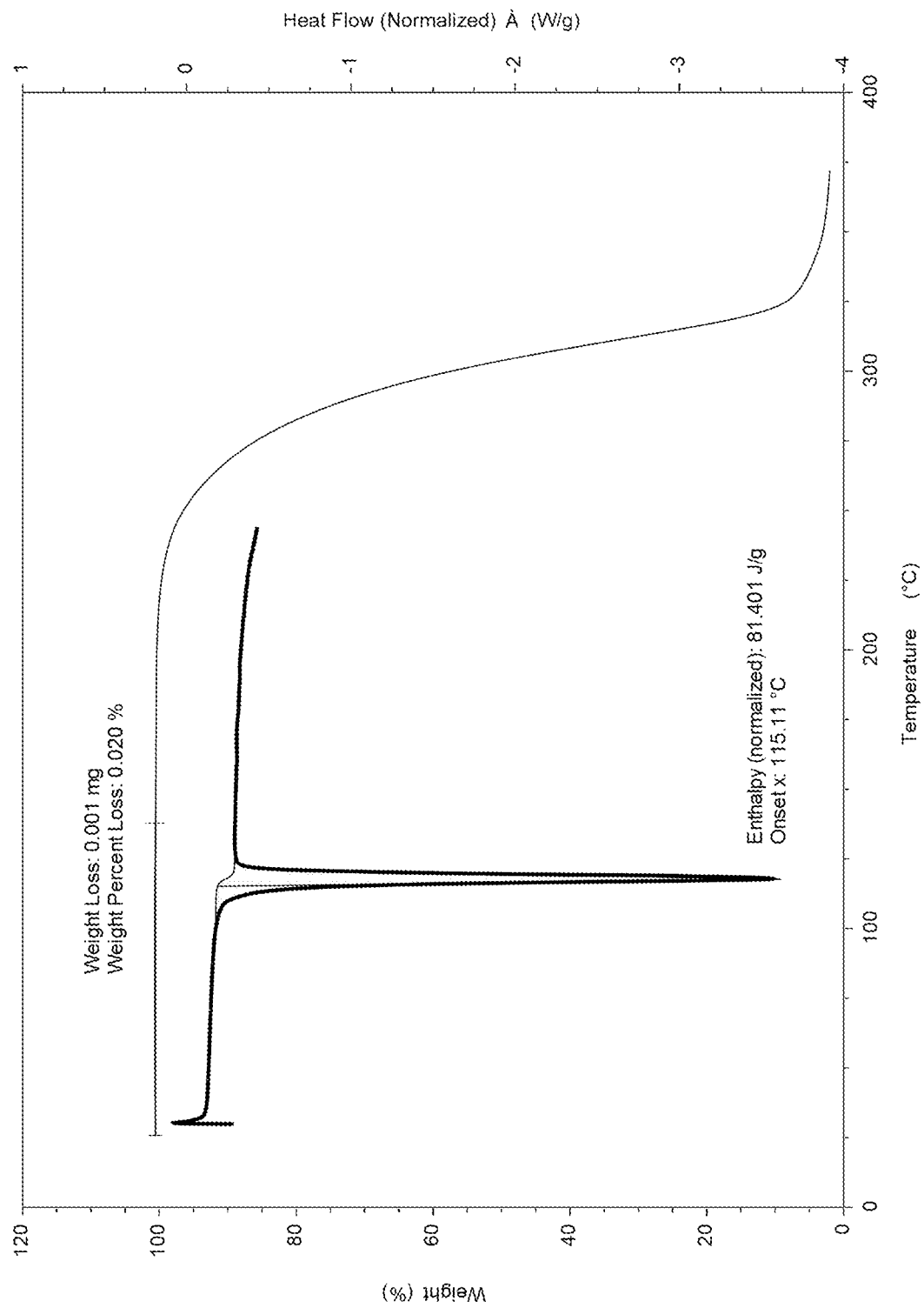
FIG. 4 depicts exemplary Thermogravimetric Analysis (TGA) thermogram and Differential Scanning Calorimetry (DSC) thermogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) free base in crystalline Form II.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has a DSC thermogram as shown in FIG. 4. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram substantially similar as shown in FIG. 4. As used herein, the term "substantial similar" means that the temperature in a DSC thermogram may vary up to ±3° C. and the enthalpy may vary up to ±2 J/g.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising only one peak with an onset temperature of 115.1±3° C. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has a DSC thermogram comprising only one peak with an onset temperature of 115.1±2° C. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising only one peak with an onset temperature of 115.1±1° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate has a DSC thermogram comprising a peak with an onset temperature of 115.1±3° C. and is substantially free of a peak with an onset temperature of 91.6±3° C. As used herein, the term "substantially free" means the peak height with an onset temperature of 91.6±3° C. is less than 5% of the height of the peak with an onset temperature of 115.1±3° C.

In some embodiments, the crystalline Form II of Compound 1 has a TGA thermogram with a weight loss of less than 0.5%, less than 0.2%, less than 0.1%, or less than 0.05% up to about 120° C. In some embodiments, the crystalline Form II has a TGA thermogram with a weight loss of less than 0.5%, less than 0.2%, less than 0.1%, or less than 0.05% up to about 125° C. In some embodiments, the crystalline Form II has a TGA thermogram with a weight loss of less than 0.5%, less than 0.2%, less than 0.1%, or less than 0.05% up to about 130° C. In some embodiments, the crystalline Form II has a TGA thermogram with a weight loss of less than 0.5%, less than 0.2%, less than 0.1% or less than 0.05% up to about 135° C. In some embodiments, the crystalline Form II has a TGA thermogram with a weight loss of less than 0.5%, less than 0.2%, less than 0.1% or less than 0.05% up to about 140° C. In some embodiments, the crystalline Form II has a TGA thermogram with a weight loss of less than 0.5%, less than 0.2%, less than 0.1% or less than 0.05% up to about 150° C.

In some embodiments, the crystalline Form II of Compound 1 has a TGA thermogram with a weight loss of less than 0.1% up to about 135° C. In some embodiments, the crystalline Form II has a TGA thermogram with a weight loss of less than 0.2% up to about 135° C. In some embodiments, the crystalline Form II has a TGA thermogram with a weight loss of less than 0.3% up to about 135° C. In some embodiments, the crystalline Form II has a TGA thermogram with a weight loss of less than 0.5% up to about 135° C. In some embodiments, the crystalline Form II has a TGA thermogram with a weight loss of less than 1% up to about 135° C.

In some embodiments, the crystalline Form II of Compound 1 has a TGA thermogram with a weight loss of less than 0.2% up to about 120° C. In some embodiments, the crystalline Form II has a TGA thermogram with a weight loss of less than 0.2% up to about 125° C. In some embodiments, the crystalline Form II has a TGA thermogram with a weight loss of less than 0.2% up to about 130° C. In some embodiments, the crystalline Form II has a TGA thermogram with a weight loss of less than 0.2% up to about 135° C. In some embodiments, the crystalline Form II has a TGA thermogram with a weight loss of less than 0.2% up to about 140° C. In some embodiments, the crystalline Form II has a TGA thermogram with a weight loss of less than 0.2% up to about 150° C.

In some embodiments, the crystalline Form II of Compound 1 has a TGA thermogram as shown in FIG. 4. In some embodiments, the crystalline Form II has a TGA thermogram substantially similar as shown in FIG. 4. As used herein, the term "substantial similar" means that the weight %-temperature curve in a TGA thermogram may vary up to ±10%.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with one or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.1% up to about 135° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with two or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.1% up to about 135° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with three or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.1% up to about 135° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with four or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.1% up to about 135° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with peaks at two-theta angle selected of 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.1% up to about 135° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with one or more peaks at two-theta angle selected from 10.8±0.2, 16.0±0.2, 20.8±0.2, 21.7±0.2 and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.1% up to about 140° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with one or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.2% up to about 140° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with one or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram substantially similar as shown in FIG. 4.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with two or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.2% up to about 140° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with three or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and
- a TGA thermogram with a weight loss of less than 0.2% up to about 140° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) has one or more characteristics selected from:
- a PXRD diffractogram with four or more peaks at two-theta angle selected from 10.8±0.2, 16.0±0.2, 20.8±0.2, 21.7±0.2, and 25.1±0.2 degrees;
- a DSC thermogram comprising a peak with an onset temperature of 115.1±3° C. and substantially free of a peak with an onset temperature of 91.6±3° C.; and a TGA thermogram with a weight loss of less than 0.2% up to about 140° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:

a PXRD diffractogram as shown in FIG. 3;
a DSC thermogram as shown in FIG. 4; and
a TGA thermogram as shown in FIG. 4.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate has one or more characteristics selected from:

a PXRD diffractogram substantially similar as shown in FIG. 3;
a DSC thermogram substantially similar as shown in FIG. 4; and
a TGA thermogram substantially similar as shown in FIG. 4.

Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) Oxalate In some embodiments, provided herein is a crystalline form of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate, wherein the crystalline form is Form I.

The crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate have an X-ray diffraction pattern. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristic PXRD diffraction peaks at two-theta angle selected from 14.9±0.2, 16.9±0.2, 18.5±0.2, 18.8±0.2, and 19.8±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has characteristic PXRD diffraction peaks at two-theta angle of 14.9±0.2, 16.9±0.2, 18.5±0.2, 18.8±0.2, and 19.8±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle selected from 14.9±0.2, 16.9±0.2, 18.5±0.2, 18.8±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 14.9±0.2, 16.9±0.2, 18.5±0.2, and 18.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 14.9±0.2, 16.9±0.2, 18.5±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 14.9±0.2, 16.9±0.2, 18.8±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 14.9±0.2, 18.5±0.2, 18.8±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 16.9±0.2, 18.5±0.2, 18.8±0.2, and 19.8±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle selected from 14.9±0.2, 16.9±0.2, 18.5±0.2, 18.8±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angles of 14.9±0.2 and 16.9±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 14.9±0.2 and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 14.9±0.2 and 18.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 14.9±0.2 and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angles of 16.9±0.2 and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angles of 16.9±0.2 and 18.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 16.9±0.2 and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.5±0.2 and 18.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angles of 18.5±0.2 and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.8±0.2 and 19.8±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle selected from 14.9±0.2, 16.9±0.2, 18.5±0.2, 18.8±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2yl]piperazine-1-carboxylate (Compound 1) oxalate has three characteristic PXRD diffraction peaks at two-theta angle of 14.9±0.2, 16.9±0.2, and 18.5±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 14.9±0.2, 16.9±0.2, and 18.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 14.9±0.2, 18.5±0.2, and 18.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 18.5±0.2, 18.8±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 16.9±0.2, 18.8±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 16.9±0.2, 18.5±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 14.9±0.2, 16.9±0.2, and 19.8±0.2 degrees.

Figure 5:
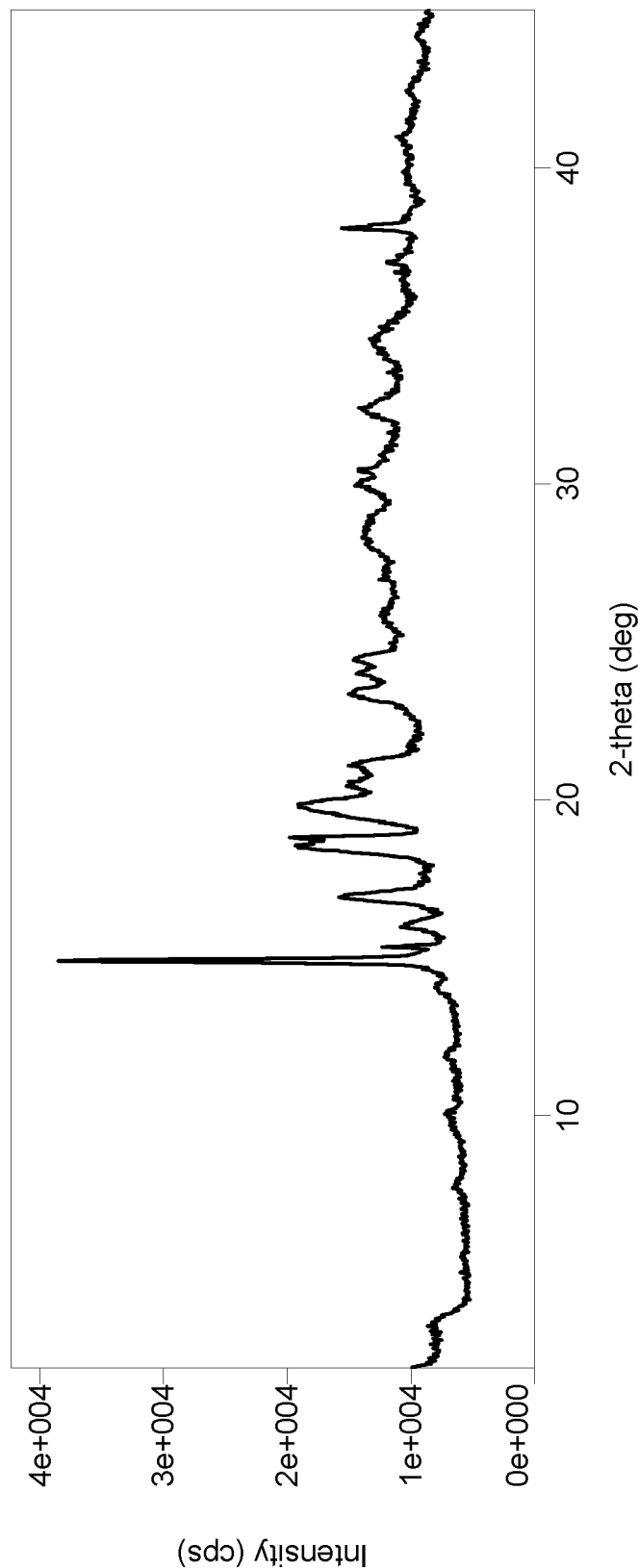
FIG. 5 depicts an exemplary Powder X-Ray Diffraction (PXRD) diffractogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate in crystalline Form I.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a PXRD diffractogram as shown in FIG. 5. In some embodiments, the crystalline Form I has a PXRD diffractogram substantially similar as shown in FIG. 5. As used herein, the term "substantially similar" means that the numeric values of the two-theta angles may vary up to ±0.2 although the absolute and/or relative intensity of each peak may vary substantially.

Figure 6:
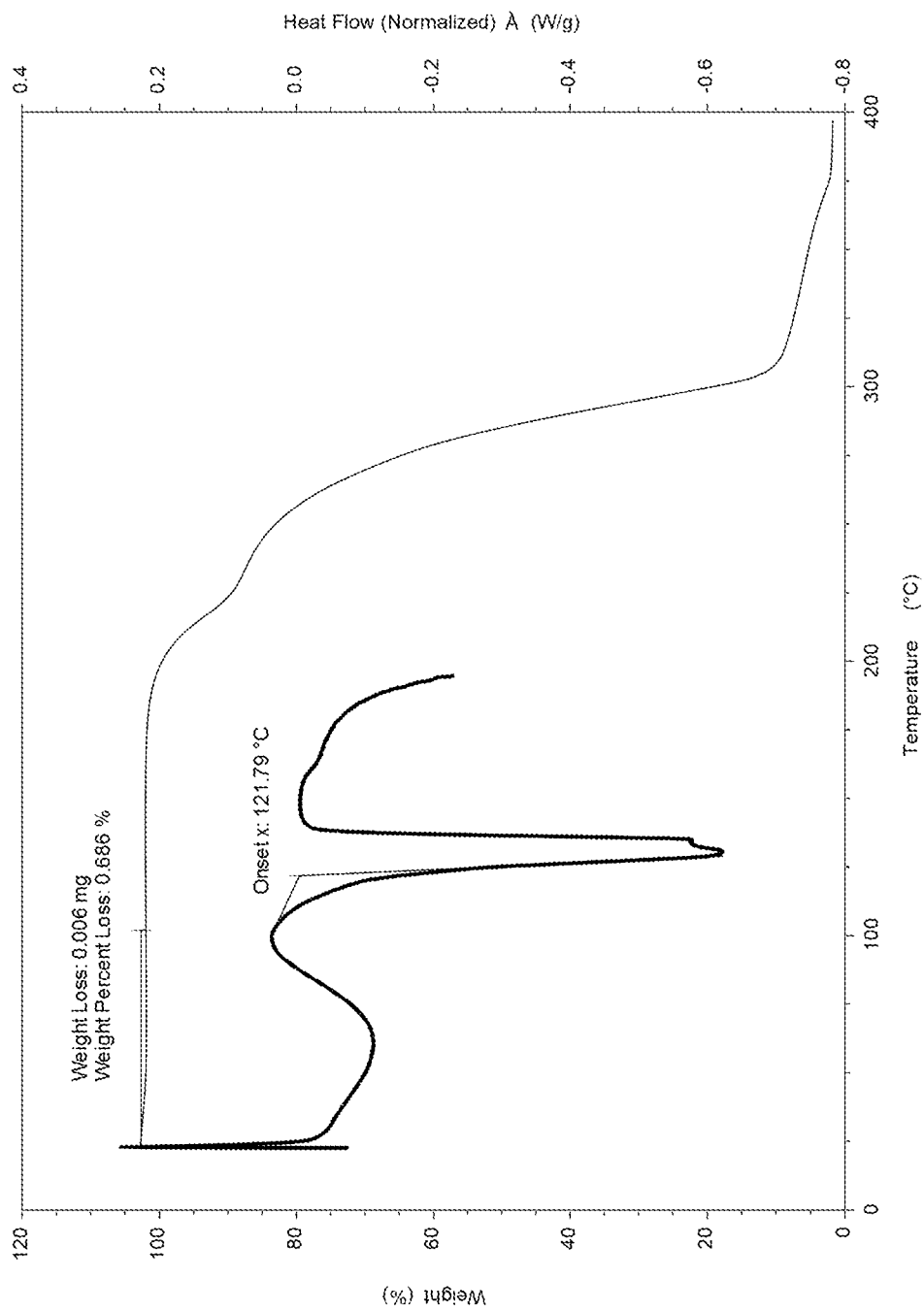
FIG. 6 depicts exemplary Thermogravimetric Analysis (TGA) thermogram and Differential Scanning Calorimetry (DSC) thermogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate in crystalline Form I.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram as shown in FIG. 6. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram substantially similar as shown in FIG. 6. As used herein, the term "substantial similar" means that the temperature in a DSC thermogram may vary up to ±3° C. and the enthalpy may vary up to ±2 J/g.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising a peak with an onset temperature of 121.8±3° C. In some embodiments, the crystalline Form I of 2-(1-benzylpiperidin-4-yl) ethyl (2R,6S)-2,6-dimethyl-4-[5-(trifluoromethyl)pyrazin-2-yl]piperazine-1-carboxylate (Compound 1) oxalate has a DSC thermogram comprising a peak with an onset temperature of 121.8±2° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising a peak with an onset temperature of 121.8±1° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a TGA thermogram as shown in FIG. 6. In some embodiments, the crystalline Form I has a TGA thermogram substantially similar as shown in FIG. 6. As used herein, the term "substantial similar" means that the weight %-temperature curve in a TGA thermogram may vary up to ±10%.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with one or more peaks at two-theta angle selected from 14.9±0.2, 16.9±0.2, 18.5±0.2, 18.8±0.2, and 19.8±0.2 degrees; and
  a DSC thermogram comprising a peak with an onset temperature of 121.8±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with two or more peaks at two-theta angle selected from 14.9±0.2, 16.9±0.2, 18.5±0.2, 18.8±0.2, and 19.8±0.2 degrees; and
  a DSC thermogram comprising a peak with an onset temperature of 121.8±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with three or more peaks at two-theta angle selected from 14.9±0.2, 16.9±0.2, 18.5±0.2, 18.8±0.2, and 19.8±0.2 degrees; and
  a DSC thermogram comprising a peak with an onset temperature of 121.8±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with four or more peaks at two-theta angle selected from 14.9±0.2, 16.9±0.2, 18.5±0.2, 18.8±0.2, and 19.8±0.2 degrees; and
  a DSC thermogram comprising a peak with an onset temperature of 121.8±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with peaks at two-theta angle of 14.9±0.2, 16.9±0.2, 18.5±0.2, 18.8±0.2, and 19.8±0.2 degrees; and
  a DSC thermogram comprising a peak with an onset temperature of 121.8±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
- a PXRD diffractogram as shown in FIG. 5;
- a DSC thermogram as shown in FIG. 6; and
- a TGA thermogram as shown in FIG. 6.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
- a PXRD diffractogram substantially similar as shown in FIG. 5;
- a DSC thermogram substantially similar as shown in FIG. 6; and
- a TGA thermogram substantially similar as shown in FIG. 6.

Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) Oxalate In some embodiments, provided herein is a crystalline form of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate, wherein the crystalline form is Form II.

The crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate have an X-ray diffraction pattern. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristic PXRD diffraction peaks at two-theta angle selected from 18.7±0.2, 23.3±0.2, 28.8±0.2, 34.9±0.2, and 36.8±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has characteristic PXRD diffraction peaks at two-theta angle of 18.7±0.2, 23.3±0.2, 28.8±0.2, 34.9±0.2, and 36.8±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle selected from 18.7±0.2, 23.3±0.2, 28.8±0.2, 34.9±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 18.7±0.2, 23.3±0.2, 28.8±0.2, and 34.9±0.2 degrees. In some embodiments, the Form II of 2-(1-benzylpiperidin-4-yl)ethyl (2R, 6S)-2,6-dimethyl-4-[5-(trifluoromethyl)pyrazin-2-yl]piperazine-1-carboxylate (Compound 1) oxalate has four characteristic PXRD diffraction peaks at two-theta angle of 18.7±0.2, 23.3±0.2, 28.8±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle 18.7±0.2, 23.3±0.2, 34.9±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angles of 18.7±0.2, 28.8±0.2, 34.9±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 23.3±0.2, 28.8±0.2, 34.9±0.2, and 36.8±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle selected from 18.7±0.2, 23.3±0.2, 28.8±0.2, 34.9±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.7±0.2 and 23.3±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.7±0.2 and 28.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.7±0.2 and 34.9±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.7±0.2 and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 23.3±0.2 and 28.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 23.3±0.2 and 34.9±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 23.3±0.2 and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 28.8±0.2 and 34.9±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 28.8±0.2 and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 34.9±0.2 and 36.8±0.2 degrees.

In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle selected from 18.7±0.2, 23.3±0.2, 28.8±0.2, 34.9±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2yl]piperazine-1-carboxylate (Compound 1) oxalate has three characteristic PXRD diffraction peaks at two-theta angle of 18.7±0.2, 23.3±0.2, and 28.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 18.7±0.2, 23.3±0.2, and 34.9±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 18.7±0.2, 23.3±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 18.7±0.2, 28.8±0.2, and 34.9±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 18.7±0.2, 28.8±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 18.7±0.2, 34.9±0.2, and 36.8±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 23.3±0.2, 28.8±0.2, and 34.9±0.2 degrees. In some embodiments, the Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 28.8±0.2, 34.9±0.2, and 36.8±0.2 degrees.

Figure 7:
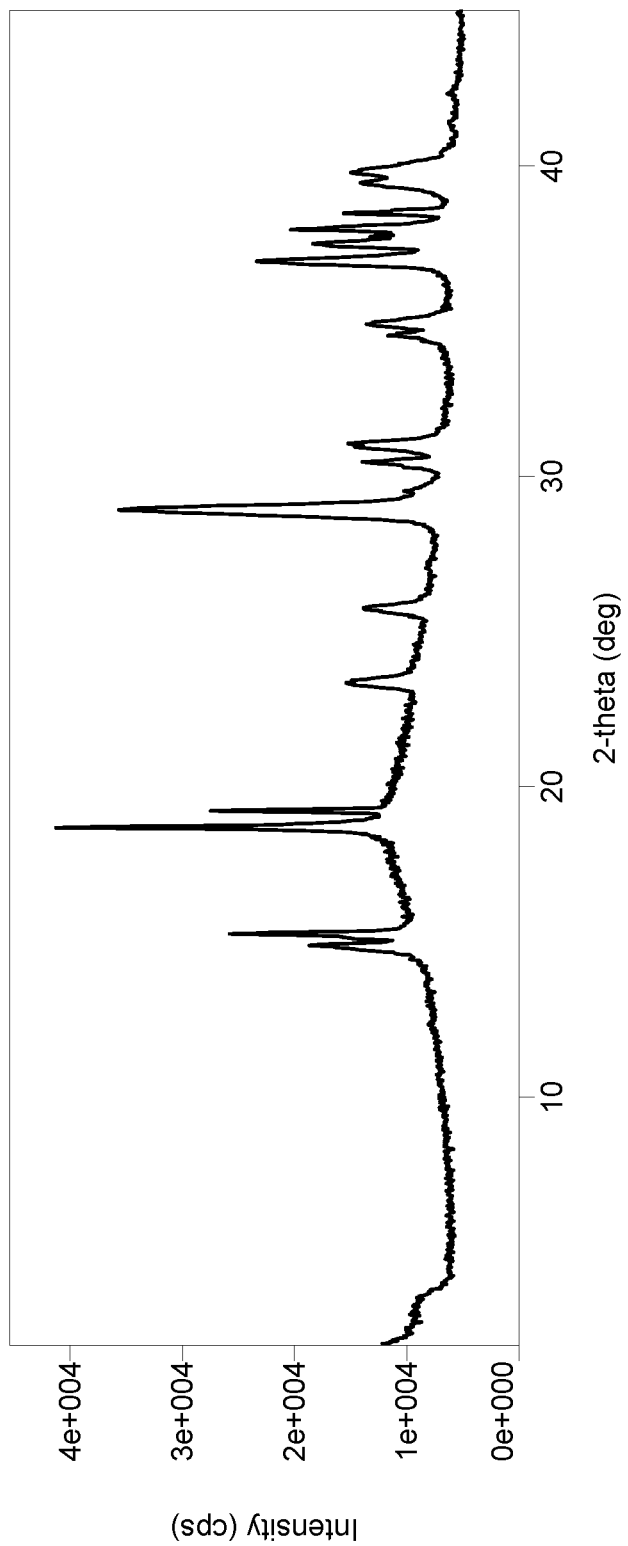
FIG. 7 depicts an exemplary Powder X-Ray Diffraction (PXRD) diffractogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate in crystalline Form II.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a PXRD diffractogram as shown in FIG. 7. In some embodiments, the crystalline Form II has a PXRD diffractogram substantially similar as shown in FIG. 7. As used herein, the term "substantially similar" means that the numeric values of the two-theta angles may vary up to ±0.2 although the absolute and/or relative intensity of each peak may vary substantially.

Figure 8:
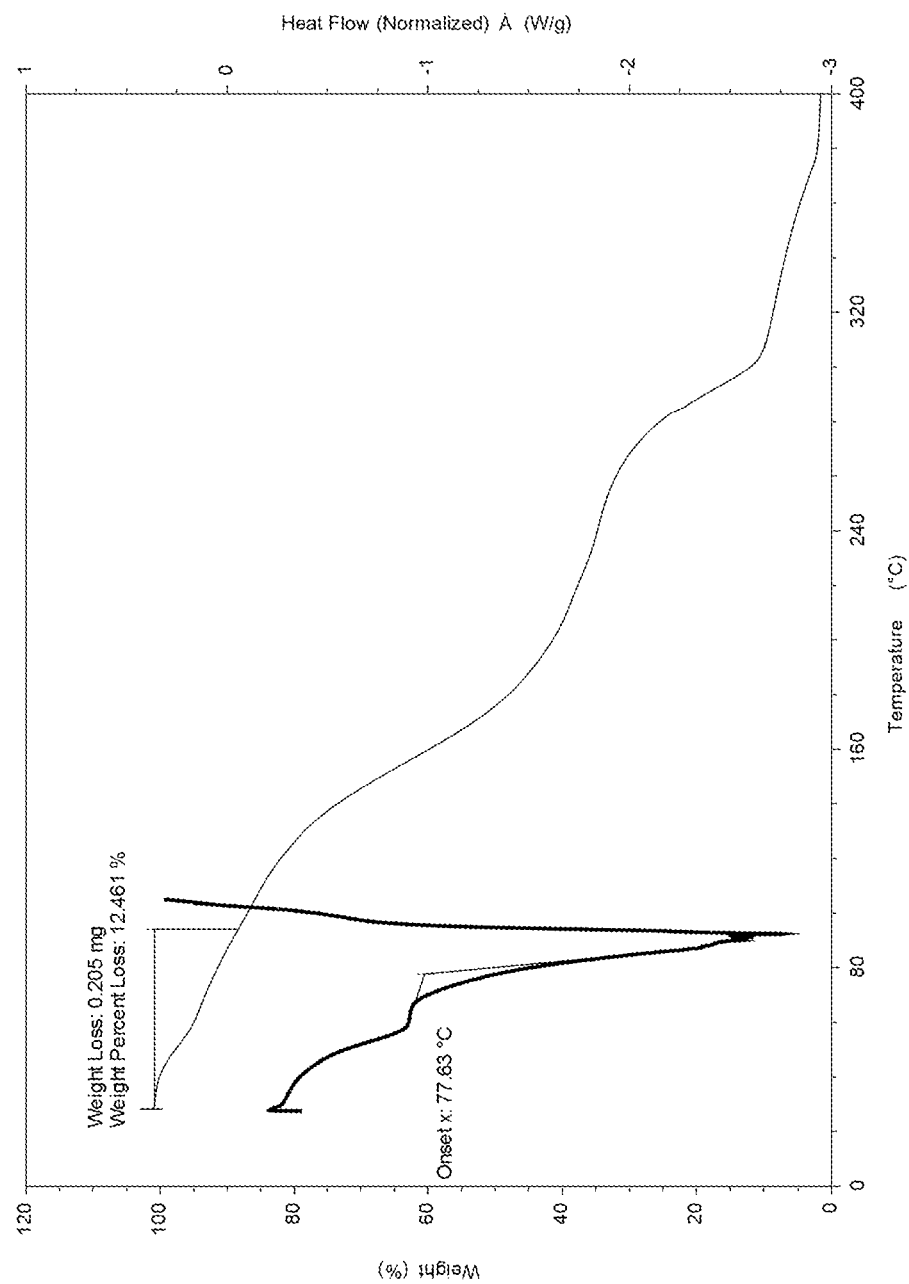
FIG. 8 depicts exemplary Thermogravimetric Analysis (TGA) thermogram and Differential Scanning Calorimetry (DSC) thermogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate in crystalline Form II.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram as shown in FIG. 8. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram substantially similar as shown in FIG. 8. As used herein, the term "substantial similar" means that the temperature in a DSC thermogram may vary up to ±3° C. and the enthalpy may vary up to ±2 J/g.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising a peak with an onset temperature of 77.6±3° C. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising a peak with an onset temperature of 77.6±2° C. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising a peak with an onset temperature of 77.6±1° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a TGA thermogram as shown in FIG. 8. In some embodiments, the crystalline Form II has a TGA thermogram substantially similar as shown in FIG. 8. As used herein, the term "substantial similar" means that the weight %-temperature curve in a TGA thermogram may vary up to ±10%.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with one or more peaks at two-theta angle selected from 18.7±0.2, 23.3±0.2, 28.8±0.2, 34.9±0.2, and 36.8±0.2 degrees; and
  a DSC thermogram comprising a peak with an onset temperature of 77.6±3° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with two or more peaks at two-theta angle selected from 18.7±0.2, 23.3±0.2, 28.8±0.2, 34.9±0.2, and 36.8±0.2 degrees; and
  a DSC thermogram comprising a peak with an onset temperature of 77.6±3° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with three or more peaks at two-theta angle selected from 18.7±0.2, 23.3±0.2, 28.8±0.2, 34.9±0.2, and 36.8±0.2 degrees; and
  a DSC thermogram comprising a peak with an onset temperature of 77.6±3° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with four or more peaks at two-theta angle selected from 18.7±0.2, 23.3±0.2, 28.8±0.2, 34.9±0.2, and 36.8±0.2 degrees; and
  a DSC thermogram comprising a peak with an onset temperature of 77.6±3° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with peaks at two-theta angle of 18.7±0.2, 23.3±0.2, 28.8±0.2, 34.9±0.2, and 36.8±0.2 degrees; and a DSC thermogram comprising a peak with an onset temperature of 77.6±3° C.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
- a PXRD diffractogram as shown in FIG. 7;
- a DSC thermogram as shown in FIG. 8; and
- a TGA thermogram as shown in FIG. 8.

In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
- a PXRD diffractogram substantially similar as shown in FIG. 7;
- a DSC thermogram substantially similar as shown in FIG. 8; and
- a TGA thermogram substantially similar as shown in FIG. 8.

Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) Oxalate In some embodiments, provided herein is a crystalline form of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate, wherein the crystalline form is Form III.

The crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate have an X-ray diffraction pattern. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristic PXRD diffraction peaks at two-theta angle selected from 11.8±0.2, 15.7±0.2, 18.7±0.2, 19.7±0.2, and 22.0±0.2 degrees.

In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has characteristic PXRD diffraction peaks at two-theta angle of 11.8±0.2, 15.7±0.2, 18.7±0.2, 19.7±0.2, and 22.0±0.2 degrees.

In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle selected from 11.8±0.2, 15.7±0.2, 18.7±0.2, 19.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 11.8±0.2, 15.7±0.2, 18.7±0.2, and 19.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 11.8±0.2, 15.7±0.2, 18.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle 11.8±0.2, 15.7±0.2, 19.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angle of 11.8±0.2, 18.7±0.2, 19.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has four characteristic PXRD diffraction peaks at two-theta angles of 15.7±0.2, 18.7±0.2, 19.7±0.2, and 22.0±0.2 degrees.

In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle selected from 11.8±0.2, 15.7±0.2, 18.7±0.2, 19.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 11.8±0.2 and 15.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angles of 11.8±0.2 and 18.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 11.8±0.2 and 19.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 11.8±0.2 and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 15.7±0.2 and 18.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angles of 15.7±0.2 and 19.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 15.7±0.2 and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.7±0.2 and 19.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 18.7±0.2 and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has two characteristic PXRD diffraction peaks at two-theta angle of 19.7±0.2 and 22.0±0.2 degrees.

In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle selected from 11.8±0.2, 15.7±0.2, 18.7±0.2, 19.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2yl]piperazine-1-carboxylate (Compound 1) oxalate has three characteristic PXRD diffraction peaks at two-theta angles of 11.8±0.2, 15.7±0.2, and 18.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 11.8±0.2, 15.7±0.2, and 19.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 11.8±0.2, 15.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 15.7±0.2, 18.7±0.2, and 19.7±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 15.7±0.2, 18.7±0.2, and 22.0±0.2 degrees. In some embodiments, the Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has three characteristic PXRD diffraction peaks at two-theta angle of 18.7±0.2, 19.7±0.2, and 22.0±0.2 degrees.

Figure 9:
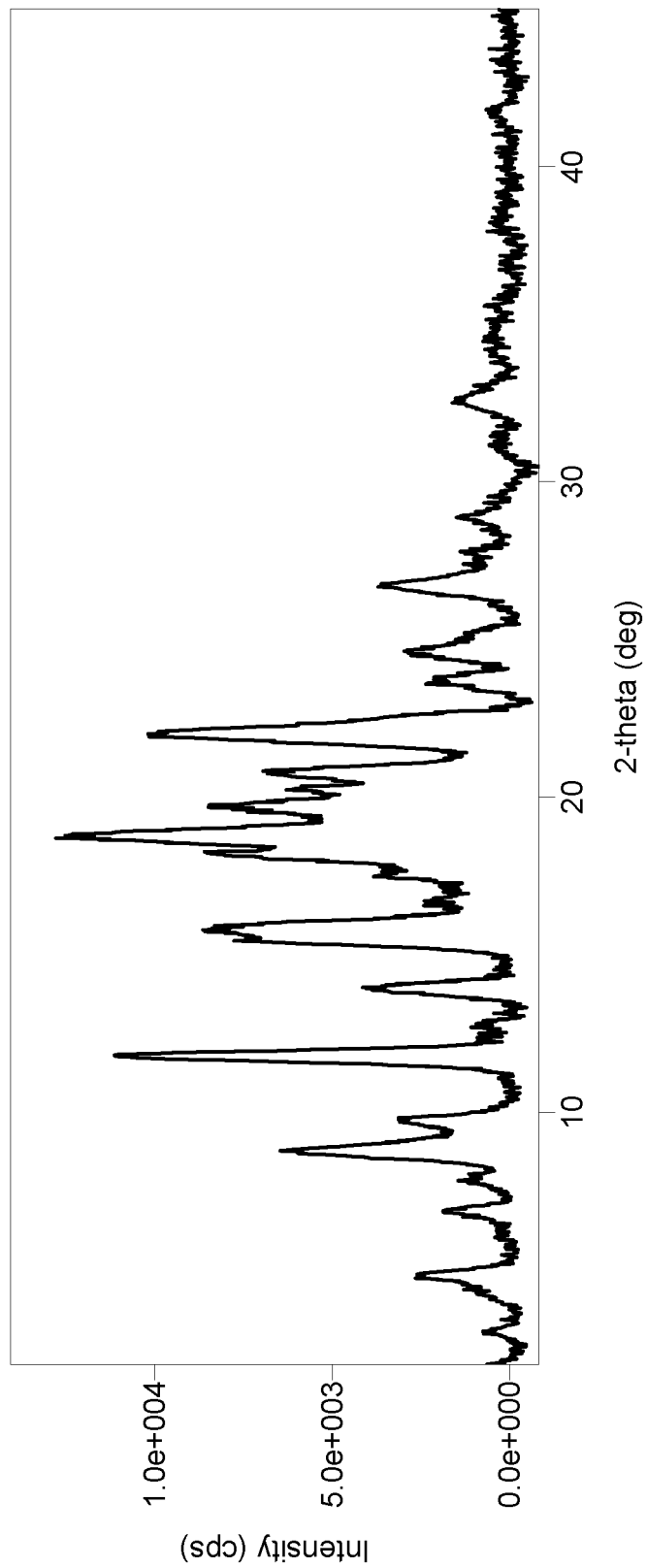
FIG. 9 depicts an exemplary Powder X-Ray Diffraction (PXRD) diffractogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate in crystalline Form III.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a PXRD diffractogram as shown in FIG. 9. In some embodiments, the crystalline Form III has a PXRD diffractogram substantially similar as shown in FIG. 9. As used herein, the term "substantially similar" means that the numeric values of the two-theta angles may vary up to ±0.2 although the absolute and/or relative intensity of each peak may vary substantially.

Figure 10:
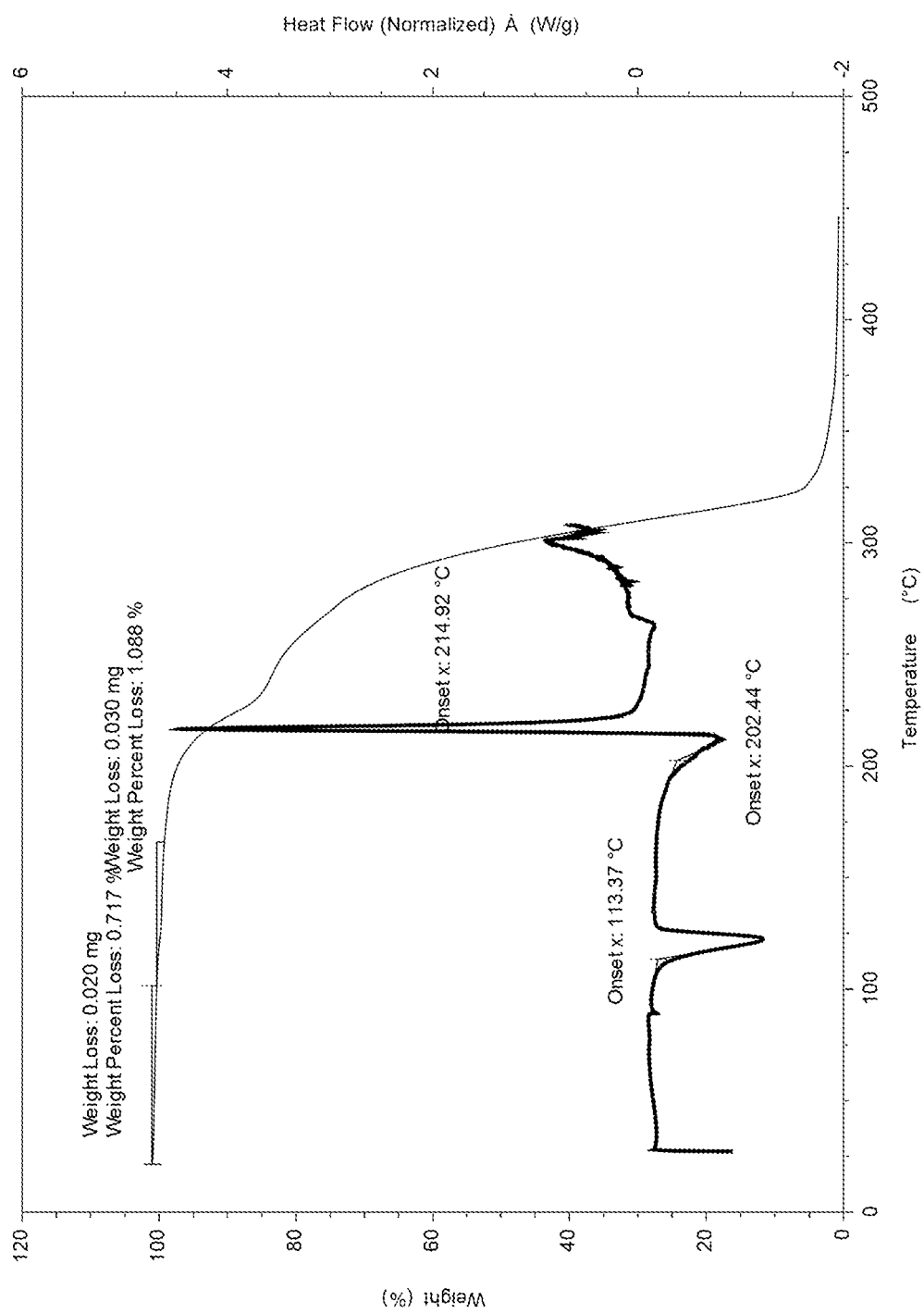
FIG. 10 depicts exemplary Thermogravimetric Analysis (TGA) thermogram and Differential Scanning Calorimetry (DSC) thermogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate salt in crystalline Form III.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram as shown in FIG. 10. In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram substantially similar as shown in FIG. 10. As used herein, the term "substantial similar" means that the temperature in a DSC thermogram may vary up to ±3° C. and the enthalpy may vary up to ±2 J/g.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 113.4±3° C. In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 113.4±2° C. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 113.4±1° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 202.4±3° C. In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 202.4±2° C. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 202.4±1° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 214.9±3° C. In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 214.9±2° C. In some embodiments, the crystalline Form II of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one peak with an onset temperature of 214.9±1° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a DSC thermogram comprising one or more peaks with an onset temperature selected from 113.4±3° C., 202.4±3° C., and 214.9±3° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has a TGA thermogram as shown in FIG. 10. In some embodiments, the crystalline Form III has a TGA thermogram substantially similar as shown in FIG. 10. As used herein, the term "substantial similar" means that the weight %-temperature curve in a TGA thermogram may vary up to ±10%.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
  a PXRD diffractogram with one or more peaks at two-theta angle selected from 11.8±0.2, 15.7±0.2, 18.7±0.2, 19.7±0.2, and 22.0±0.2 degrees; and
  a DSC thermogram comprising one or more peaks with an onset temperature selected from 113.4±3° C., 202.4±3° C., and 214.9±3° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:

a PXRD diffractogram with two or more peaks at two-theta angle selected from 11.8±0.2, 15.7±0.2, 18.7±0.2, 19.7±0.2, and 22.0±0.2 degrees; and a DSC thermogram comprising one or more peaks with an onset temperature selected from 113.4±3° C., 202.4±3° C., and 214.9±3° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
a PXRD diffractogram with three or more peaks at two-theta angle selected from 11.8±0.2, 15.7±0.2, 18.7±0.2, 19.7±0.2, and 22.0±0.2 degrees; and
a DSC thermogram comprising one or more peaks with an onset temperature selected from 113.4±3° C., 202.4±3° C., and 214.9±3° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
a PXRD diffractogram with four or more peaks at two-theta angle selected from 11.8±0.2, 15.7±0.2, 18.7±0.2, 19.7±0.2, and 22.0±0.2 degrees; and
a DSC thermogram comprising one or more peaks with an onset temperature selected from 113.4±3° C., 202.4±3° C., and 214.9±3° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
a PXRD diffractogram with peaks at two-theta angles of 11.8±0.2, 15.7±0.2, 18.7±0.2, 19.7±0.2, and 22.0±0.2 degrees; and
a DSC thermogram comprising one or more peaks with an onset temperature selected from 113.4±3° C., 202.4±3° C., and 214.9±3° C.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
a PXRD diffractogram as shown in FIG. 9;
a DSC thermogram as shown in FIG. 10; and
a TGA thermogram as shown in FIG. 10.

In some embodiments, the crystalline Form III of 2-(1-benzylpiperidin-4-yl)ethyl (2R,6S)-2,6-dimethyl-4-[5-(trifluoromethyl)pyrazin-2-yl]piperazine-1-carboxylate (Compound 1) oxalate has one or more characteristics selected from:
a PXRD diffractogram substantially similar as shown in FIG. 9;
a DSC thermogram substantially similar as shown in FIG. 10; and
a TGA thermogram substantially similar as shown in FIG. 10.

Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride In some embodiments, provided herein is a crystalline form of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride, represented by Formula (IIa), wherein the crystalline form is Form I.

The crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride have an X-ray diffraction pattern. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristic PXRD diffraction peaks at two-theta angle selected from 16.6±0.2, 19.4±0.2, 19.8±0.2, 22.8±0.2, and 25.7±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has characteristic PXRD diffraction peaks at two-theta angle of 16.6±0.2, 19.4±0.2, 19.8±0.2, 22.8±0.2, and 25.7±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has four characteristic PXRD diffraction peaks at two-theta angle selected from 16.6±0.2, 19.4±0.2, 19.8±0.2, 22.8±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has four characteristic PXRD diffraction peaks at two-theta angle of 16.6±0.2, 19.4±0.2, 19.8±0.2, and 22.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has four characteristic PXRD diffraction peaks at two-theta angle of 16.6±0.2, 19.4±0.2, 19.8±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has four characteristic PXRD diffraction peaks at two-theta angle 16.6±0.2, 19.4±0.2, 22.8±0.2, and 25.7±0.22 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has four characteristic PXRD diffraction peaks at two-theta angle of 16.6±0.2, 19.8±0.2, 22.8±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has four characteristic PXRD diffraction peaks at two-theta angle of 19.4±0.2, 19.8±0.2, 22.8±0.2, and 25.7±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle selected from 16.6±0.2, 19.4±0.2, 19.8±0.2, 22.8±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle of 16.6±0.2 and 19.4±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle of 16.6±0.2 and 19.8±0.2 degrees. In some embodiments, the Form I of 2-(1-benzylpiperidin-4-yl)ethyl (2R,6S)-2,6-dimethyl-4-[5-

(trifluoromethyl)pyrazin-2-yl]piperazine-1-carboxylate (Compound 1) hydrochloride has two characteristic PXRD diffraction peaks at two-theta angle of 16.6±0.2 and 22.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle of 16.6±0.2 and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angles of 19.4±0.2 and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle of 19.4±0.2 and 22.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle of 19.4±0.2 and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle of 19.8±0.2 and 22.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angle of 19.8±0.2 and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has two characteristic PXRD diffraction peaks at two-theta angles of 22.8±0.2 and 25.7±0.2 degrees.

In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has three characteristic PXRD diffraction peaks at two-theta angle selected from 16.6±0.2, 19.4±0.2, 19.8±0.2, 22.8±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2yl]piperazine-1-carboxylate (Compound 1) hydrochloride has three characteristic PXRD diffraction peaks at two-theta angle of 16.6±0.2, 19.4±0.2, and 19.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has three characteristic PXRD diffraction peaks at two-theta angle of 16.6±0.2, 19.4±0.2, and 22.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has three characteristic PXRD diffraction peaks at two-theta angle of 16.6±0.2, 19.4±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has three characteristic PXRD diffraction peaks at two-theta angle of 19.4±0.2, 19.8±0.2, and 22.8±0.2 degrees. In some embodiments, the Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has three characteristic PXRD diffraction peaks at two-theta angle of 19.4±0.2, 19.8±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl] piperazine-1-carboxylate (Compound 1) hydrochloride has three characteristic PXRD diffraction peaks at two-theta angle of 19.8±0.2, 22.8±0.2, and 25.7±0.2 degrees. In some embodiments, the Form I of 2-(1-benzylpiperidin-4-yl)ethyl (2R,6S)-2,6-dimethyl-4-[5-(trifluoromethyl)pyrazin-2-yl] piperazine-1-carboxylate (Compound 1) hydrochloride has three characteristic PXRD diffraction peaks at two-theta angle of 19.4±0.2, 22.8±0.2, and 25.7±0.2 degrees.

Figure 11:
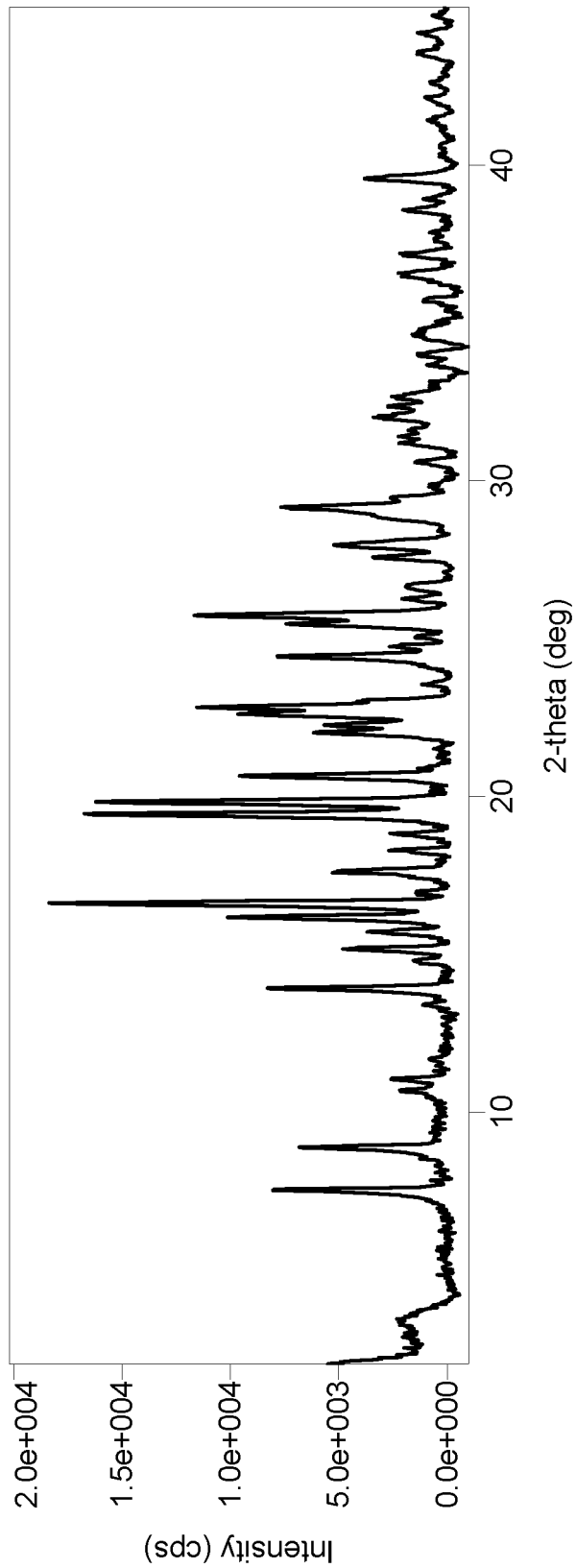
FIG. 11 depicts an exemplary Powder X-Ray Diffraction (PXRD) diffractogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride in crystalline Form I.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has a PXRD diffractogram as shown in FIG. 11. In some embodiments, the crystalline Form I has a PXRD diffractogram substantially similar as shown in FIG. 11. As used herein, the term "substantially similar" means that the numeric values of the two-theta angles may vary up to ±0.2 although the absolute and/or relative intensity of each peak may vary substantially.

Figure 12:
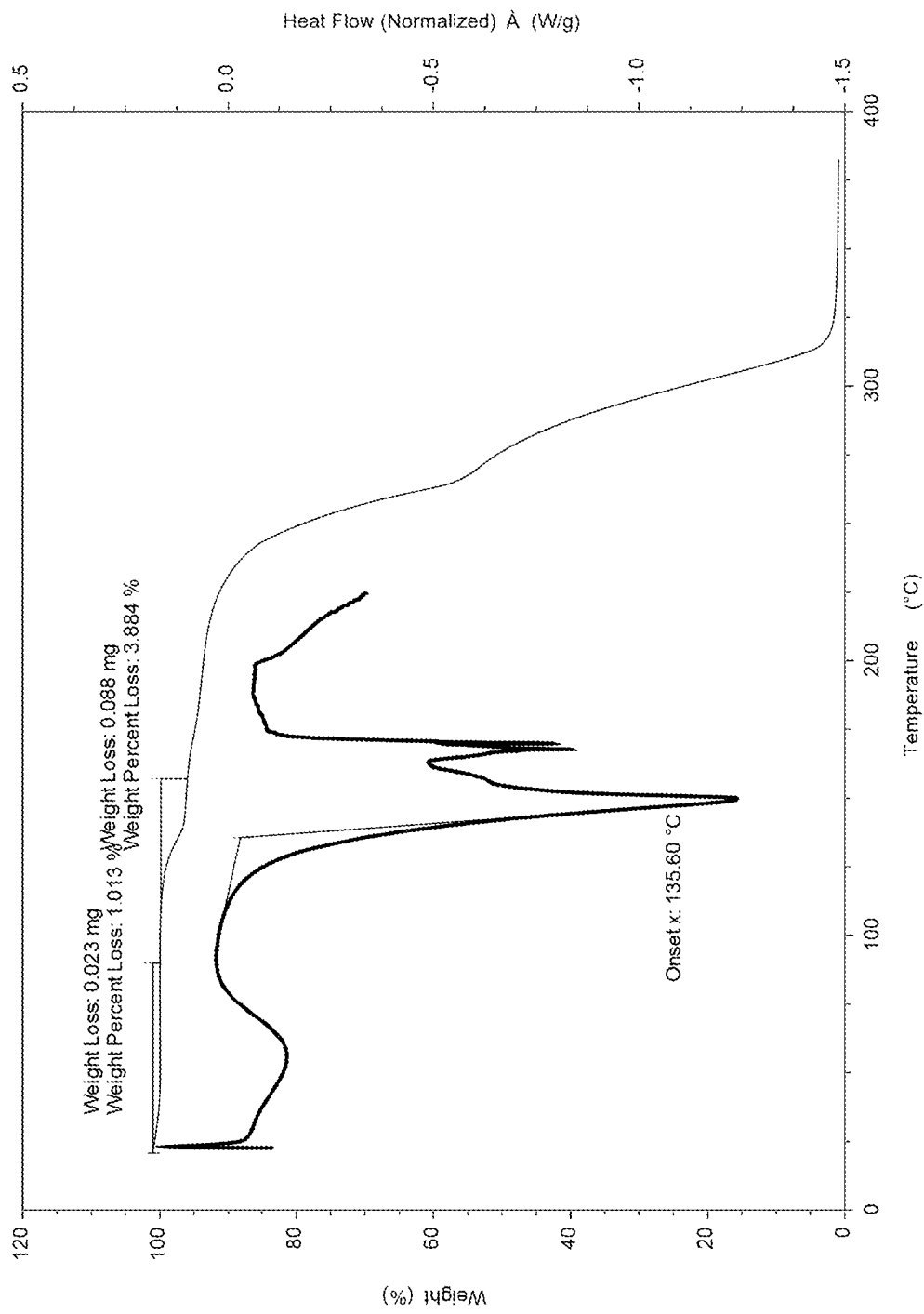
FIG. 12 depicts exemplary Thermogravimetric Analysis (TGA) thermogram and Differential Scanning Calorimetry (DSC) thermogram of a sample of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride in crystalline Form I.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has a DSC thermogram as shown in FIG. 12. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has a DSC thermogram substantially similar as shown in FIG. 12. As used herein, the term "substantial similar" means that the temperature in a DSC thermogram may vary up to ±3° C. and the enthalpy may vary up to ±2 J/g.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has a DSC thermogram comprising a peak with an onset temperature of 135.6±3° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has a DSC thermogram comprising one peak with an onset temperature of 135.6±2° C. In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has a DSC thermogram comprising one peak with an onset temperature of 135.6±1° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has a TGA thermogram as shown in FIG. 12. In some embodiments, the crystalline Form I has a TGA thermogram substantially similar as shown in FIG. 12. As used herein, the term "substantial similar" means that the weight %-temperature curve in a TGA thermogram may vary up to ±10%.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristics selected from:

a PXRD diffractogram with one or more peaks at two-theta angle selected from 16.6±0.2, 19.4±0.2, 19.8±0.2, 22.8±0.2, and 25.7±0.2 degrees; and a DSC thermogram comprising one peak with an onset temperature of 135.6±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristics selected from:
- a PXRD diffractogram with two or more peaks at two-theta angle selected from 16.6±0.2, 19.4±0.2, 19.8±0.2, 22.8±0.2, and 25.7±0.2 degrees; and
- a DSC thermogram comprising one peak with an onset temperature of 135.6±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristics selected from:
- a PXRD diffractogram with three or more peaks at two-theta angle selected from 16.6±0.2, 19.4±0.2, 19.8±0.2, 22.8±0.2, and 25.7±0.2 degrees; and
- a DSC thermogram comprising one peak with an onset temperature of 135.6±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristics selected from:
- a PXRD diffractogram with four or more peaks at two-theta angle selected from 16.6±0.2, 19.4±0.2, 19.8±0.2, 22.8±0.2, and 25.7±0.2 degrees; and
- a DSC thermogram comprising one peak with an onset temperature of 135.6±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristics selected from:
- a PXRD diffractogram with peaks at two-theta angle of 16.6±0.2, 19.4±0.2, 19.8±0.2, 22.8±0.2, and 25.7±0.2 degrees; and
- a DSC thermogram comprising one peak with an onset temperature of 135.6±3° C.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristics selected from:
- a PXRD diffractogram as shown in FIG. 11;
- a DSC thermogram as shown in FIG. 12; and
- a TGA thermogram as shown in FIG. 12.

In some embodiments, the crystalline Form I of 2-(1-benzylpiperidin-4-yl)ethyl (2R,6S)-2,6-dimethyl-4-[5-(trifluoromethyl)pyrazin-2-yl]piperazine-1-carboxylate (Compound 1) hydrochloride has one or more characteristics selected from:
- a PXRD diffractogram substantially similar as shown in FIG. 11;
- a DSC thermogram substantially similar as shown in FIG. 12; and
- a TGA thermogram substantially similar as shown in FIG. 12.

In some embodiments, the compounds described herein, or salts thereof, are substantially isolated. By "substantially isolated" is meant that the compound is at least partially or substantially separated from the environment in which it was formed or detected. Partial separation can include, for example, a composition enriched in the compounds of the invention. Substantial separation can include compositions containing at least about 50%, at least about 60%, at least about 70%, at least about 80%, at least about 90%, at least about 95%, at least about 97%, or at least about 99% by weight of the compounds of the invention, or salt thereof. Methods for isolating compounds and their salts are routine in the art.

In another embodiment, a method is provided for antagonizing a muscarinic receptor in a cell comprising contacting the cell and a compound of Formula I, including specific compounds described herein, for a time sufficient and under appropriate conditions to permit interaction between the cell and the compound. In certain embodiments, the cell is in a subject who is in need of treatment with a compound disclosed herein. For example, the subject may have or be at risk for developing a neurological disease, condition, or disorder including cognitive and movement neurological diseases, conditions, and disorders. In certain embodiments, methods are provided for preventing (i.e., reducing the likelihood of occurrence of) or treating Alzheimer's Disease, Lewy Body Dementia and the cognitive deficits associated with schizophrenia; Parkinson's Disease, drug induced Parkinsonism, dyskinesias, dystonia, chorea, levodopa induced dyskinesia, cerebral palsy and progressive supranuclear palsy, and Huntington's disease, including chorea associate with Huntington's disease. A person skilled in the medical or neurological art will readily appreciate that many of the aforementioned neurological diseases have both cognitive deficits and movement deficiencies or difficulties associated with them.

As used herein, "about" means ±20% of the stated value, and includes more specifically values of ±10%, ±5%, ±2% and ±1% of the stated value.

In addition, it is understood that, when the compounds described herein contain one or more double bond(s) (e.g., C=C, C=N, and the like) or other centers of geometric asymmetry, and unless specified otherwise, it is intended that the compounds include both E and Z geometric isomers (e.g., cis or trans). Cis and trans geometric isomers of the compounds described herein may be isolated as a mixture of isomers or as separated isomeric form.

Isotopic Variants

The compounds disclosed and described herein allow atoms at each position of the compound independently to have an isotopic distribution for a chemical element in proportional amounts to those usually found in nature or an isotopic distribution in proportional amounts different to those usually found in nature unless the context clearly dictates otherwise. A particular chemical element has an atomic number defined by the number of protons within the atom's nucleus. Each atomic number identifies a specific element, but not the isotope; an atom of a given element may have a wide range in its number of neutrons. The number of both protons and neutrons in the nucleus is the atom's mass number, and each isotope of a given element has a different mass number. A compound wherein one or more atoms have an isotopic distribution for a chemical element in proportional amounts different to those usually found in nature is commonly referred to as being an isotopically labeled compound. Each chemical element as represented in a compound structure may include any isotopic distribution of said element. For example, in a compound structure a hydrogen atom may be explicitly disclosed or understood to be present in the compound. At any position of the compound that a hydrogen atom may be present, the hydrogen atom can be an isotopic distribution of hydrogen, including but not limited to protium ($^1$H) and deuterium ($^2$H) in proportional amounts to those usually found in nature and in proportional amounts different to those usually found in nature. Thus, reference herein to a compound encompasses all potential isotopic distributions for each atom unless the context clearly dictates otherwise. Examples of isotopes include isotopes of hydrogen, carbon, nitrogen, oxygen, phosphorous, sulfur, fluorine, chlorine, bromine and iodine. As one of skill in the art would appreciate, any of the compounds as disclosed and described herein may include radioactive isotopes. Accordingly, also contemplated is use of compounds as disclosed and described herein, wherein one or more atoms have an isotopic distribution different to those usually found in nature, such as having $^2$H or $^3$H in greater proportion, or $^{11}$C, $^{13}$C, or $^{14}$C in greater proportion than found in nature. By way of general example, and without limitation, isotopes of hydrogen include protium (H), deuterium ($^2$H) and tritium ($^3$H). Isotopes of carbon include carbon-11 ($^{11}$C), carbon-12 ($^{12}$C), carbon-13 ($^{13}$C), and carbon-14 ($^{14}$C). Isotopes of nitrogen include nitrogen-13 ($^{13}$N), nitrogen-14 ($^{14}$N) and nitrogen-15 ($^{15}$N). Isotopes of oxygen include oxygen-14 ($^{14}$O), oxygen-15 ($^{15}$O), oxygen-16 ($^{16}$O), oxygen-17 ($^{17}$O), and oxygen-18 ($^{18}$O). Isotope of fluorine include fluorine-17 ($^{17}$F), fluorine-18 ($^{18}$F) and fluorine-19 ($^{19}$F). Isotopes of phosphorous include phosphorus-31 ($^{31}$P), phosphorus-32 ($^{32}$P), phosphorus-33 ($^{33}$P), phosphorus-34 ($^{34}$P), phosphorus-35 ($^{35}$P) and phosphorus-36 ($^{36}$P). Isotopes of sulfur include sulfur-32 ($^{32}$S), sulfur-33 ($^{33}$S), sulfur-34 ($^{34}$S), sulfur-35 ($^{35}$S), sulfur-36 ($^{36}$S) and sulfur-38 ($^{38}$S). Isotopes of chlorine include chlorine-35 ($^{35}$Cl), chlorine-36 ($^{36}$Cl) and chlorine-37$^3$ ($^7$Cl). Isotopes of bromine include bromine-75 ($^{75}$Br), bromine-76 ($^{76}$Br), bromine-77 ($^{77}$Br), bromine-79 ($^{79}$Br), bromine-81 ($^{81}$Br) and bromine-82 ($^{82}$Br). Isotopes of iodine include iodine-123 ($^{123}$I), iodine-124 ($^{124}$I), iodine-125 ($^{125}$I), iodine-131 ($^{131}$I) and iodine-135 ($^{135}$I). In some embodiments, atoms at every position of the compound have an isotopic distribution for each chemical element in proportional amounts to those usually found in nature. In some embodiments, an atoms in one position of the compound has an isotopic distribution for a chemical element in proportional amounts different to those usually found in nature (remainder atoms having an isotopic distribution for a chemical element in proportional amounts to those usually found in nature). In some embodiments, atoms in at least two positions of the compound independently have an isotopic distribution for a chemical element in proportional amounts different to those usually found in nature (remainder atoms having an isotopic distribution for a chemical element in proportional amounts to those usually found in nature). In some embodiments, atoms in at least three positions of the compound independently have an isotopic distribution for a chemical element in proportional amounts different to those usually found in nature (remainder atoms having an isotopic distribution for a chemical element in proportional amounts to those usually found in nature). In some embodiments, atoms in at least four positions of the compound independently have an isotopic distribution for a chemical element in proportional amounts different to those usually found in nature (remainder atoms having an isotopic distribution for a chemical element in proportional amounts to those usually found in nature). In some embodiments, atoms in at least five positions of the compound independently have an isotopic distribution for a chemical element in proportional amounts different to those usually found in nature (remainder atoms having an isotopic distribution for a chemical element in proportional amounts to those usually found in nature). In some embodiments, atoms in at least six positions of the compound independently have an isotopic distribution for a chemical element in proportional amounts different to those usually found in nature (remainder atoms having an isotopic distribution for a chemical element in proportional amounts to those usually found in nature).

Certain compounds, for example those having radioactive isotopes such as $^3$H and $^{14}$C incorporated, are also useful in drug or substrate tissue distribution assays. Tritium ($^3$H) and carbon-14 ($^{14}$C) isotopes are particularly preferred for their ease of preparation and detectability. Compounds with isotopes such as deuterium ($^2$H) in proportional amounts greater than is usually found in nature may afford certain therapeutic advantages resulting from greater metabolic stability, such as, for example, increased in vivo half-life or reduced dosage requirements. Isotopically labeled compounds can generally be prepared by performing procedures routinely practiced in the art. Methods are readily available to measure such isotope perturbations or enrichments, such as, mass spectrometry, and for isotopes that are radioisotopes additional methods are available, such as, radiodetectors used in connection with HPLC or GC.

As used herein, "isotopic variant" means a compound that contains an unnatural proportion of an isotope at one or more of the atoms that constitute such a compound. In certain embodiments, an "isotopic variant" of a compound contains unnatural proportions of one or more isotopes, including, but not limited to, protium ($^1$H), deuterium ($^2$H), tritium (H), carbon-11 ($^{11}$C), carbon-12 ($^{12}$C), carbon-13 ($^{13}$C), carbon-14 ($^{14}$C), nitrogen-13 ($^{13}$N), nitrogen-14 ($^{14}$N), nitrogen-15 ($^{15}$N), oxygen-14 ($^{14}$O), oxygen-15 ($^{15}$O), oxygen-16 ($^{16}$O), oxygen-17 ($^{17}$O), oxygen-18 ($^{18}$O), fluorine-17 ($^{17}$F), fluorine-18 ($^{18}$F), phosphorus-31 ($^{31}$P), phosphorus-32 ($^{32}$P), phosphorus-33 ($^{33}$P), sulfur-32 ($^{32}$S), sulfur-33 ($^{33}$S), sulfur-34 ($^{34}$S), sulfur-35 ($^{35}$S), sulfur-36 ($^{36}$S), chlorine-35 ($^{35}$Cl), chlorine-36 ($^{36}$Cl), chlorine-37 ($^{37}$Cl), bromine-79 ($^{79}$Br), bromine-81 ($^{81}$Br), iodine-123 ($^{123}$I), iodine-125 ($^{125}$I), iodine-127 ($^{127}$I), iodine-129 ($^{129}$I), and iodine-131 ($^{131}$I). In certain embodiments, an "isotopic variant" of a compound is in a stable form, that is, non-radioactive. In certain embodiments, an "isotopic variant" of a compound contains unnatural proportions of one or more isotopes, including, but not limited to, hydrogen ($^1$H), deuterium ($^2$H), carbon-12 ($^{12}$C), carbon-13 ($^{13}$C), nitrogen-14 ($^{14}$N), nitrogen-15 ($^{15}$N), oxygen-16 ($^{16}$O), oxygen-17 ($^{17}$O), and oxygen-18 ($^{18}$O). In certain embodiments, an "isotopic variant" of a compound is in an unstable form, that is, radioactive. In certain embodiments, an "isotopic variant" of a compound of the invention contains unnatural proportions of one or more isotopes, including, but not limited to, tritium ($^3$H), carbon-11 ($^{11}$C), carbon-14 ($^{14}$C), nitrogen-13 ($^{13}$N), oxygen-14 ($^{14}$O), and oxygen-1 ($^{15}$O). It will be understood that, in a compound as provided herein, any hydrogen can include $^2$H as the major isotopic form, as example, or any carbon include be $^{13}$C as the major isotopic form, as example, or any nitrogen can include $^{15}$N as the major isotopic form, as example, and any oxygen can include 180 as the major isotopic form, as example. In certain embodiments, an "isotopic variant" of a compound contains an unnatural proportion of deuterium ($^2$H).

With regard to the compounds provided herein, when a particular atomic position is designated as having deuterium or "D" or "d", it is understood that the abundance of deuterium at that position is substantially greater than the natural abundance of deuterium, which is about 0.015%. A position designated as having deuterium typically has a minimum isotopic enrichment factor of, in certain embodiments, at least 3500 (52.5% deuterium incorporation), at least 4000 (60% deuterium incorporation), at least 4500 (67.5% deuterium incorporation), at least 5000 (75% deuterium incorporation), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation) at each designated deuterium position.

Some embodiments provide a compound having a structure of the following formula:

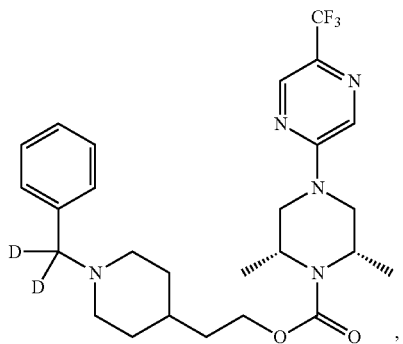 [SMILES: [2H]C([2H])(c1ccccc1)N1CCC(CCOC(=O)N2[C@H](C)CN(c3cnc(C(F)(F)F)cn3)C[C@@H]2C)CC1]

or a pharmaceutically acceptable salt thereof.

Some embodiments provide a compound having a structure of the following formula:

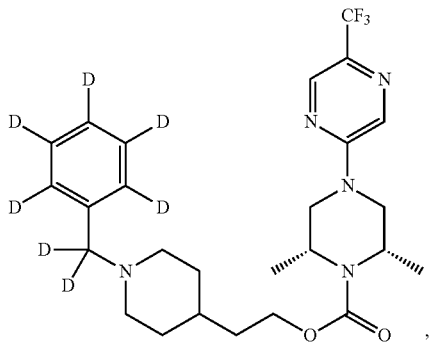

or a pharmaceutically acceptable salt thereof.

Some embodiments provide a compound having a structure of the following formula:

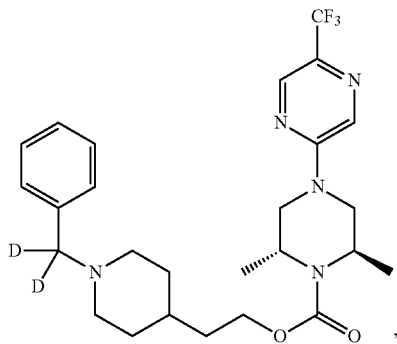

or a pharmaceutically acceptable salt thereof.

Some embodiments provide a compound having a structure of the following formula:

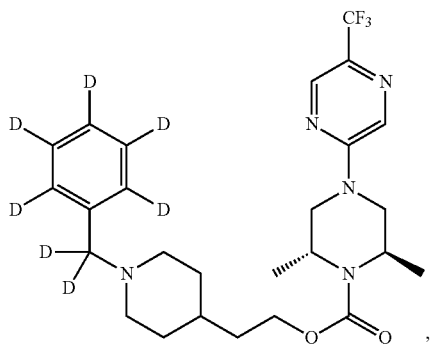 [SMILES: [2H]c1c([2H])c([2H])c(C([2H])([2H])N2CCC(CCOC(=O)N3[C@H](C)CN(c4cnc(C(F)(F)F)cn4)C[C@H]3C)CC2)c([2H])c1[2H]]

or a pharmaceutically acceptable salt thereof.

Some embodiments provide a compound having a structure of the following formula:

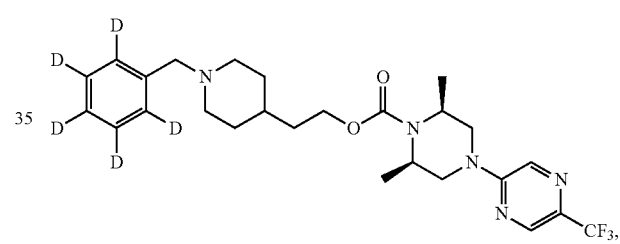

or a pharmaceutically acceptable salt thereof.

Methods of Preparation

Some embodiments provide a method for preparing a compound of Formula (I), or a salt thereof,

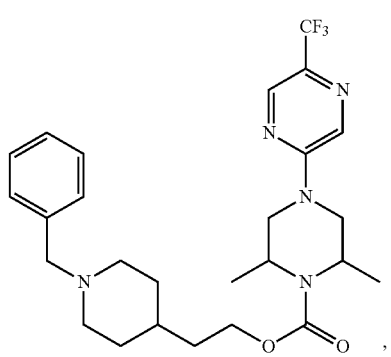

(I)

comprising:
(a) reacting a compound of Formula (III)

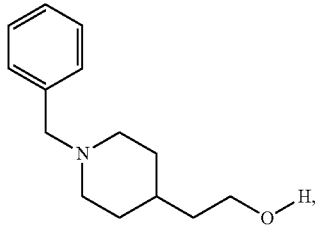
(III)

or a salt thereof.
with a reagent of the following formula

to form a mixture, wherein the reagent

is selected from N,N'-disuccinimidyl carbonate, 1,1'-carbonyldiimidazole, phosgene, and triphosgene; and
(b) treating the mixture formed in the step (a) with a compound of Formula (IV)

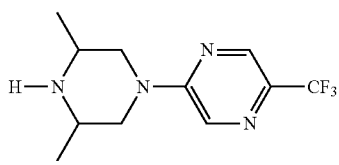
(IV)

or a salt thereof, to provide the compound of Formula (I).

In some embodiments, the compound of Formula IV is a compound of Formula (IVa)

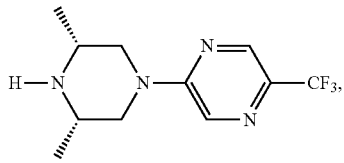
(IVa)

or a salt thereof.

In some embodiments, the compound of Formula IV is a compound of Formula (IVb)

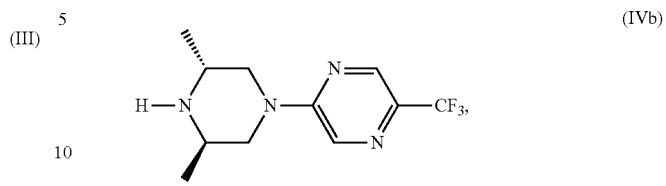
(IVb)

or a salt thereof.

In some embodiments, the method further comprising reacting a compound of Formula (V)

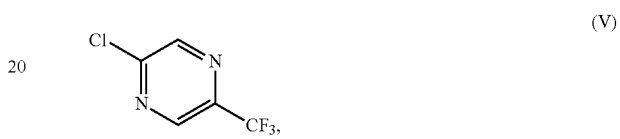
(V)

or a salt thereof, with a compound of Formula (VIa)

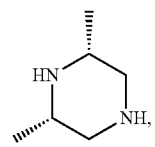
(VIa)

or a salt thereof,
to provide a HCl salt of the compound of Formula (IVa). In some further embodiments, the method further comprises treating the HCl salt of the compound of Formula (IVa) with a base to provide a free base of the compound of Formula (IVa). In a further embodiment, the base is selected from NaOH, $Na_2CO_3$, $NaHCO_3$, $K_3PO_4$, $K_2HPO_4$, $K_2CO_3$, $KHCO_3$, $Cs_2CO_3$ and $CsHCO_3$, or a mixture thereof. In another further embodiment, the base is sodium hydroxide.

In some embodiments, the method further comprising reacting a compound of Formula (V)

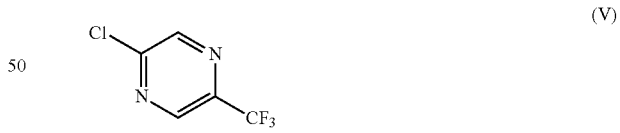
(V)

or a salt thereof, with a compound of Formula (VIb)

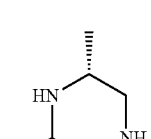
(VIb)

or a salt thereof,
to provide a HCl salt of the compound of Formula (IVb). In some further embodiments, the method further comprises treating the HCl salt of the compound of Formula (IVb) with a base to provide a free base of the compound of Formula (IVb). In a further embodiment, the base is selected from NaOH, $Na_2CO_3$, $NaHCO_3$, $K_3PO_4$, $K_2HPO_4$, $K_2CO_3$, $KHCO_3$, $Cs_2CO_3$ and $CsHCO_3$, or a mixture thereof. In another further embodiment, the base is sodium hydroxide.

In some embodiments, the reagent

is N,N'-disuccinimidyl carbonate.

In some embodiments, step (b) comprises treating the mixture formed in the step (a) with a compound of Formula (IV) and an amine base. In some embodiments, the amine base is selected from triethylamine (TEA), diisopropylethylamine (DIPEA), N-methylmorpholine (NMM), tri-tert-butylpyrimidine (TTBP), 1,4-diazabicyclo-[2.2.2]octane (DABCO), 1,8-diazabicyclo[5.4.0]undec-7-ene (DBU), 1,5-Diazabicyclo[4.3.0]non-5-ene (DBN), N,N-diethylaniline, pyridine, 2,6-lutidine, 2,4,6-collidine, 4-dimethylaminopyridine (DMAP), quinuclidine, 2,6-di-tert-butylpyridine. In a further embodiment, the amine base is N,N'-diisopropylethylamine (DIPEA).

In some embodiments, the compound of Formula I is a compound of Formula (Ia)

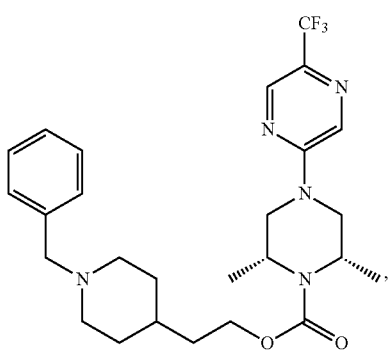

or a salt thereof.

In some embodiments, the compound of Formula I is a compound of Formula (Ib)

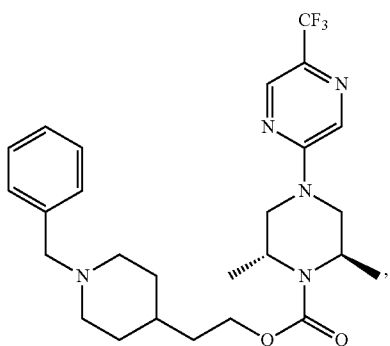

or a salt thereof.

In some embodiments, the compound of Formula (IV), (IVa) and (IVb) are not substantially isolated. In some embodiments, the compound of Formula (IV), (IVa) and (IVb) are substantially isolated.

Synthetic methods for incorporating radioisotopes into organic compounds are applicable to compounds of the invention and are well known in the art. These synthetic methods, for example, incorporating activity levels of tritium into target molecules, are as follows:

A. Catalytic Reduction with Tritium Gas: This procedure normally yields high specific activity products and requires halogenated or unsaturated precursors.

B. Reduction with Sodium Borohydride [$^3$H]: This procedure is rather inexpensive and requires precursors containing reducible functional groups such as aldehydes, ketones, lactones, esters and the like.

C. Reduction with Lithium Aluminum Hydride [$^3$H]: This procedure offers products at almost theoretical specific activities. It also requires precursors containing reducible functional groups such as aldehydes, ketones, lactones, esters and the like.

D. Tritium Gas Exposure Labeling: This procedure involves exposing precursors containing exchangeable protons to tritium gas in the presence of a suitable catalyst.

E. N-Methylation using Methyl Iodide [$^3$H]: This procedure is usually employed to prepare O-methyl or N-methyl ($^3$H) products by treating appropriate precursors with high specific activity methyl iodide ($^3$H). This method in general allows for higher specific activity, such as for example, about 70-90 Ci/mmol.

Synthetic methods for incorporating activity levels of $^{125}$I into target molecules include:

A. Sandmeyer and like reactions: This procedure transforms an aryl amine or a heteroaryl amine into a diazonium salt, such as a diazonium tetrafluoroborate salt and subsequently to $^{125}$I labeled compound using Na$^{125}$I. A representative procedure was reported by Zhu, G-D. and co-workers in J. Org. Chem., 2002, 67, 943-948.

B. Ortho $^{125}$Iodination of phenols: This procedure allows for the incorporation of $^{125}$I at the ortho position of a phenol as reported by Collier, T. L. and co-workers in J. Labelled Compd. Radiopharm., 1999, 42, S264-S266.

C. Aryl and heteroaryl bromide exchange with $^{125}$I: This method is generally a two step process. The first step is the conversion of the aryl or heteroaryl bromide to the corresponding tri-alkyltin intermediate using for example, a Pd catalyzed reaction [i.e. Pd(Ph$_3$P)$_4$] or through an aryl or heteroaryl lithium, in the presence of a tri-alkyltinhalide or hexaalkylditin [e.g., (CH$_3$)$_3$SnSn(CH$_3$)$_3$]. A representative procedure was reported by Le Bas, M. D. and co-workers in J. Labelled Compd. Radiopharm. 2001, 44, S280-S282.

A radiolabeled form of a compound of the invention can be used in a screening assay to identify/evaluate compounds. In general terms, a newly synthesized or identified compound (i.e., test compound) can be evaluated for its ability to reduce binding of a radiolabeled form of a compound disclosed herein to M4. The ability of a test compound to compete with a radiolabeled form of a compound of the invention for the binding to a M4 correlates to its binding affinity.

Combinations of Embodiments

It is further appreciated that certain features of the present disclosure, which are, for clarity, described in the context of separate embodiments, can also be provided in combination in a single embodiment. Conversely, various features of the present disclosure which are, for brevity, described in the context of a single embodiment, can also be provided separately or in any suitable subcombination.

Chemical Definitions

Unless defined otherwise, all technical and scientific terms used herein have the same meaning as is commonly understood by one of ordinary skill in the art to which this disclosure belongs. All patents, applications, published applications, and other publications are incorporated by reference in their entirety. In the event that there is a plurality of definitions for a term herein, those in this section prevail unless stated otherwise.

As used herein, the abbreviations for any protective groups, amino acids and other compounds, are, unless indicated otherwise, in accord with their common usage, recognized abbreviations, or the IUPAC-IUB Commission on Biochemical Nomenclature (See, Biochem. 11:942-944 (1972)).

The phrase "pharmaceutically acceptable" is employed herein to refer to those compounds, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The compounds described herein may be used in neutral form such as a free acid or free base form. Alternatively, the compounds may be used in the form of acid or base addition salts. The term "pharmaceutically acceptable salt" refers to salts of a compound having an acidic or basic moiety which are not biologically or otherwise undesirable for use in a pharmaceutical. In many cases, the compounds disclosed herein are capable of forming acid and/or base salts by virtue of the presence of an acidic or basic moiety (e.g. amino and/or carboxyl groups or groups similar thereto). Pharmaceutically acceptable acid addition salts can be formed by combining a compound having a basic moiety with inorganic acids and organic acids. Lists of suitable salts are found in WO 87/05297, Johnston et al., published Sep. 11, 1987; Remington's Pharmaceutical Sciences, 17th ed., Mack Publishing Company, Easton, Pa., 1985, p. 1418; and J. Pharm. Sci., 66, 2 (1977), each of which is incorporated herein by reference in its entirety. A reference for the preparation and selection of pharmaceutical salts of the present disclosure is P. H. Stahl & C. G. Wermuth "Handbook of Pharmaceutical Salts," *Verlag Helvetica Chimica Acta*, Zurich, 2002 which is incorporated herein by reference in its entirety. A pharmaceutically acceptable salt may be derived from a variety of organic and inorganic counter-ions well known in the art. Such salts include, but are not limited to: (1) acid addition salts formed with organic or inorganic acids such as hydrochloric, hydrobromic, sulfuric, nitric, phosphoric, sulfamic, acetic, trifluoroacetic, trichloroacetic, propionic, hexanoic, cyclopentylpropionic, glycolic, glutaric, pyruvic, lactic, malonic, succinic, sorbic, ascorbic, malic, maleic, fumaric, tartaric, citric, benzoic, 3-(4-hydroxybenzoyl)benzoic, picric, cinnamic, mandelic, phthalic, lauric, methanesulfonic, ethanesulfonic, 1,2-ethane-disulfonic, 2-hydroxyethanesulfonic, benzenesulfonic, 4-chlorobenzenesulfonic, 2-naphthalenesulfonic, 4-toluenesulfonic, camphoric, camphorsulfonic, 4-methylbicyclo[2.2.2]-oct-2-ene-1-carboxylic, glucoheptonic, 3-phenylpropionic, trimethylacetic, tert-butylacetic, lauryl sulfuric, gluconic, benzoic, glutamic, hydroxynaphthoic, salicylic, stearic, cyclohexylsulfamic, quinic, muconic acid and the like acids; or (2) salts formed when an acidic proton present in the parent compound either (a) is replaced by a metal ion, e.g., an alkali metal ion, an alkaline earth ion or an aluminum ion, or alkali metal or alkaline earth metal hydroxides, such as sodium, potassium, calcium, magnesium, aluminum, lithium, zinc, and barium hydroxide, ammonia, or (b) coordinates with an organic base, such as aliphatic, alicyclic, or aromatic organic amines, such as ammonia, methylamine, dimethylamine, diethylamine, picoline, ethanolamine, diethanolamine, triethanolamine, ethylenediamine, lysine, arginine, ornithine, choline, N,N'-dibenzylethylene-diamine, chloroprocaine, diethanolamine, procaine, N-benzylphenethylamine, N-methylglucamine piperazine, tris(hydroxymethyl)-aminomethane, tetramethylammonium hydroxide, and the like. Pharmaceutically acceptable salts further include, by way of example only and without limitation, sodium, potassium, calcium, magnesium, ammonium, tetraalkylammonium, and the like, and when the compound contains a basic functionality, salts of non-toxic organic or inorganic acids, such as hydrohalides, e.g. hydrochloride and hydrobromide, sulfate, phosphate, sulfamate, nitrate, acetate, trifluoroacetate, trichloroacetate, propionate, hexanoate, cyclopentylpropionate, glycolate, glutarate, pyruvate, lactate, malonate, succinate, sorbate, ascorbate, malate, maleate, fumarate, tartrate, citrate, benzoate, 3-(4-hydroxybenzoyl)benzoate, picrate, cinnamate, mandelate, phthalate, laurate, methanesulfonate (mesylate), ethanesulfonate, 1,2-ethane-disulfonate, 2-hydroxyethanesulfonate, benzenesulfonate (besylate), 4-chlorobenzenesulfonate, 2-naphthalenesulfonate, 4-toluenesulfonate, camphorate, camphorsulfonate, 4-methylbicyclo[2.2.2]-oct-2-ene-1-carboxylate, glucoheptonate, 3-phenylpropionate, trimethylacetate, tert-butylacetate, lauryl sulfate, gluconate, benzoate, glutamate, hydroxynaphthoate, salicylate, stearate, cyclohexylsulfamate, quinate, muconate, and the like.

Preparations

As used herein, a "preparation" is the product of a process used to make a salt of a compound of Formula I, wherein the preparation contains at least one other component in addition to the compound.

As used herein, a "chemical entity" defined in the context of a "preparation," refers to a compound of Formula I and at least one other component in addition to the compound. For example, a chemical entity may be a salt of a compound of Formula I such as a hydrochloride salt of a compound of Formula I.

Some embodiments provide a preparation comprising a hydrochloride salt of Formula (II):

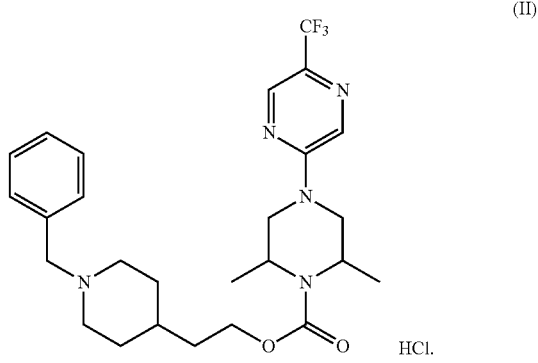 [SMILES: CC1CN(c2cnc(C(F)(F)F)cn2)CC(C)N1C(=O)OCCC1CCN(Cc2ccccc2)CC1]

(II)

Some embodiments provide a preparation comprising a hydrochloride salt of Formula (IIa):

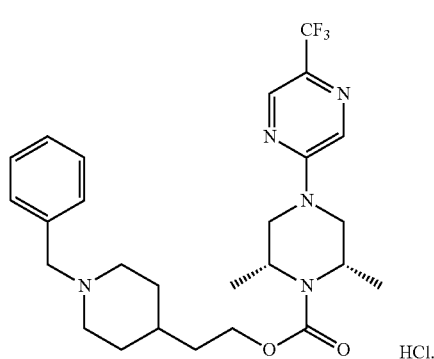

(IIa)

Some embodiments provide a preparation comprising a hydrochloride salt of Formula IIb:

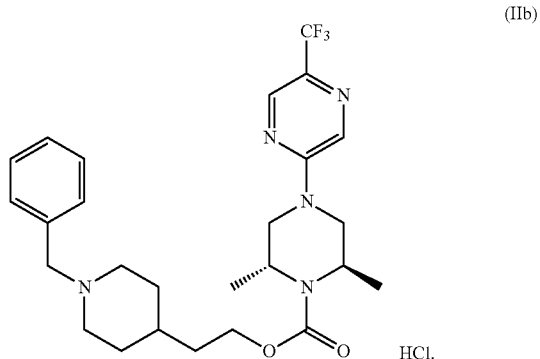 [SMILES: C[C@@H]1CN(c2cnc(C(F)(F)F)cn2)C[C@@H](C)N1C(=O)OCCC1CCN(Cc2ccccc2)CC1]

(IIb)

In some embodiments, the compound of the preparation is present in at least 5%, 10%, 20%, 30%, 40%, 50%, 60%, 70%, 80%, 90%, 95%, 99%, or 99.9% enantiomeric excess, or an enantiomeric excess within a range defined by any of the preceding numbers. In some embodiments, the compound of the preparation is present in at least 90%, 91%, 92%, 93%, 94%, 95%, 96%, 97%, 98%, 99%, or 99.9% enantiomeric excess, or an enantiomeric excess within a range defined by any of the preceding numbers.

In some embodiments, the preparation comprises at least 5%, 10%, 20%, 30%, 40%, 50%, 60%, 70%, 80%, 90%, or 93% by weight of the compound, or a % by weight within a range defined by any of the preceding numbers. In some embodiments, the preparation comprises at least 50%, 60%, 70%, 80%, 90%, or 93% by weight of the compound, or a % by weight within a range defined by any of the preceding numbers. In some embodiments, the preparation comprises at most 50%, 60%, 70%, 80%, 90%, 93% or 95% by weight of the compound, or a % by weight within a range defined by any of the preceding numbers.

In some embodiments, the preparation comprises at least 50% by weight of the compound. In some embodiments, the preparation is in the form of a solid, i.e., a solid preparation. In some embodiments, the preparation is used to prepare a pharmaceutical composition.

Disorders, Symptoms, Uses, and Methods of Treatment

The compounds disclosed and described herein are muscarinic receptor antagonists. Accordingly, the compounds and salts or their polymorphs thereof can be used in methods of antagonizing a muscarinic receptor (e.g., muscarinic receptor 4) by contacting the receptor. In some embodiments, the compounds and salts or polymorphs thereof can be used in methods of antagonizing muscarinic receptor 4 (i.e., M4) in a patient in need thereof by administering an effective amount of a compound or salt thereof. In some embodiments, the contacting is in vivo. In some embodiments, the contacting is ex vivo.

The compounds provided herein can be selective. As used herein, the term "selective" is meant that the compound antagonizes the M4 receptor with greater affinity or potency, compared to at least one other muscarinic receptor (e.g., M1, M2, M3, and/or M5). In some embodiments, selectivity is at least about 2-fold, 3-fold, 5-fold, 10-fold, 20-fold, 50-fold, or 100-fold over at least one other muscarinic receptor as measured by the assays described herein.

Methods are provided herein for treating or preventing (i.e., reducing the likelihood of occurrence) a neurological disease/disorder or symptom, including but not limited to Tourette's syndrome (TS), Alzheimer's Disease (AD), schizophrenia, Lewy Body Dementia (LBD), cognitive deficits associated with schizophrenia, Parkinson's Disease, parkinsonism, tremor, dyskinesias, excessive daytime sleepiness, dystonia, chorea, levodopa induced dyskinesia, attention deficit hyperactivity disorder (ADHD), cerebral palsy, progressive supranuclear palsy (PSP), Multiple System Atrophy (MSA), Huntington's disease (HD), and chorea associate with Huntington's disease. While some of these diseases/disorders or symptoms are considered cognitive disorders (e.g., Alzheimer's Disease), and other diseases are considered neurological movement diseases/disorders, several have both cognitive and movement deficiencies or conditions associated with them (e.g., Parkinson's Disease, Huntington's disease).

The effectiveness of a muscarinic receptor antagonist, such as a M4 antagonist, with respect to treating a neurological condition, disease or disorder or symptom described herein can readily be determined by a person skilled in the medical and clinical arts. One or any combination of diagnostic methods appropriate for the particular disease or disorder or symptom, which methods are well known to a person skilled in the art, including physical examination, patient self-assessment, assessment and monitoring of clinical symptoms, performance of analytical tests and methods, including clinical laboratory tests, physical tests, and exploratory surgery, for example, may be used for monitoring the health status of the subject and the effectiveness of the antagonist. The effects of the methods of treatment described herein can be analyzed using techniques known in the art, such as comparing symptoms of patients suffering from or at risk of a particular disease or disorder that have received the pharmaceutical composition comprising an antagonist to those patients who were not treated with the antagonist or who received a placebo treatment.

The compounds disclosed herein (and pharmaceutically acceptable salts or polymorphs thereof) are useful in the treatment or prevention of several diseases, disorders, conditions, or symptoms. One of skill in the art will recognize that when a disease, disorder, or symptom, or a method of treatment or prevention, is disclosed herein, such disclosure encompasses second medical uses (e.g., a compound or a pharmaceutically acceptable salt or a polymorph thereof for use in the treatment of the disease, disorder or symptom, use of a compound or a pharmaceutically acceptable salt or a polymorph thereof for the treatment of the disease, disorder or symptom, and use of a compound or a pharmaceutically acceptable salt or a polymorph thereof in the manufacture of a medicament for the treatment of the disease, disorder, or symptom).

In some embodiments, the compounds disclosed herein (and pharmaceutically acceptable salts or polymorphs thereof) are useful for the treatment or prevention of a disease, disorder or a symptom. In some embodiments, the compounds disclosed herein (and pharmaceutically acceptable salts or polymorphs thereof) are useful for the treatment or prevention of a subtype of a disease, disorder, or a symptom. In some embodiments, the compounds disclosed herein (and pharmaceutically acceptable salts or polymorphs thereof) are useful for the treatment or prevention of a symptom of a disease or disorder.

Provided herein are methods for treating or preventing a neurological disease, disorder, or symptom with a compound of the present invention (and pharmaceutically acceptable salts or polymorphs thereof). In some embodiments are methods for treating a neurological disease, disorder, or symptom with a compound of the present invention (and pharmaceutically acceptable salts or polymorphs thereof). In some embodiments are methods for preventing a neurological disease, disorder, or symptom with a compound of the present invention (and pharmaceutically acceptable salts or polymorphs thereof).

Provided herein are compounds of the present invention (and pharmaceutically acceptable salts or polymorphs thereof) that are useful for treating or preventing a neurological disease, disorder, or symptom. Provided herein are compounds of the present invention (and pharmaceutically acceptable salts or polymorphs thereof) that are useful for treating a neurological disease, disorder, or symptom. Provided herein are compounds of the present invention (and pharmaceutically acceptable salts or polymorphs thereof) that are useful for preventing a neurological disease, disorder, or symptom associated with M4 activity.

One aspect of the present invention relates to methods for treating or preventing a neurological disease, disorder, or symptom in an individual, comprising administering to the individual in need thereof, a therapeutically effective amount of a compound according of the present invention or a pharmaceutically acceptable salt thereof; a pharmaceutical product of the present invention; or a pharmaceutical composition of the present invention.

One aspect of the present invention relates to methods for treating or preventing a muscarinic receptor 4 (M4) mediated disease, disorder or symptom in an individual, comprising administering to said individual in need thereof, a therapeutically effective amount of a compound according of the present invention or a pharmaceutically acceptable salt or polymorph thereof; a pharmaceutical product of the present invention; or a pharmaceutical composition of the present invention.

One aspect of the present invention relates to uses of a compound of the present invention or a pharmaceutically acceptable salt or polymorph thereof in the manufacture of a medicament for treating or preventing a neurological disease, disorder, or symptom in an individual.

One aspect of the present invention relates to uses of a compound of the present invention or a pharmaceutically acceptable salt or polymorph thereof in the manufacture of a medicament for treating or preventing a muscarinic receptor 4 (M4) mediated disease, disorder or symptom in an individual.

One aspect of the present invention relates to compounds of the present invention or a pharmaceutically acceptable salt or polymorph thereof; pharmaceutical products of the present invention; or pharmaceutical compositions of the present invention; for use in a method of treatment or prophylaxis of the human or animal body by therapy.

One aspect of the present invention relates to compounds of the present invention or a pharmaceutically acceptable salt or polymorph thereof; pharmaceutical products of the present invention; or pharmaceutical compositions of the present invention; for use in a method for treating or preventing a neurological disease, disorder, or symptom in an individual.

One aspect of the present invention relates to compounds of the present invention or a pharmaceutically acceptable salt or polymorph thereof; pharmaceutical products of the present invention; or pharmaceutical compositions of the present invention; for use in a method for treating or preventing a muscarinic receptor 4 (M4) mediated neurological disease, disorder, or symptom in an individual.

One aspect of the present invention relates to use of a compound, a pharmaceutically acceptable salt, or a crystalline form thereof for treatment of a neurological disease, disorder or symptom in a patient.

One aspect of the present invention relates to use of a compound, a pharmaceutically acceptable salt, or a crystalline form thereof for manufacture of a medicament for treating a neurological disease, disorder or symptom in a patient.

In some embodiments, the neurological disease, disorder, or symptom is selected from Tourette's syndrome (TS), Alzheimer's Disease (AD), schizophrenia, Lewy Body Dementia (LBD), cognitive deficits associated with schizophrenia, Parkinson's Disease, parkinsonism, tremor, dyskinesias, excessive daytime sleepiness, dystonia, chorea, levodopa induced dyskinesia, attention deficit hyperactivity disorder (ADHD), cerebral palsy, progressive supranuclear palsy (PSP), Multiple System Atrophy (MSA), Huntington's disease (HD), and chorea associate with Huntington's disease.

In some embodiments, the neurological disease, disorder, or symptom is Tourette's syndrome (TS).

In some embodiments, the neurological disease, disorder, or symptom is schizophrenia.

In some embodiments, the neurological disease, disorder, or symptom is progressive supranuclear palsy.

In some embodiments, the neurological disease, disorder, or symptom is tremor. In some further embodiments, the neurological disease, disorder, or symptom is parkinsonian tremor.

In some embodiments, the neurological disease, disorder, or symptom is parkinsonism. In some further embodiments, the parkinsonism is drug induced parkinsonism. In some further embodiments, one or more symptoms of parkinsonism is selected from tremor, bradykinesia, rigidity, and postural instability.

In some embodiments, the neurological disease, disorder, or symptom is Parkinson's disease (PD).

In some embodiments, the neurological disease, disorder, or symptom is Lewy body dementia (LBD).

In some embodiments, the neurological disease, disorder, or symptom is levodopa induced dyskinesia.

In some embodiments, the neurological disease, disorder, or symptom is Huntington's disease (HD).

In some embodiments, the neurological disease, disorder, or symptom is excessive daytime sleepiness.

In some embodiments, the neurological disease, disorder, or symptom is dystonia. In some embodiments, the dystonia is generalized dystonia. In some further embodiments, the generalized dystonia is Oppenheim's dystonia or DYT1 dystonia. In some other further embodiments, the generalized dystonia is non-DYT1 generalized dystonia. In some embodiments, the dystonia is focal dystonia. In some embodiments, the dystonia is caused by infections. In some embodiments, the dystonia is caused by birth injury. In a further embodiment, the birth injury is cerebral palsy.

In some embodiments, the neurological disease, disorder, or symptom is dyskinesias.

In some embodiments, the neurological disease, disorder, or symptom is cognitive deficits associated with schizophrenia.

In some embodiments, the neurological disease, disorder, or symptom is chorea.

In some embodiments, the neurological disease, disorder, or symptom is chorea associated with Huntington's disease (HD).

In some embodiments, the neurological disease, disorder, or symptom is cerebral palsy.

In some embodiments, the neurological disease, disorder, or symptom is attention deficit hyperactivity disorder (ADHD).

In some embodiments, the neurological disease, disorder, or symptom is Alzheimer's disease (AD).

As used herein, the term "subject" refers to any animal, including mammals, preferably mice, rats, other rodents, rabbits, dogs, cats, swine, cattle, sheep, horses, or primates, and most preferably humans. In the context of a clinical trial or screening or activity experiment the subject may be a healthy volunteer or healthy participant without an underlying M4 mediated disorder or condition or a volunteer or participant that has received a diagnosis for a disorder or condition in need of medical treatment as determined by a health care professional. In the context outside of a clinical trial a subject under the care of a health care professional who has received a diagnosis for a disorder or condition is typically described as a patient.

The term "pediatric subject" as used herein refers to a subject under the age of 21 years at the time of diagnosis or treatment. The term "pediatric" can be further divided into various subpopulations including: neonates (from birth through the first month of life); infants (1 month up to two years of age); children (two years of age up to 12 years of age); and adolescents (12 years of age through 21 years of age (up to, but not including, the twenty-second birthday)) see e.g., Berhman et al., *Textbook of Pediatrics*, 15th Ed. Philadelphia: W.B. Saunders Company, 1996; Rudolph et al., *Rudolph's Pediatrics*, 21st Ed. New York: McGraw-Hill, 2002; and Avery et al., *Pediatric Medicine*, 2nd Ed. Baltimore: Williams & Wilkins; 1994.

As used herein, the terms "treat" and "treatment" refer to medical management of a disease, disorder, symptom, or condition of a subject (i.e., patient) (see, e.g., Stedman's Medical Dictionary). In general, an appropriate dose and treatment regimen provide the M4 antagonist in an amount sufficient to provide therapeutic and/or prophylactic benefit. The term "treat" or "treatment" includes slowing, retarding, reducing, or reversing a disease, disorder, or an undesired physiological change or a symptom associated with the disease or disorder. The term "treat" or "treatment" also includes preventing, slowing, or retarding the expansion or severity of such disease, disorder, or symptom. As discussed herein, effectiveness of the treatment by the one or more M4 antagonists may include beneficial or desired clinical results that comprise, but are not limited to, abatement, lessening, or alleviation of symptoms that result from or are associated with the disease or disorder to be treated; decreased occurrence of symptoms associated with the disease or disorder to be treated; improved quality of life; longer disease-free status (i.e., decreasing the likelihood or the propensity that a subject will present symptoms on the basis of which a diagnosis of a disease or disorder is made); diminishment of extent of disease or disorder; stabilized (i.e., not worsening) state of disease or disorder; delay or slowing of disease or disorder progression; amelioration or palliation of the disease or disorder state; and remission (whether partial or total), whether detectable or undetectable; and/or overall survival.

The term "treat" and "treatment" can also mean prolonging survival when compared to expected survival if a subject were not receiving treatment. Subjects in need of treatment include those who already have the disease or disorder as well as subjects prone to have or at risk of developing the disease or disorder, and those in which the disease, condition, disorder, or symptom is to be prevented (i.e., decreasing the likelihood of occurrence or recurrence of the disease or disorder).

The term "preventing," as used herein, means the prevention of the onset, recurrence or spread, in whole or in part, of the disease or condition as described herein, or a symptom thereof.

The term "administration" or "administering" refers to a method of giving a dosage of a compound or pharmaceutical formulation to a vertebrate or invertebrate, including a mammal, a bird, a fish, or an amphibian. The preferred method of administration can vary depending on various factors, e.g., the components of the pharmaceutical formulation, the site of the disease, and the severity of the disease.

As used herein, "therapeutically effective amount" is an amount of the compound of the invention, or a pharmaceutically acceptable salt thereof, or an amount of a pharmaceutical composition comprising the compound of the invention, or a pharmaceutically acceptable salt thereof, which is sufficient to achieve the desired effect and can vary according to the nature and severity of the disease condition, and the potency of the compound. A therapeutic effect is the relief, to some extent, of one or more of the symptoms of the disease, and can include curing a disease. "Curing" means that the symptoms of active disease are eliminated. However, certain long-term or permanent effects of the disease can exist even after a cure is obtained (such as, e.g., extensive tissue damage).

Pharmaceutical Compositions, Formulation, and Dosage Forms

The present disclosure further provides for compositions comprising any of the compounds as disclosed and described herein (e.g., a compound of Formula (I) or Formula (Ia), including specific compounds described herein) or pharmaceutically acceptable salts or polymorphs thereof, and an excipient such as a pharmaceutically acceptable excipient for use in the methods for treating M4 mediated diseases or disorders. In some embodiments, the pharmaceutical composition comprise a compound selected from Formulas (I), (Ia) and (Ib) free base. In some embodiments, the pharmaceutical composition comprises a pharmaceutically acceptable salt of 2-(1-benzylpiperidin-4-yl)ethyl (2R,6S)-2,6-dimethyl-4-[5-(trifluoromethyl)pyrazin-2-yl]piperazine-1-carboxylate. In a further embodiment, the pharmaceutical acceptable salt of 2-(1-benzylpiperidin-4-yl) ethyl (2R,6S)-2,6-dimethyl-4-[5-(trifluoromethyl)pyrazin-2-yl]piperazine-1-carboxylate is a hydrochloride salt. In some embodiments, the pharmaceutical composition comprises a crystalline form of 2-(1-benzylpiperidin-4-yl)ethyl (2R,6S)-2,6-dimethyl-4-[5-(trifluoromethyl)pyrazin-2-yl] piperazine-1-carboxylate. In a further embodiment, the crystalline form is Form I of Formula (Ia). In another further embodiment, the crystalline form is Form II of Formula (Ia).

A pharmaceutically acceptable excipient is a physiologically and pharmaceutically suitable non-toxic and inactive material or ingredient that does not interfere with the activity of the drug substance; an excipient also may be called a carrier. The formulation methods and excipients described herein are exemplary and are in no way limiting. Pharmaceutically acceptable excipients are well known in the pharmaceutical art and described, for example, in Rowe et al., Handbook of Pharmaceutical Excipients: A Comprehensive Guide to Uses, Properties, and Safety, 5th Ed., 2006, and in Remington: The Science and Practice of Pharmacy (Gennaro, 21st Ed. Mack Pub. Co., Easton, PA (2005)). Exemplary pharmaceutically acceptable excipients include sterile saline and phosphate buffered saline at physiological pH. Preservatives, stabilizers, dyes, buffers, and the like may be provided in the pharmaceutical composition. In addition, antioxidants and suspending agents may also be used.

For compositions formulated as liquid solutions, acceptable carriers and/or diluents include saline and sterile water, and may optionally include antioxidants, buffers, bacteriostats and other common additives. The compositions can also be formulated as pills, capsules, granules, or tablets which contain, in addition to an M4 antagonist, diluents, dispersing and surface-active agents, binders, and lubricants. One skilled in this art may further formulate the M4 antagonist in an appropriate manner, and in accordance with accepted practices, such as those disclosed in Remington, supra.

Methods of administration include systemic administration of an M4 antagonist described herein, preferably in the form of a pharmaceutical composition as discussed above. As used herein, systemic administration includes oral and parenteral methods of administration. For oral administration, suitable pharmaceutical compositions include powders, granules, pills, tablets, and capsules as well as liquids, syrups, suspensions, and emulsions. These compositions may also include flavorants, preservatives, suspending, thickening and emulsifying agents, and other pharmaceutically acceptable additives. For parental administration, the compounds of the present invention can be prepared in aqueous injection solutions which may contain, in addition to the M4 antagonist, buffers, antioxidants, bacteriostats, and other additives commonly employed in such solutions.

As described herein optimal doses are generally determined using experimental models and/or clinical trials. The optimal dose of the M4 antagonist may depend upon the body mass, weight, blood volume, or other individual characteristics of the subject. For example, a person skilled in the medical art can consider the subject's condition, that is, stage of the disease, severity of symptoms caused by the disease, general health status, as well as age, gender, and weight, and other factors apparent to a person skilled in the medical art. In general, the amount of a compound described herein, that is present in a dose ranges from about 0.1 mg to about 2 mg per kg weight of the subject. In certain embodiments, a daily dose is about 10-150 mg. The use of the minimum dose that is sufficient to provide effective therapy is usually preferred. Subjects may generally be monitored for therapeutic effectiveness by clinical evaluation and using assays suitable for the condition being treated or prevented, which methods will be familiar to those having ordinary skill in the art and are described herein. The level of a compound that is administered to a subject may be monitored by determining the level of the compound in a biological fluid, for example, in the blood, blood fraction (e.g., plasma, serum), and/or in the urine, and/or other biological sample from the subject. Any method practiced in the art to detect the compound may be used to measure the level of compound during the course of a therapeutic regimen.

The pharmaceutical compositions described herein that comprise at least one of the M4 antagonist compounds described herein may be administered to a subject in need by any one of several routes that effectively deliver an effective amount of the compound. Such administrative routes include, for example, oral, parenteral (e.g., subcutaneous, intravenous, intramuscular, intrasternal, intracavernous), enteral, rectal, intranasal, buccal, sublingual, intramuscular, and transdermal.

Pharmaceutical preparations for oral administration can be obtained by any suitable method, typically by uniformly mixing the compound(s) with liquids or finely divided solid carriers, or both, in the required proportions and then, if necessary, processing the mixture, after adding suitable auxiliaries, if desired, forming the resulting mixture into a desired shape to obtain tablets or dragee cores.

Conventional excipients, such as binding agents, fillers, adjuvant, carrier, acceptable wetting agents, tabletting lubricants and disintegrants may be used in tablets and capsules for oral administration. Liquid preparations for oral administration may be in the form of solutions, emulsions, aqueous or oily suspensions and syrups. Alternatively, the oral preparations may be in the form of dry powder that can be reconstituted with water or another suitable liquid vehicle before use. Additional additives such as suspending or emulsifying agents, non-aqueous vehicles (including edible oils), preservatives and flavorings and colorants may be added to the liquid preparations. Parenteral dosage forms may be prepared by dissolving the compound of the invention in a suitable liquid vehicle and filter sterilizing the solution before lyophilization, or simply filling and sealing an appropriate vial or ampule.

As used herein, "drug substance", defined in the context of a "pharmaceutical composition," refers to a component of a pharmaceutical composition such as any one of the compounds as disclosed and described herein that provides the primary pharmacological effect, as opposed to an "inactive ingredient" which would generally be recognized as providing no therapeutic benefit.

As used herein, an "excipient" refers to a substance that is added to a composition to provide, without limitation, bulk, consistency, stability, binding ability, lubrication, disintegrating ability, etc., to the composition. A "diluent" is a type of excipient and refers to an ingredient in a pharmaceutical composition that lacks pharmacological activity but may be pharmaceutically necessary or desirable. For example, a diluent may be used to increase the bulk of a potent drug whose mass is too small for manufacture and/or administration. It may also be a liquid for the dissolution of a drug to be administered by injection, ingestion, or inhalation. A pharmaceutically acceptable excipient is a physiologically and pharmaceutically suitable non-toxic and inactive material or ingredient that does not interfere with the activity of the drug substance. Pharmaceutically acceptable excipients are well known in the pharmaceutical art and described, for example, in Rowe et al., Handbook of Pharmaceutical Excipients: A Comprehensive Guide to Uses, Properties, and Safety, 5th Ed., 2006, and in Remington: The Science and Practice of Pharmacy (Gennaro, 21st Ed. Mack Pub. Co., Easton, PA (2005)). Preservatives, stabilizers, dyes, buffers, and the like may be provided in the pharmaceutical composition. In addition, antioxidants and suspending agents may also be used. For compositions formulated as liquid solutions, acceptable carriers and/or diluents include saline and sterile water, and may optionally include antioxidants, buffers, bacteriostats and other common additives. In some embodiments, the diluents may be a buffered aqueous solution such as, without limitation, phosphate buffered saline. The compositions can also be formulated as capsules, granules, or tablets which contain, in addition to a compound as disclosed and described herein, diluents, dispersing and surface active agents, binders, and lubricants. One skilled in this art may further formulate a compound as disclosed and described herein in an appropriate manner, and in accordance with accepted practices, such as those disclosed in Remington, supra.

In making pharmaceutical compositions comprising compounds of Formula I, and pharmaceutically acceptable salts thereof, the drug substance is typically mixed with an excipient, diluted by an excipient or enclosed within such a carrier in the form of, for example, a capsule, sachet, paper, or other container. When the excipient serves as a diluent, it can be a solid, semi-solid, or liquid material, which acts as a vehicle, carrier, or medium for the drug substance. Thus, the compositions can be in the form of tablets, powders, lozenges, sachets, cachets, elixirs, suspensions, emulsions, solutions, syrups, aerosols (as a solid or in a liquid medium), ointments containing, for example, up to 10% by weight of the drug substance, soft and hard gelatin capsules, suppositories, sterile injectable solutions, and sterile packaged powders.

For preparing solid form pharmaceutical compositions such as powders, tablets, capsules, cachets, suppositories and dispersible granules an excipient can be one or more substances which may also act as diluents, flavoring agents, solubilizers, lubricants, suspending agents, binders, preservatives, tablet disintegrating agents, or an encapsulating material. Also included are solid form preparations which are intended to be converted, shortly before use, to liquid form preparations for oral administration. Such liquid forms include solutions, suspensions and emulsions. These preparations may contain, in addition to the drug substance, colorants, flavors, stabilizers, buffers, artificial and natural sweeteners, dispersants, thickeners, solubilizing agents and the like.

For preparing suppositories, a low melting wax, such as an admixture of fatty acid glycerides or cocoa butter, is first melted and the drug substance is dispersed homogeneously therein, as by stirring. The molten homogenous mixture is then poured into convenient sized molds, allowed to cool and thereby to solidify.

Formulations suitable for vaginal administration may be presented as pessaries, tampons, creams, gels, pastes, foams or sprays containing in addition to the drug substance such carriers as are known in the art to be appropriate.

Liquid form preparations include solutions, suspensions and emulsions, for example, water or water-propylene glycol solutions. For example, parenteral injection liquid preparations can be formulated as solutions in aqueous polyethylene glycol solution. Injectable preparations, for example, sterile injectable aqueous or oleaginous suspensions may be formulated according to the known art using suitable dispersing or wetting agents and suspending agents. The sterile injectable preparation may also be a sterile injectable solution or suspension in a nontoxic parenterally acceptable diluent or solvent, for example, as a solution in 1,3-butanediol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectables.

The pharmaceutical compositions may take such forms as suspensions, solutions, or emulsions in oily or aqueous vehicles and may contain formulatory agents such as suspending, stabilizing and/or dispersing agents. Alternatively, the pharmaceutical compositions may be in powder form, obtained by aseptic isolation of sterile solid or by lyophilization from solution, for constitution with a suitable vehicle, e.g. sterile, pyrogen-free water, before use.

The pharmaceutical compositions may be formulated as an aqueous solution, an aqua-alcoholic solution, a solid suspension, an emulsion, a liposomal suspension, or a freeze-dried powder for reconstitution. Such pharmaceutical compositions may be administered directly or as an admixture for further dilution/reconstitution. Route of administration includes intravenous bolus, intravenous infusion, irrigation, and instillation. Suitable solvents include water, alcohols, PEG, propylene glycol, and lipids; pH adjustments using an acid, e.g., HCl or citric acid, can be used to increase solubility and resulting compositions subjected to suitable sterilization procedures know in the art, such as, aseptic filtration. In some embodiments, the pH of the aqueous solution is about 2.0 to about 4.0. In some embodiments, the pH of the aqueous solution is about 2.5 to about 3.5.

Aqueous formulations suitable for oral use can be prepared by dissolving or suspending the drug substance in water and adding suitable colorants, flavors, stabilizing and thickening agents, as desired.

Aqueous suspensions suitable for oral use can be made by dispersing the finely divided drug substance in water with viscous material, such as natural or synthetic gums, resins, methylcellulose, sodium carboxymethylcellulose, or other well-known suspending agents.

For topical administration to the epidermis the compounds of Formula (I), and pharmaceutically acceptable salts, solvates, and hydrates thereof may be formulated as gels, ointments, creams or lotions, or as a transdermal patch. Also, formulations suitable for topical administration in the mouth include lozenges comprising drug substance in a flavored base, usually sucrose and acacia or tragacanth; pastilles comprising the drug substance in an inert base such as gelatin and glycerin or sucrose and acacia; and mouthwashes comprising the drug substance in a suitable liquid carrier. Ointments and creams may, for example, be formulated with an aqueous or oily base with the addition of suitable thickening and/or gelling agents. Lotions may be formulated with an aqueous or oily base and will in general also contain one or more emulsifying agents, stabilizing agents, dispersing agents, suspending agents, thickening agents, or coloring agents. In some embodiments, topical formulations can contain one or more conventional carriers. In some embodiments, ointments can contain water and one or more hydrophobic carriers selected from, for example, liquid paraffin, polyoxyethylene alkyl ether, propylene glycol, white vaseline, and the like. Carrier compositions of creams can be based on water in combination with glycerol and one or more other components, e.g., glycerinemonostearate, PEG-glycerinemonostearate and cetylstearyl alcohol. Gels can be formulated using isopropyl alcohol and water, suitably in combination with other components such as, for example, glycerol, hydroxyethyl cellulose, and the like. In some embodiments, topical formulations contain at least 0.1, at least 0.25, at least 0.5, at least 1, at least 2, or at least 5 wt % of a compound of Formula (I), or a pharmaceutically acceptable salt thereof.

Solutions or suspensions may be applied directly to the nasal cavity by conventional means, for example with a dropper, pipette or spray. The formulations may be provided in single or multi-dose form. In the latter case of a dropper or pipette, this may be achieved by the patient administering an appropriate, predetermined volume of the solution or suspension. In the case of a spray, this may be achieved for example by means of a metering atomizing spray pump.

Administration to the respiratory tract may also be achieved by means of an aerosol formulation provided in a pressurized pack with a suitable propellant. If the compounds of Formula (I), and pharmaceutically acceptable salts, solvates, and hydrates thereof or pharmaceutical compositions comprising them are administered as aerosols, for example as nasal aerosols or by inhalation, this can be carried out, for example, using a spray, a nebulizer, a pump nebulizer, an inhalation apparatus, a metered inhaler or a dry powder inhaler. Pharmaceutical forms for administration of the compounds of the present invention as an aerosol can be prepared by processes well known to the person skilled in the art. For their preparation, for example, solutions or dispersions of the compounds of the present invention in water, water/alcohol mixtures or suitable saline solutions can be employed using customary additives, for example benzyl alcohol or other suitable preservatives, absorption enhancers for increasing the bioavailability, solubilizers, dispersants and others and, if appropriate, customary propellants, for example include carbon dioxide, CFCs, such as, dichlorodifluoromethane, trichlorofluoromethane, or dichlorotetrafluoroethane; and the like. The aerosol may conveniently also contain a surfactant such as lecithin. The dose of drug may be controlled by provision of a metered valve.

Alternatively, the pharmaceutical composition may be provided in the form of a dry powder, for example, a powder mix of the compound in a suitable, powder base such as lactose, starch, starch derivatives such as hydroxypropylmethyl cellulose and polyvinylpyrrolidone (PVP). Conveniently the powder carrier will form a gel in the nasal cavity. The powder composition may be presented in unit dose form for example in capsules or cartridges of, e.g., gelatin, or blister packs from which the powder may be administered by means of an inhaler.

The compounds of Formulas (I), (Ia), and (Ib), and pharmaceutically acceptable salts thereof, may also be administered via a rapid dissolving or a slow release composition, wherein the composition includes a biodegradable rapid dissolving or slow release carrier (such as a polymer carrier and the like). Rapid dissolving or slow release carriers are well known in the art and are used to form complexes that capture therein compounds of Formulas (I), (Ia), (Ib), and pharmaceutically acceptable salts, solvates, and hydrates thereof, and either rapidly or slowly degrade/dissolve in a suitable environment (e.g., aqueous, acidic, basic, etc.).

The pharmaceutical preparations are preferably in unit dosage forms. In such form, the preparation is subdivided into unit doses containing appropriate quantities of the drug substance. The unit dosage form can be a packaged preparation, the package containing discrete quantities of preparation, such as packeted tablets, capsules and powders in vials or ampoules. Also, the unit dosage form can be a capsule, tablet, cachet, or lozenge itself, or it can be the appropriate number of any of these in packaged form.

Tablets or capsules for oral administration and liquids for intravenous administration are preferred compositions.

The compositions can be formulated in a unit dosage form, each dosage containing the drug substance or equivalent mass of the drug substance. The term "unit dosage forms" refers to physically discrete units of a formulation suitable as unitary dosages for human subjects and other mammals, each unit containing a predetermined quantity of drug substance calculated to produce the desired therapeutic effect, in association with a suitable excipient, as described herein.

The compositions described herein can be formulated to provide immediate and/or timed release (also called extended release, sustained release, controlled release, or slow release) of the drug substance after administration to a subject by employing procedures known in the art. For example, the tablets including compounds of Formula I, or pharmaceutically acceptable salts, solvates, and hydrates thereof, can be coated or otherwise compounded to provide a dosage form affording the advantage of prolonged action. For example, the tablet can comprise an inner dosage and an outer dosage component, the latter being in the form of an envelope over the former. The two components can be separated by an enteric layer which serves to resist disintegration in the stomach and permit the inner component to pass intact into the duodenum or to be delayed in release. A variety of materials can be used for such enteric layers or coatings, such materials including a number of polymeric acids and mixtures of polymeric acids with such materials as shellac, cetyl alcohol, and cellulose acetate.

Pharmaceutical composition comprising drug substance may formulated for timed release. Such compositions may generally be prepared using well known technology and administered by, for example, oral, rectal or subcutaneous implantation, or by implantation at the desired target site. Sustained-release formulations may contain the compound dispersed in a carrier matrix and/or contained within a reservoir surrounded by a rate controlling membrane. Excipients for use within such formulations are biocompatible, and may also be biodegradable. The amount of drug substance contained within a sustained release formulation depends upon the site of implantation, the rate and expected duration of release, and the nature of the condition to be treated or prevented.

The liquid forms including the drug substance can be incorporated for administration orally or by injection include aqueous solutions, suitably flavored syrups, aqueous or oil suspensions, and flavored emulsions with edible oils such as cottonseed oil, sesame oil, coconut oil, or peanut oil, and similar excipients.

The pharmaceutical compositions described herein can be sterilized by conventional sterilization techniques, or may be sterile filtered. Aqueous solutions can be packaged for use as is, or lyophilized, the lyophilized preparation being combined with a sterile aqueous carrier prior to administration. The pH of the compound preparations is typically between 3 and 11, more preferably from 5 to 9 and most preferably from 7 to 8. It will be understood that use of certain of the foregoing excipients may result in the formation of pharmaceutically acceptable salts.

Compositions for inhalation or insufflation include solutions and suspensions in pharmaceutically acceptable, aqueous or organic solvents, or mixtures thereof, and powders. The liquid or solid compositions may contain suitable excipients as described herein. In some embodiments, the compositions are administered by the oral or nasal respiratory route for local or systemic effect. Compositions can be nebulized by use of inert gases. Nebulized solutions may be breathed directly from the nebulizing device or the nebulizing device can be attached to a face masks tent, or intermittent positive pressure breathing machine. Solution, suspension, or powder compositions can be administered orally or nasally from devices which deliver the formulation in an appropriate manner.

The compositions may, if desired, be presented in a pack or dispenser device which may contain one or more unit dosage forms containing the drug substance. The pack may for example comprise metal or plastic foil, such as a blister pack. The pack or dispenser device may be accompanied by instructions for administration. The pack or dispenser may also be accompanied with a notice associated with the container in form prescribed by a governmental agency regulating the manufacture, use, or sale of pharmaceuticals, which notice is reflective of approval by the agency of the form of the drug for human or veterinary administration. Such notice, for example, may be the labeling approved by the U.S. Food and Drug Administration for prescription drugs, or the approved product insert. Compositions that can include a compound described herein formulated in a compatible pharmaceutical carrier may also be prepared, placed in an appropriate container, and labeled for treatment of an indicated condition.

As used herein, a "dose" or "dosage" means the measured quantity of drug substance to be taken at one time by a patient. In certain embodiments, wherein the drug substance is not a free base or free acid, the quantity is the molar equivalent to the corresponding amount of free base or free acid.

For preparing solid compositions such as tablets, the drug substance may be mixed with an excipient to form a solid preformulation composition containing a homogeneous mixture of components. When referring to these preformulation compositions as homogeneous, the drug substance is typically dispersed evenly throughout the composition so that the composition can be readily subdivided into equally effective unit dosage forms such as tablets and capsules.

Kits with unit doses of one or more of the compounds described herein, usually in oral or injectable doses, are provided. Such kits may include a container containing the unit dose, an informational package insert describing the use and attendant benefits of the drugs in treating pathological condition of interest, and optionally an appliance or device for delivery of the composition.

Dosing Schedule/Amount

A compound of Formula (I), (Ia), or (Ib), or a pharmaceutically acceptable salt, or solvate thereof, may be effective over a wide dosage range and is generally administered in a therapeutically effective amount. It will be understood, however, that the amount of the compound actually administered will usually be determined by a physician, according to the relevant circumstances, including the condition to be treated, the chosen route of administration, the actual compound administered, the age, weight, and response of the individual subject, the severity of the subject's symptoms, and the like.

The amount of compound or composition administered to a subject will also vary depending upon what is being administered, the purpose of the administration, such as prophylaxis or therapy, the state of the subject, the manner of administration, and the like. In therapeutic applications, compositions can be administered to a subject already suffering from a disease in an amount sufficient to cure or at least partially arrest the symptomology and/or pathology of the disease and its complications. Therapeutically effective doses will depend on the disease condition being treated as well as by the judgment of the attending clinician depending upon factors such as the severity of the disease, the age, weight and general condition of the subject, and the like.

It will be apparent to those skilled in the art that the dosage forms described herein may comprise, as the drug substance, either a compound described herein or pharmaceutically acceptable salt, solvate, or hydrate thereof. Moreover, various hydrates and solvates of the compounds described herein and their salts can find use as intermediates in the manufacture of pharmaceutical compositions. Typical procedures for making and identifying suitable hydrates and solvates, outside those mentioned herein, are well known to those in the art; see for example, pages 202-209 of K. J. Guillory, "Generation of Polymorphs, Hydrates, Solvates, and Amorphous Solids," in: Polymorphism in Pharmaceutical Solids, ed. Harry G. Britain, Vol. 95, Marcel Dekker, Inc., New York, 1999 which is incorporated herein by reference in its entirety. Accordingly, one aspect of the present invention pertains to methods of administering hydrates and solvates of compounds described herein and/or their pharmaceutical acceptable salts, that can be isolated and characterized by methods known in the art, such as, thermogravimetric analysis (TGA), TGA-mass spectroscopy, TGA-Infrared spectroscopy, powder X-ray diffraction (PXRD), Karl Fisher titration, high resolution X-ray diffraction, and the like.

Compound Synthesis

Detailed compound synthesis methods are described herein in the Examples. A person having ordinary skill in the chemical art would be able to make a compound of Formula (I), (Ia), or (Ib), including specific compounds and salts described herein, by these methods or similar methods or other methods practiced by a person skilled in the art. In general, starting components are commercially available chemicals and may be obtained from commercial sources or may be made according to organic synthesis techniques known to those skilled in this art, starting from commercially available chemicals and/or from compounds described in the chemical literature.

In general, the compounds used in the reactions described herein may be made according to organic synthesis techniques known to those skilled in this art, starting from commercially available chemicals and/or from compounds described in the chemical literature. "Commercially available chemicals" may be obtained from standard commercial sources including Acros Organics (Pittsburgh PA), Aldrich Chemical (Milwaukee WI, including Sigma Chemical and Fluka), Apin Chemicals Ltd. (Milton Park UK), Avocado Research (Lancashire U.K.), BDH Inc. (Toronto, Canada), Bionet (Cornwall, U.K.), Chemservice Inc. (West Chester PA), Crescent Chemical Co. (Hauppauge NY), Eastman Organic Chemicals, Eastman Kodak Company (Rochester NY), Fisher Scientific Co. (Pittsburgh PA), Fisons Chemicals (Leicestershire UK), Frontier Scientific (Logan UT), ICN Biomedicals, Inc. (Costa Mesa CA), Key Organics (Cornwall U.K.), Lancaster Synthesis (Windham NH), Maybridge Chemical Co. Ltd. (Cornwall U.K.), Parish Chemical Co. (Orem UT), Pfaltz & Bauer, Inc. (Waterbury CT), Polyorganix (Houston TX), Pierce Chemical Co. (Rockford IL), Riedel de Haen AG (Hanover, Germany), Spectrum Quality Product, Inc. (New Brunswick, NJ), TCI America (Portland OR), Trans World Chemicals, Inc. (Rockville MD), and Wako Chemicals USA, Inc. (Richmond VA).

Methods known to one of ordinary skill in the art may be identified through various reference books and databases. Suitable reference books and treatise that detail the synthesis of reactants useful in the preparation of compounds of the present disclosure, or provide references to articles that describe the preparation, include for example, "Synthetic Organic Chemistry," John Wiley & Sons, Inc., New York; S. R. Sandler et al., "Organic Functional Group Preparations," 2nd Ed., Academic Press, New York, 1983; H. O. House, "Modern Synthetic Reactions", 2nd Ed., W. A. Benjamin, Inc. Menlo Park, Calif. 1972; T. L. Gilchrist, "Heterocyclic Chemistry", 2nd Ed., John Wiley & Sons, New York, 1992; J. March, "Advanced Organic Chemistry: Reactions, Mechanisms and Structure," 4th Ed., Wiley-Interscience, New York, 1992. Additional suitable reference books and treatise that detail the synthesis of reactants useful in the preparation of compounds of the present disclosure, or provide references to articles that describe the preparation, include for example, Fuhrhop, J. and Penzlin G. "Organic Synthesis: Concepts, Methods, Starting Materials", Second, Revised and Enlarged Edition (1994) John Wiley & Sons; Hoffman, R. V. "Organic Chemistry, An Intermediate Text" (1996) Oxford University Press; Larock, R. C. "Comprehensive Organic Transformations: A Guide to Functional Group Preparations" 2nd Edition (1999) Wiley-VCH; March, J. "Advanced Organic Chemistry: Reactions, Mechanisms, and Structure" 4th Edition (1992) John Wiley & Sons; Otera, J. (editor) "Modern Carbonyl Chemistry" (2000) Wiley-VCH; Patai, S. "Patai's 1992 Guide to the Chemistry of Functional Groups" (1992) Interscience; Quin, L. D. et al. "A Guide to Organophosphorus Chemistry" (2000) Wiley-Interscience; Solomons, T. W. G. "Organic Chemistry" 7th Edition (2000) John Wiley & Sons; Stowell, J. C., "Intermediate Organic Chemistry" 2nd Edition (1993) Wiley-Interscience; "Industrial Organic Chemicals: Starting Materials and Intermediates: An Ullmann's Encyclopedia" (1999) John Wiley & Sons, in 8 volumes; "Organic Reactions" (1942-2019) John Wiley & Sons, in over 95 volumes; and "Chemistry of Functional Groups" John Wiley & Sons, in hardcover volumes (86) and electronic volumes (26).

Specific and analogous reactants may also be identified through the indices of known chemicals prepared by the Chemical Abstract Service of the American Chemical Society, which are available in most public and university libraries, as well as through on-line databases (the American Chemical Society, Washington, D.C., may be contacted for more details). Chemicals that are known but not commercially available in catalogs may be prepared by custom chemical synthesis houses according to known methods, where many of the standard chemical supply houses (e.g., those listed above) provide custom synthesis services.

Abbreviations

The specification includes numerous abbreviations, whose definitions are listed in the following Table:

| Abbreviation | Definition |
|---|---|
| ACN or CH$_3$CN | Acetonitrile |
| ACE | Acetone |
| EtOAc | Ethyl acetate |
| DBU | 1,8-Diazabicyclo[5.4.0]undec-7-ene |
| DCC | Dicyclohexylcarbodiimide |
| DCM | Dichloromethane or methylene chloride |
| de | Diastereomeric excess |
| DMSO | Dimethylsulfoxide |
| DMSO-d$_6$ | Dimethylsulfoxide-d$_6$ |
| ee | Enantiomeric excess |
| HPLC | High-performance liquid chromatography |

-continued

| Abbreviation | Definition |
|---|---|
| IPA | Isopropyl alcohol |
| KHMDS | Potassium bis(trimethylsilyl)amide |
| LCMS | Liquid chromatography-mass spectrometry |
| min. | Minute(s) |
| NH$_4$Cl | Ammonium chloride |
| Pd(PPh$_3$)$_4$ | Palladium-tetrakis(triphenylphosphine) |
| TEA | Triethylamine |
| TFA | Trifluoroacetic acid |
| THF | Tetrahydrofuran |

EXAMPLES

The following examples are included to demonstrate embodiments of the disclosure. However, those of skill in the art should, in light of the present disclosure, appreciate that many changes can be made in the specific embodiments which are disclosed and still obtain a like or similar result without departing from the spirit and scope of the disclosure.

Preparation of Compounds

Example 1: Preparation of 2-(1-benzylpiperidin-4-yl)ethyl (2R,6S)-2,6-dimethyl-4-[5-(trifluoromethyl)pyrazin-2-yl]piperazine-1-carboxylate (Compound 1)

Scheme 1: Preparation of (2R,6S)-2,6-dimethyl-4-[5-(trifluoromethyl)pyrazin-2-yl]piperazine-1-carbonyl Chloride

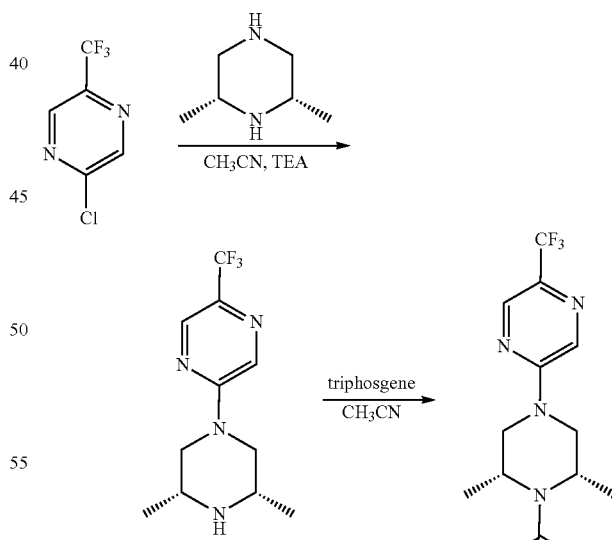

(2R,6S)-2,6-dimethyl-4-[5-(trifluoromethyl)pyrazin-2-yl]piperazine-1-carbonyl Chloride To a solution of (2R,6S)-2,6-dimethylpiperazine (11.4 g, 100 mmol, 1.0 eq) and 2-chloro-5-(trifluoromethyl)pyrazine (18.3 g, 100 mmol, 1.0 eq) in acetonitrile (400 mL) was added triethylamine (56 mL, 400 mmol, 4.0 eq) and the reaction mixture was stirred at room temperature overnight. The resulting suspension was filtered to remove triethylamine hydrochloride and concentrated in vacuo to provide 2-[(3R,5S)-3,5-dimethylpiperazin-1-yl]-5-(trifluoromethyl) pyrazine as a light orange solid which was carried forward without further purification.

To a suspension of 2-[(3R,5S)-3,5-dimethylpiperazin-1-yl]-5-(trifluoromethyl)pyrazine (100 mmol, 1.0 eq) in acetonitrile (0.8 L) cooled to 0° C. was added triphosgene (36 g, 120 mmol, 1.2 eq) followed by pyridine (12 mL, 150 mmol, 1.5 eq) dropwise and the reaction mixture was allowed to warm to room temperature. After stirring overnight, the resulting light orange suspension was concentrated in vacuo. The resulting orange solid was re-suspended in EtOAc, stirred rapidly for 30 min and filtered. The filtrate was concentrated to dryness in vacuo to provide (2R,6S)-2,6-dimethyl-4-[5-(trifluoromethyl)pyrazin-2-yl]piperazine-1-carbonyl chloride as a light orange solid which was also carried forward without further purification.

Scheme 2: Preparation of 2-(1-benzylpiperidin-4-yl) ethyl (2R,6S)-2,6-dimethyl-4-[5-(trifluoromethyl) pyrazin-2-yl]piperazine-1-carboxylate (Compound 1)

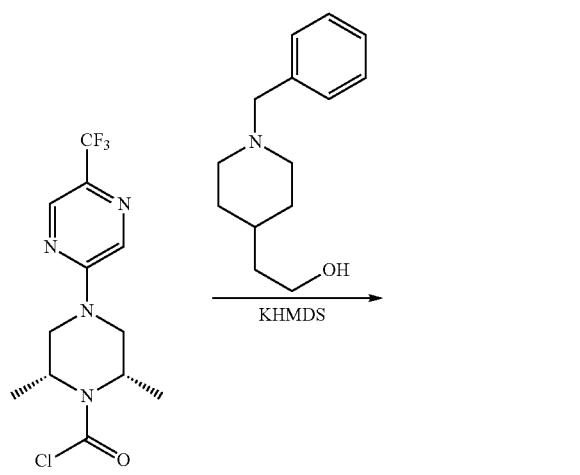

2-(1-benzylpiperidin-4-yl)ethyl (2R,6S)-2,6-dimethyl-4-[5-(trifluoromethyl)pyrazin-2-yl]piperazine-1-carboxylate To a solution of 2-(1-benzylpiperidin-4-yl)ethan-1-ol (21 g, 96 mmol, 1.0 eq) in dry THF (0.4 L) was added solid KHMDS (19 g, 96 mmol, 1.0 eq) and the reaction mixture was stirred at room temperature for 10 min. Then, solid (2R,6S)-2,6-dimethyl-4-[5-(trifluoromethyl)pyrazin-2-yl] piperazine-1-carbonyl chloride (31 g, 96 mmol, 1.0 eq) was added and the reaction stirred at room temperature overnight. The reaction mixture was diluted with EtOAc and washed with sat. $NH_4Cl$. Then, the organic layer was washed with sat. $NaHCO_3$ followed by brine, dried over $MgSO_4$ and concentrated. Silica gel columns (3×330 g) were loaded using methylene chloride and run using an increasing gradient of acetone (5% for 5 min) followed by ramping (5-50%) in hexanes over 25 min. After combining all product eluents, the resulting white solid was suspended in pentane (0.75 L) and stirred rapidly overnight. The resulting white powder was collected by vacuum filtration and dried under high vacuum to provide 2-(1-benzylpiperidin-4-yl) ethyl (2R,6S)-2,6-dimethyl-4-[5-(trifluoromethyl)pyrazin-2-yl]piperazine-1-carboxylate (26 g, 51 mmol) in an overall yield of 53%. $^1$H NMR (400 MHz, DMSO-$d_6$): δ (ppm) 8.52 (s, 1H), 8.48 (s, 1H), 7.33-7.21 (m, 5H), 4.42 (d, J=13.6 Hz, 2H), 4.23 (m, 2H), 4.08 (t, J=6.6 Hz, 2H), 3.42 (s, 2H), 3.24 (dd, J=13.4, 4.2, 2H), 2.78 (d, J=11.6, 2H), 1.88 (t, J=12.0, 2H), 1.63 (d, J=12.0, 2H), 1.54 (m, 2H), 1.34 (br s, 1H), 1.18 (m, 2H), 1.14 (d, J=6.8, 6H). MS observed for $C_{26}H_{35}F_3N_5O_2$ (M+H)$^+$ 506.0.

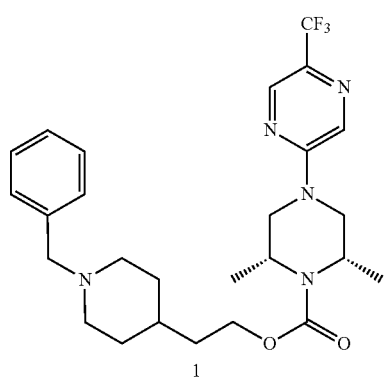

Example 1A: Preparation of 2-(1-benzylpiperidin-4-yl)ethyl (2R,6S)-2,6-dimethyl-4-[5-(trifluoromethyl) pyrazin-2-yl]piperazine-1-carboxylate hydrochloric Acid Salt (Compound 1 HCl)

The hydrochloride salt of Compound 1 was prepared by dissolving a portion of the free base of 2-(1-benzylpiperidin-4-yl)ethyl (2R,6S)-2,6-dimethyl-4-[5-(trifluoromethyl) pyrazin-2-yl]piperazine-1-carboxylate (3.9 g, 7.7 mmol, 1.0 eq) in methyl tert-butyl ether (1.0 L) and adding a solution of 2.0 M HCl in diethyl ether (4.0 mL, 8.0 mmol, 1.05 mmol) dropwise with stirring. The resulting white suspension was concentrated to dryness, re-suspended in pentane (1.0 L), and rapidly stirred overnight. The resulting white powder was collected by vacuum filtration under a nitrogen atmosphere, grinded with a mortar and pestle, and dried under high vacuum at 30° C. to remove any residual solvent. $^1$H NMR (400 MHz, DMSO-$d_6$): δ (ppm) 8.53 (s, 1H), 8.48 (s, 1H), 7.59 (m, 2H), 7.47 (m, 3H), 4.42 (d, J=13.1 Hz, 2H), 4.28-4.19 (m, 3H), 4.08 (t, J=5.9 Hz, 2H), 3.29 (m, 2H), 3.24 (dd, J=13.6, 4.3, 2H), 3.08 (m, 1H), 2.88 (m, 2H), 1.86 (d, J=12.0, 2H), 1.75 (m, 1H), 1.56 (m, 4H), 1.15 (d, J=6.9, 6H).

Example 2: Preparation of 2-(1-benzylpiperidin-4-yl)ethyl (2R,6R)-2,6-dimethyl-4-[5-(trifluoromethyl)pyrazin-2-yl]piperazine-1-carboxylate (Compound 2)

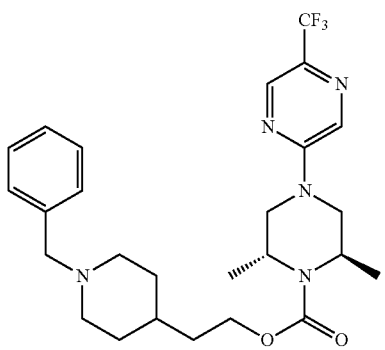

The title compound was prepared in a similar manner as described in Example 1 using (2R,6R)-2,6-dimethylpiperazine dihydrochloride in place of (2R,6S)-2,6-dimethylpiperazine in Scheme 1.

Example 3: Preparation of 2-(1-(phenylmethyl-d₂)piperidin-4-yl)ethyl (2R,6S)-2,6-dimethyl-4-(5-(trifluoromethyl)pyrazin-2-yl)piperazine-1-carboxylate (Compound 3)

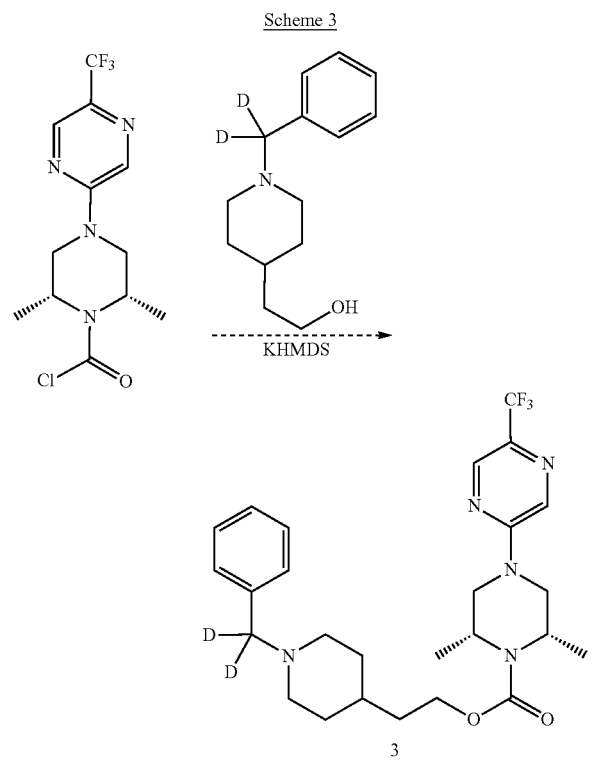

To a solution of 2-(1-(phenylmethyl-d₂)piperidin-4-yl)ethan-1-ol in dry THF is added solid KHMDS and the resulting mixture is stirred at room temperature for 10 min. Then, solid (2R,6S)-2,6-dimethyl-4-[5-(trifluoromethyl)pyrazin-2-yl]piperazine-1-carbonyl chloride is added and the resulting mixture is stirred at room temperature overnight. The mixture is diluted with EtOAc and washed with sat. NH₄Cl. Then, the organic layer is washed with sat. NaHCO₃ followed by brine, dried over MgSO₄ and concentrated to afford an isolate. The isolate is purified by chromatography on silica gel eluting with methylene chloride and using an increasing gradient of acetone (5% for 5 min) followed by ramping (5-50%) in hexanes over 25 min to afford 2-(1-(phenylmethyl-d₂)piperidin-4-yl)ethyl (2R,6S)-2,6-dimethyl-4-(5-(trifluoromethyl)pyrazin-2-yl)piperazine-1-carboxylate.

Example 4: Preparation of 2-(1-((phenyl-d₅)methyl-d₂)piperidin-4-yl)ethyl (2R,6S)-2,6-dimethyl-4-(5-(trifluoromethyl)pyrazin-2-yl)piperazine-1-carboxylate (Compound 4)

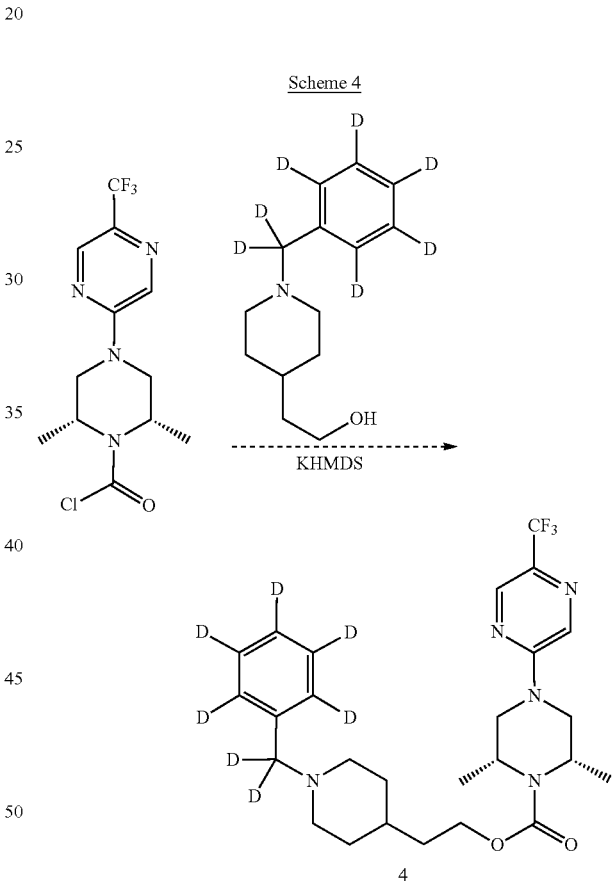

To a solution of 2-(1-((phenyl-d₅)methyl-d₂)piperidin-4-yl)ethan-1-ol in dry THF is added solid KHMDS and the resulting mixture is stirred at room temperature for 10 min. Then, solid (2R,6S)-2,6-dimethyl-4-[5-(trifluoromethyl)pyrazin-2-yl]piperazine-1-carbonyl chloride is added and the resulting mixture is stirred at room temperature overnight. The mixture is diluted with EtOAc and washed with sat. NH₄Cl. Then, the organic layer is washed with sat. NaHCO₃ followed by brine, dried over MgSO₄ and concentrated to afford an isolate. The isolate is purified by chromatography on silica gel eluting with methylene chloride and using an increasing gradient of acetone (5% for 5 min) followed by ramping (5-50%) in hexanes over 25 min to afford 2-(1-(phenylmethyl-d₂)piperidin-4-yl)ethyl (2R,6S)-2,6-dimethyl-4-(5-(trifluoromethyl)pyrazin-2-yl)piperazine-1-carboxylate.

Example 5: Preparation of 2-(1-(phenylmethyl-d₂)piperidin-4-yl)ethyl (2R,6R)-2,6-dimethyl-4-(5-(trifluoromethyl)pyrazin-2-yl)piperazine-1-carboxylate (Compound 5)

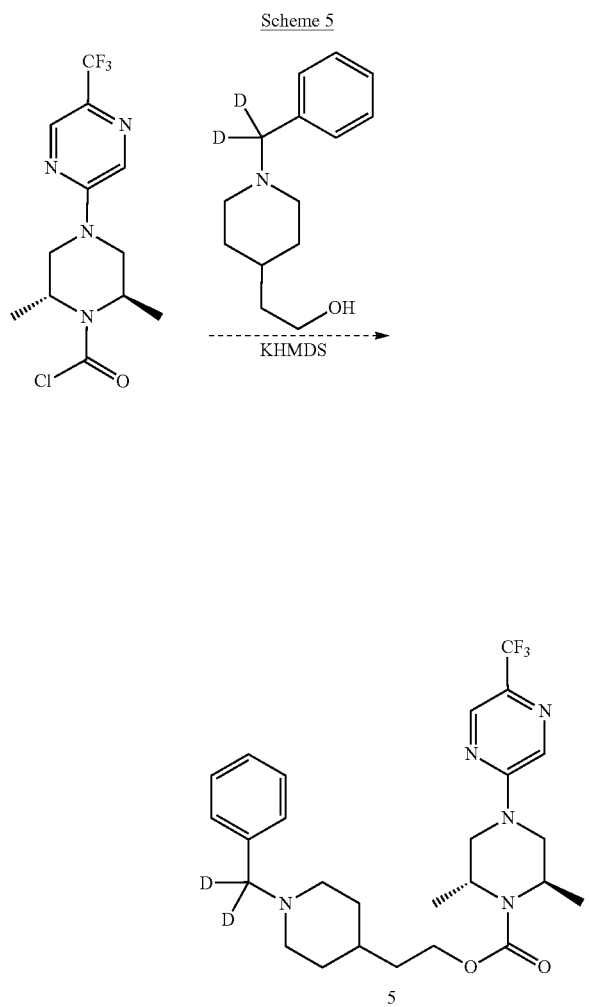

To a solution of 2-(1-(phenylmethyl-d₂)piperidin-4-yl)ethan-1-ol in dry THF is added solid KHMDS and the resulting mixture is stirred at room temperature for 10 min. Then, solid (2R,6R)-2,6-dimethyl-4-[5-(trifluoromethyl)pyrazin-2-yl]piperazine-1-carbonyl chloride is added and the resulting mixture is stirred at room temperature overnight. The mixture is diluted with EtOAc and washed with sat. NH₄Cl. Then, the organic layer is washed with sat. NaHCO₃ followed by brine, dried over MgSO₄ and concentrated to afford an isolate. The isolate is purified by chromatography on silica gel eluting with methylene chloride and using an increasing gradient of acetone (5% for 5 min) followed by ramping (5-50%) in hexanes over 25 min to afford 2-(1-(phenylmethyl-d₂)piperidin-4-yl)ethyl (2R,6R)-2,6-dimethyl-4-(5-(trifluoromethyl)pyrazin-2-yl)piperazine-1-carboxylate.

Example 6: Preparation of 2-(1-((phenyl-d₅)methyl-d₂)piperidin-4-yl)ethyl (2R,6R)-2,6-dimethyl-4-(5-(trifluoromethyl)pyrazin-2-yl)piperazine-1-carboxylate (Compound 6)

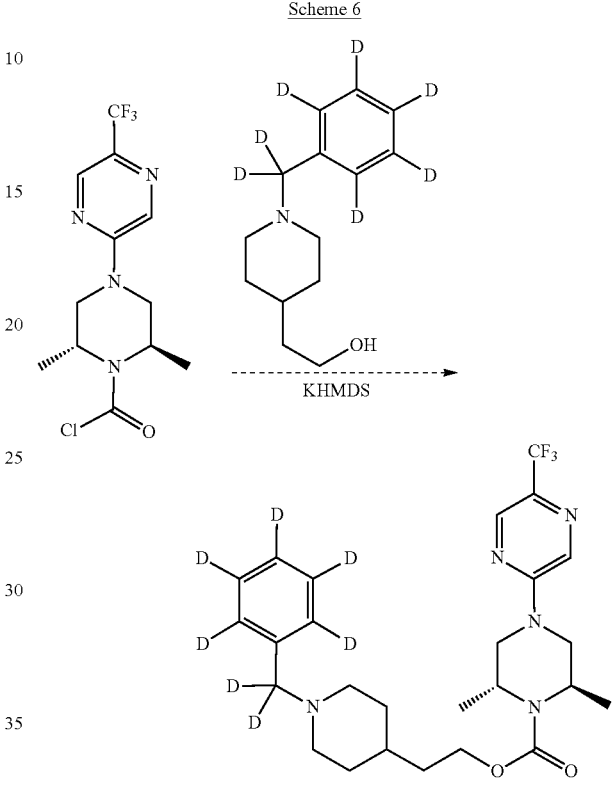

To a solution of 2-(1-((phenyl-d₅)methyl-d₂)piperidin-4-yl)ethan-1-ol in dry THE is added solid KHMDS and the resulting mixture is stirred at room temperature for 10 min. Then, solid (2R,6R)-2,6-dimethyl-4-[5-(trifluoromethyl)pyrazin-2-yl]piperazine-1-carbonyl chloride is added and the resulting mixture is stirred at room temperature overnight. The mixture is diluted with EtOAc and washed with sat. NH₄Cl. Then, the organic layer is washed with sat. NaHCO₃ followed by brine, dried over MgSO₄ and concentrated to afford an isolate. The isolate is purified by chromatography on silica gel eluting with methylene chloride and using an increasing gradient of acetone (5% for 5 min) followed by ramping (5-50%) in hexanes over 25 min to afford 2-(1-(phenylmethyl-d₂)piperidin-4-yl)ethyl (2R,6R)-2,6-dimethyl-4-(5-(trifluoromethyl)pyrazin-2-yl)piperazine-1-carboxylate.

Example 7: Binding Assay

Binding affinity (Ki) of compounds was measured by inhibition of radioligand binding to membranes from CHO cells expressing human M1, M2, M3, M4 and M5 receptors. Membranes were prepared by nitrogen cavitation and differential centrifugation as previously described (Hoare et al., Mol. Pharmacol. 2003 March; 63(3): 751-65). The radioligand employed was tritiated N-methylscopolamine, used at a concentration of 1.5 nM. A dose-response of twelve concentrations of compound was used, ranging from 10 µM to 32 µM. The assay buffer was 50 mM HEPES, 100 mM NaCl, 5 mM MgCl$_2$, 1 mM ethylenediaminetetraacetic acid, pH-adjusted to pH 7.4. Membranes, radioligand and compound were incubated together for 90 minutes at 37° C., in a total volume of 150 µL in a 96-well plate. Receptor-bound radioligand was then collected by harvesting the assay over glass fiber filters pretreated with polyethylenimine to trap the cell membranes, using rapid vacuum filtration. Harvesting and radioactivity counting was conducted as previously described (see, e.g., Hoare et al., *Mol. Pharmacol.* 2003 63(3):751-65); Erratum at *Mol. Pharmacol.* 2005 July; 68(1): 260).

Binding affinities of the exemplified Compounds 1, 2, 3A and 4A are presented in Table 1 below. In Table 1, "–" means the compound had a Ki against the noted receptor of 1 µM (1,000 nM) or greater or that activity was not detected against the noted receptor.

TABLE 1

| Cpd No | M1 | M2 | M3 | M4 | M5 |
|---|---|---|---|---|---|
| 1 | — | 1859 nM | — | 1.8 nM | — |
| 2 | — | 271 nM | — | 4 nM | — |
| 3A | | 520 nM | | 3 nM | |
| 4A | | 665 nM | | 5 nM | |

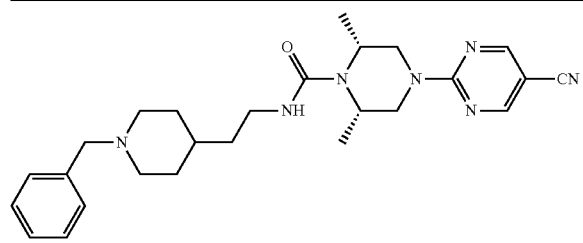

Compound 3A

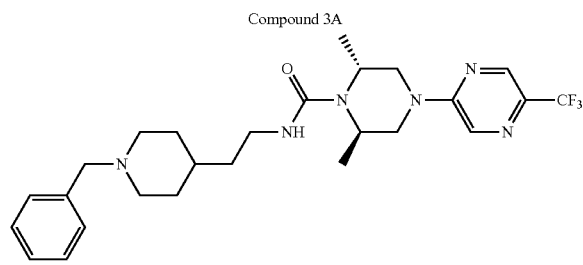

Compound 4A

Example 8: Functional Assay

Functional antagonism of acetylcholine responses is evaluated using a fluorescence-based functional calcium assay. Acetylcholine binding to the muscarinic receptors activates G-proteins. Human muscarinic 4 receptor (CHRM4) is stably expressed in CHO-K1 cells and a promiscuous Gα$_{16}$ construct is co-transfected. This cell line is commercially available through PerkinElmer (product number ES-213-A). Following ligand binding, activation of the Gα$_{16}$ subunit induces the release of calcium from the endoplasmic reticulum. Prior to ligand screening, the receptor-expressing cells are loaded with a fluorescent calcium indicator, FLIPR Calcium 6 (Molecular Devices). Antagonist activity of the compounds is determined as the EC$_{50}$ for inhibition of the acetylcholine response. The assay buffer used is a 1:1 solution of buffer (1× Hank's balanced salt solution plus 20 mM HEPES buffer, pH 7.4) and cell medium (Ham's F-12, 10% FBS, 0.4 mg/ml Geneticin, 0.25 mg/ml Zeocin). The day before the assay, 4×10$^3$ cells per well are seeded into an assay plate in 25 uL of medium and allowed to incubate overnight at 37° C. and 5% CO$_2$. The following day, 25 uL of Calcium 6 dye is added to each well and incubated for two additional hours at 37° C. and 5% CO$_2$. Test compound (a dose-response of eleven concentrations ranging from 10 µM to 100 pM) are added to the cells to a final DMSO concentration of 0.56% v/v. One hour later, acetylcholine to a final concentration of 100 nM is added by the instrument and calcium flux-dependent fluorescence measured in real time. The concentration of acetylcholine used is that which stimulates 80% of the maximal response.

Example 9: Electrophysiology Assay

Adult (>8 weeks) female Lister hooded rats (Harlan, UK) are killed by decapitation and the brain is removed and placed into ice-cold oxygenated sucrose Krebs' medium containing (mM): sucrose (202), KCl (2), KH$_2$PO$_4$ (1.25), MgSO$_4$ (10), CaCl$_2$) (0.5), NaHCO$_3$ (26), glucose (10). The brain is hemisected along the midline and 300 µM parasagittal slices are prepared with an oscillating microtome (Integraslice; Campden Instruments Ltd., Loughborough, UK). Slices are then transferred to a recovery chamber at room temperature containing oxygenated Krebs' solution (mM): NaCl (124), KCl (2), KH$_2$PO$_4$ (1.25), MgSO$_4$ (1), CaCl$_2$) (2), NaHCO$_3$ (26), glucose (10). Following at least 1 hour of recovery, individual slices are transferred to an interface recording chamber where they are perfused with Krebs' solution (33° C.). Extracellular field potential recordings are made with an Axoprobe 1A amplifier (Axon Instruments Ltd., USA) via a Krebs'-filled glass micropipette (resistance 2-5 MΩ) positioned in the stratum radiatum of the CA1, digitized (10 kHz) via a CED1401 interface and stored on a computer with Spike2 software (Cambridge Electronic Design Ltd., Cambridge, UK). Field excitatory postsynaptic potential (fEPSP) responses are evoked (pair of 0.02 ms pulses, separated by 40 ms; applied every 10 s; adjusted to approximately 60% of the maximal spike-free response) by a bipolar stimulating electrode positioned in the stratum radiatum near the CA3-CA1 border.

The cholinergic agonist carbachol (aza-acetylcholine, resistant to degradation by acetylcholinesterase) is used to stimulate muscarinic receptors. The M1 muscarinic receptor is blocked using 5 µM VU0255035, a selective M1 antagonist. The resulting inhibitory signal is primarily M4-mediated, based on its sensitivity to the M4 activator VU010010. The effect of M4 antagonists on this M4-mediated inhibition of fEPSPs is measured by adding compound 20 minutes prior to application of carbachol.

Example 10: 6-OHDA Surgical Lesion and Behavioral Testing Procedures

6-OHDA Lesion protocol: Male Sprague-Dawley rats are anesthetized with isoflurane and placed into the stereotaxic frame. Thirty minutes prior the injection of 6-OHDA, rats received desipramine (15 mg/kg, i.p.) to prevent the entry of the toxin into the noradrenergic cells. A unilateral lesion is induced by injections of 6-OHDA (8 µg/4 µL/site/rat; flow rate 1 µL/min; dissolved in 0.9% NaCl with 0.02% ascorbic acid) or vehicle into the left and right medial forebrain bundle at the following coordinates: AP −4.4. mm; L ±1.2 mm; V −7.8 mm relative to Bregma (Paxinos and Watson, 2007). The rats are allowed to recover for 14 days and are then tested for locomotor activity induced by novelty (placing the rat in a new cage, 30 min) and for contraversive (contralateral) rotational behavior induced by apomorphine (0.2 mg/kg, s.c.).

Experimental animal selection criteria: Only the rats with activity higher than 5 turns/min. following apomorphine treatment are enrolled in the study; rats not fulfilling the criteria are excluded from the study (typically 20%). Turning activity is then recorded for each group once per week for four consecutive weeks.

Example 11: Haloperidol-Induced Catalepsy

Young adult male, Sprague-Dawley (SD) rats (175-200 grams) from Envigo; Indianapolis, IN are used. Upon arrival, rats are housed 3 per cage in ventilated cages and acclimated for at least 7 days prior to testing. Animals are maintained at a 12/12 h light/dark cycle (lights on at 06.00) with room temperature maintained at 22±1° C. with the relative humidity maintained at approximately 50%. Food and water are provided ad libitum. Animals are randomly assigned across the treatment groups. The experiments are conducted during the animal's light cycle phase.

The bar test is used to assess catalepsy. The front paws of the rats are placed on a horizontal metal bar raised 6" above a Plexiglas platform and time is recorded for up to 60 seconds per trial. The test ends when the animal's front paws returned to the platform or after 60 seconds. The test is repeated three times and the average of the three trials is reported as the intensity index of catalepsy. Rats are brought to the experimental room for at least 1 hr to acclimate to the experimental room conditions prior to testing. Rats are injected vehicle or compound and catalepsy is assessed 30 and 60 min. following haloperidol injection. Data is analyzed by analysis of variance (ANOVA) followed by Dunnett's post-hoc comparisons.

Example 12: Polymorph Screening

Samples were prepared by adding Compound 1 free base to HPLC vials with 200-500 µL of solvent until saturated. Vials were placed in ReactiTherm aluminum blocks with stir bars. Temperature was set as needed for each segment, with continuous stirring at a medium rate. Samples were stirred and equilibrated for ~2 weeks, and those with precipitate were filtered and dried with 0.22 µm centrifuge filters. Collected solid was analyzed via PXRD, and further characterized upon identification of a new form.
Four Techniques were Utilized in this Screen:
  A. Single Solvent Slurry
    Compound 1 free base in neat solvent, kept at constant 25° C. for ~ 2 weeks
  B. Single Solvent Thermal Slurry
    Compound 1 free base in neat solvent, heated to 60° C., held for approximately 1 hour and slow-cooled down to 25° C., kept at constant 25° C. for ~2 weeks
  C. Hydrated Solvent Slurry
    Compound 1 free base in solvent with 3% $H_2O$, kept at constant 25° C. for ~2 weeks
  D. Binary Mixtures Solvent Slurry
    Compound 1 free base in binary solvent mixtures in 80/20 ratios, kept at constant 25° C. for ~2 weeks
Thirteen Solvents were Utilized in this Screen:
  Acetone (ACE)
  Acetonitrile (ACN)
  Dimethyl sulfoxide (DMSO)
  Ethanol (EtOH)
  Isopropyl alcohol (IPA)
  Methanol (MeOH)
  Tetrahydrofuran (THF)
  Water ($H_2O$)
  Chloroform (CHL)
  Dichloromethane (DCM)
  Ethyl Acetate (EA)
  Hexanes (HEX)
  Toluene (TOL)
Salt Forms of Compound 1 were Prepared According to the Following Procedures:
Oxalate Form I
Approximately 20 mg of the free base solid material was weighed into a vial. 400-500 µL of ACN was added and the sample heated to ~60° C. to dissolve the solids. A stoichiometric amount of oxalic acid (via a 2 M solution prepared in water) was added to the vial, and the sample was cooled to room temperature. The solvent was then evaporated and the resulting solids were collected and analyzed. (note: this form also produced with the same procedure, but with Acetone instead of ACN).
Oxalate Form II
Approximately 20 mg of the free base solid material was weighed into a vial. 400-500 µL of EtOH was added and the sample heated to ~60° C. to dissolve the solids. A stoichiometric amount of oxalic acid (via a 2 M solution prepared in water) was added to the vial, and the sample was cooled to room temperature. The solvent was then evaporated and the resulting solids were collected and analyzed.
Oxalate Form III
Approximately 50 mg of the free base solid material was weighed into a vial. 400-500 µL of ACN was added and the sample heated to ~60° C. to dissolve the solids. A stoichiometric amount of oxalic acid (via a 2 M solution prepared in water) was added to the vial, and the sample was cooled to room temperature. The resulting solids were collected and analyzed.
HCl Form I
Approximately 20 mg of the free base solid material was weighed into a vial. 400-500 µL of THF was added and the sample heated to ~50° C. to dissolve the solids. A 3× stoichiometric amount of HCl (via a 2 M solution prepared in water) was added to the vial, and the sample was cooled to room temperature. The solvent was then evaporated and the resulting solids were collected and analyzed.
Equipment Procedures
Powder X-Ray Diffraction (PXRD)
  The PXRD analysis was performed on a Rigaku Powder X-Ray Diffractometer Miniflex Plus Serial Number ZD01936. For analysis, ~1-5 mg of Compound 1 free base was added to a PXRD zero-background sample holder. The powder was pressed down gently with a piece of weigh paper and the sample holder was placed in the sample changer. Run Parameters: Miniflex Counter Detector, Kb Filter, Scan Axis Theta/2-Theta, Mode Continuous, Start (deg) 3.0, Stop (deg) 45.0, Step (deg) 0.020, Speed (deg/min) 1.0, Spin-yes, Voltage (kV) 30, Current (mA) 15. The reported 2θ values may vary by plus or minus 0.2° (i.e., ±0.2°).

It is understood that peak intensities can vary from one diffractogram to another for the same crystalline form based on any number of factors that are known to those skilled in the art, such as, preferred orientation effects, preparation technique, the sample mounting procedure, the instrument employed, sample purity, etc. One skilled in the art would understand that despite the differences in the peak intensities, a particular crystal form can be identified by its characteristic peak(s).

Differential Scanning Calorimetry (DSC) and Thermal Gravimetric Analysis (TGA):

The DSC and TGA analysis were performed on TA Instruments Discovery 2500 calorimeter with serial number: 2500-00547 (DSC) and Discovery 5500 with serial number: 5500-0126 (TGA). For the DSC analysis, obtained and recorded the weight of a Tzero pan and a Tzero lid. ~1-3 mg of Compound 1 free base was weighed into the Tzero Pan and the Tzero lid was pressed on with tweezers. The pan was transferred to the DSC autosampler for analysis. The method for analysis was a ramp at 10° C./min to just under the degradation temperature. The reference pan was prepared with the same procedures, absent of compound 1 free base.

For TGA analysis, a standard aluminum sample pan was placed into the platinum TGA pan and the blank was tared with the instrument. Approximately 1-5 mg of compound 1 free base was added to the standard aluminum pan and analyzed at 10° C./min up to ~400° C., or until fully degraded. For TGA and DSC, the temperature features reported herein may vary by plus or minus 3° C. (i.e., ±3° C.).

Experimental Results

TABLE 2

Results for Compound 1 free base in Neat Solvent, constant 25° C.

| Sample ID | Solvent System | Final PXRD Form |
| --- | --- | --- |
| A1 | Acetone | II |
| A2 | ACN | II |
| A3 | DMSO | II |
| A4 | EtOH | II |
| A5 | IPA | II |
| A6 | MeOH | II |
| A7 | THF | II |
| A8 | $H_2O$ | II* |
| A9 | Chloroform | II |
| A10 | DCM | II |
| A11 | EA | II |
| A12 | Hexanes | II* |
| A13 | Toluene | II |

*Weakly/Partially Crystalline

TABLE 3

Results for Compound 1 free base in Neat Solvent, 60° C. Heat Cycle.

| Sample ID | Solvent System | Final PXRD Form |
| --- | --- | --- |
| B1 | Acetone | II |
| B2 | ACN | II |
| B3 | DMSO | II |
| B4 | EtOH | II |
| B5 | IPA | II |
| B6 | MeOH | II |
| B7 | THF | II* |
| B8 | $H_2O$ | II* |
| B9 | Chloroform | II |
| B10 | DCM | II |
| B11 | EA | II |
| B12 | Hexanes | II |
| B13 | Toluene | II |

*Weakly/Partially Crystalline

TABLE 4

Results for Compound 1 free base in Solvent with 3% $H_2O$, constant 25° C.

| Sample ID | Solvent System | Final PXRD Form |
| --- | --- | --- |
| C1 | 3% $H_2O$ in Acetone | II |
| C2 | 3% $H_2O$ in ACN | II |
| C3 | 3% $H_2O$ in DMSO | II |
| C4 | 3% $H_2O$ in EtOH | II |
| C5 | 3% $H_2O$ in IPA | II |
| C6 | 3% $H_2O$ in MeOH | II |
| C7 | 3% $H_2O$ in THF | II |

*Weakly/Partially Crystalline

TABLE 5

Results for Compound 1 free base in Binary Solvent Mixtures, constant 25° C.

| Sample ID | Solvent System | Final PXRD Form |
| --- | --- | --- |
| D1 | 75/25 $H_2O$/ACN | II* |
| D2 | 50/50 $H_2O$/ACN | II* |
| D3 | 25/75 $H_2O$/ACN | II* |
| D4 | 75/25 $H_2O$/ACE | |
| D5 | 50/50 $H_2O$/ACE | II* |
| D6 | 25/75 $H_2O$/ACE | II* |

*Weakly/Partially Crystalline

TABLE 6

Powder X-Ray Diffraction (PXRD) Representative Peaks of Form I of Compound 1 Free Base.

| Angle 2-Theta (Degree) | Peak Height (cps) |
| --- | --- |
| 6.3 | 26535 |
| 17.2 | 38018 |
| 18.0 | 22407 |
| 18.5 | 18485 |
| 23.4 | 23536 |

TABLE 7

Powder X-Ray Diffraction (PXRD) Representative Peaks of Form II of Compound 1 Free Base.

| Angle 2-Theta (Degree) | Peak Height (cps) |
| --- | --- |
| 10.8 | 15425 |
| 16.0 | 37044 |
| 20.8 | 175363 |
| 21.7 | 23009 |
| 25.1 | 10255 |

TABLE 8

Powder X-Ray Diffraction (PXRD) Representative Peaks of Form I of Compound 1 Oxalate salt.

| Angle 2-Theta (Degree) | Peak Height (cps) |
| --- | --- |
| 3.4 | 1076 |
| 7.7 | 427 |
| 10.0 | 483 |
| 11.8 | 624 |
| 14.0 | 701 |
| 14.9 | 22959 |

TABLE 8-continued

Powder X-Ray Diffraction (PXRD) Representative Peaks of Form I of Compound 1 Oxalate salt.

| Angle 2-Theta (Degree) | Peak Height (cps) |
| --- | --- |
| 15.3 | 3558 |
| 16.0 | 1796 |
| 16.9 | 4821 |
| 18.5 | 6846 |
| 18.8 | 5562 |
| 19.8 | 6300 |
| 20.5 | 3227 |
| 21.1 | 3301 |
| 23.4 | 3261 |
| 24.0 | 2206 |
| 24.5 | 2447 |
| 25.8 | 684 |
| 28.2 | 1119 |
| 30.0 | 1262 |
| 32.3 | 1606 |
| 34.5 | 1470 |
| 36.6 | 284 |
| 37.0 | 888 |
| 38.1 | 4751 |
| 40.9 | 688 |
| 42.4 | 431 |
| 44.1 | 534 |

TABLE 9

Powder X-Ray Diffraction (PXRD) Representative Peaks of Form II of Compound 1 Oxalate salt.

| Angle 2-Theta (Degree) | Peak Height (cps) |
| --- | --- |
| 3.3 | 1191 |
| 14.8 | 5970 |
| 15.2 | 2009 |
| 18.7 | 6186 |
| 23.3 | 10435 |
| 24.4 | 774 |
| 25.7 | 1805 |
| 28.8 | 13636 |
| 29.5 | 2279 |
| 30.3 | 1936 |
| 31.0 | 3721 |
| 34.3 | 1174 |
| 34.9 | 7923 |
| 36.8 | 15476 |
| 37.4 | 6043 |
| 37.9 | 3135 |
| 39.3 | 2090 |
| 39.7 | 4130 |
| 40.4 | 1267 |
| 42.3 | 1315 |

TABLE 10

Powder X-Ray Diffraction (PXRD) Representative Peaks of Form III of Compound 1 Oxalate salt.

| Angle 2-Theta (Degree) | Peak Height (cps) |
| --- | --- |
| 4.9 | 1365 |
| 6.8 | 1124 |
| 7.8 | 640 |
| 8.7 | 3716 |
| 9.7 | 1844 |
| 11.8 | 7484 |
| 13.9 | 2349 |
| 15.7 | 5524 |
| 16.8 | 1438 |
| 17.6 | 2601 |
| 18.1 | 4970 |
| 18.7 | 8167 |
| 19.7 | 5033 |
| 20.2 | 2457 |
| 20.7 | 4069 |
| 22.0 | 5902 |
| 23.7 | 1205 |
| 24.6 | 1590 |
| 25.0 | 774 |
| 26.7 | 2181 |
| 27.6 | 603 |
| 28.8 | 674 |
| 32.5 | 835 |
| 34.8 | 218 |
| 41.7 | 322 |

TABLE 11

Powder X-Ray Diffraction (PXRD) Representative Peaks of Form I of Compound 1 hydrochloride salt.

| Angle 2-Theta (Degree) | Peak Height (cps) |
| --- | --- |
| 3.4 | 748 |
| 7.5 | 5603 |
| 8.5 | 592 |
| 8.9 | 4793 |
| 10.7 | 1246 |
| 11.1 | 1867 |
| 11.7 | 562 |
| 13.4 | 571 |
| 13.9 | 5548 |
| 14.8 | 969 |
| 15.2 | 3143 |
| 15.7 | 2142 |
| 16.2 | 6618 |
| 16.6 | 12670 |
| 17.0 | 852 |
| 17.6 | 3857 |
| 18.3 | 1707 |
| 18.8 | 1549 |
| 19.4 | 11467 |
| 19.8 | 11460 |
| 20.6 | 6913 |
| 22.0 | 3861 |
| 22.2 | 3662 |
| 22.6 | 6157 |
| 22.8 | 7950 |
| 23.0 | 2766 |
| 23.5 | 751 |
| 24.2 | 887 |
| 24.4 | 5321 |
| 24.7 | 1597 |
| 25.0 | 1014 |
| 25.4 | 4891 |
| 25.7 | 8146 |
| 26.2 | 1279 |
| 26.6 | 1279 |
| 27.6 | 2398 |
| 27.9 | 3459 |
| 29.1 | 5230 |
| 29.4 | 1914 |
| 30.6 | 638 |
| 31.4 | 1155 |
| 34.0 | 908 |
| 35.7 | 1144 |
| 36.5 | 1438 |
| 37.1 | 1652 |
| 38.6 | 1598 |

TABLE 11-continued

Powder X-Ray Diffraction (PXRD) Representative Peaks of Form I of Compound 1 hydrochloride salt.

| Angle 2-Theta (Degree) | Peak Height (cps) |
| --- | --- |
| 38.8 | 298 |
| 38.9 | 962 |
| 39.6 | 2923 |
| 41.4 | 628 |
| 42.1 | 623 |
| 42.6 | 528 |
| 43.6 | 963 |
| 44.2 | 739 |
| 44.7 | 503 |

Additional Form Investigation

Thermal analysis suggested that Form I of Compound 1 free base appeared to recrystallize into Form II of compound 1 free base upon heating. A modulated DSC was performed to investigate the thermal events. ~1-3 mg of material was weighed into a Tzero Pan and the Tzero lid was pressed on with tweezers. The pan was transferred to the DSC autosampler for analysis. The method for analysis was a ramp at 3° C./min 240° C., with temperature modulation of 1.0° C. for 60 seconds. The reference pan was prepared with the same procedures, absent of Compound 1 free base. The material obtained was analyzed via PXRD, which appeared to match the diffractogram for Form II of Compound 1 free base.

Example 13: Preparation of 2-(1-benzylpiperidin-4-yl)ethyl (2R,6S)-2,6-dimethyl-4-[5-(trifluoromethyl)pyrazin-2-yl]piperazine-1-carboxylate (Compound 1)

Step 1: Preparation of 2-(cis-3,5-dimethylpiperazin-1-yl)-5-(trifluoromethyl)pyrazine Hydrochloride

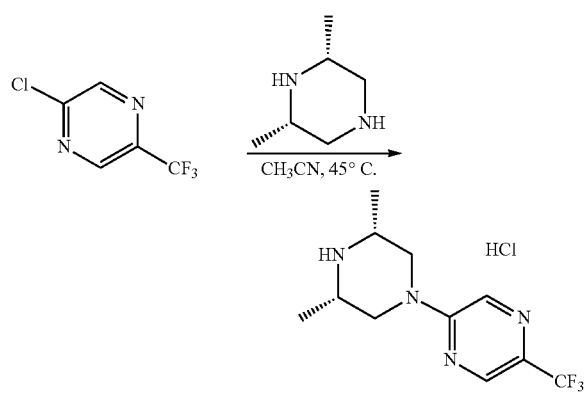

A mixture of cis-2,6-dimethylpiperazine (98.5 g, 863 mmol, 1.05 eq) and 2-chloro-5-(trifluoromethyl)pyrazine (150 g, 822 mmol, 1.0 eq) in acetonitrile (1.0 L) was stirred at 45° C. for 20 h. The mixture was cooled to 20° C. and the solid was collected by filtration. The cake was washed with acetonitrile (300 mL) and the solid was dried in a vacuum at 45° C. to provide 2-((cis-3,5-dimethylpiperazin-1-yl)-5-(trifluoromethyl)pyrazine hydrochloride as a white to off-white solid (217.7 g, 89.4% yield).

Step 2: Preparation of 2-(cis-3,5-dimethylpiperazin-1-yl)-5-(trifluoromethyl)pyrazine

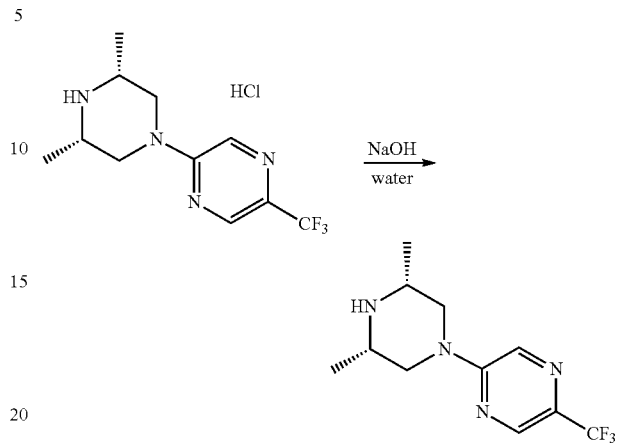

A slurry of 2-(cis-3,5-dimethylpiperazin-1-yl)-5-(trifluoromethyl)pyrazine hydrochloride (100 g, 337 mmol, 1 equiv) in water (500 mL) was heated to 65° C. To this slurry was added 1 M NaOH (500 mL, 500 mmol, 1.5 equiv). The mixture was cooled to 20° C. and the product was collected as a white crystalline solid (76.2 g, 90% yield).

Step 3: 2-(1-benzylpiperidin-4-yl)ethyl cis-2,6-dimethyl-4-(5-(trifluoromethyl)pyrazin-2-yl)piperazine-1-carboxylate

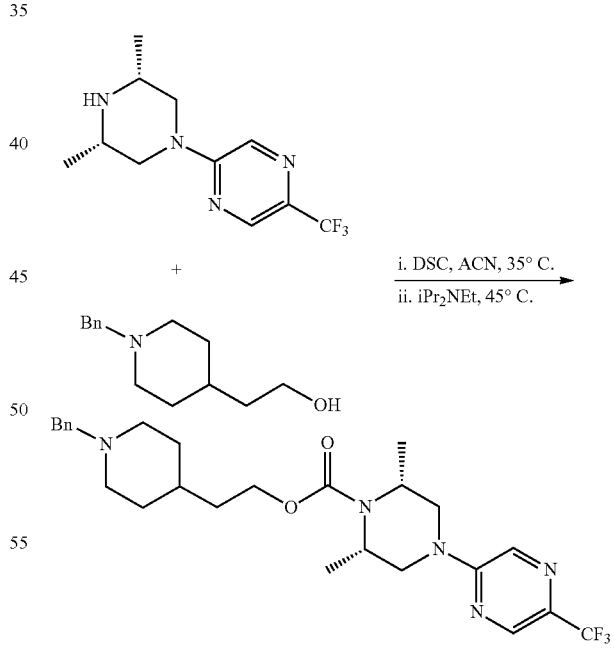

To a solution of 2-(1-benzylpiperidin-4-yl)ethan-1-ol (189.6 g, 864.4 mmol, 1.5 equiv) in acetonitrile (450 mL) was added N,N'-disuccinimidyl carbonate (DSC) (90 wt %, 254.4 g, 894 mmol, 1.55 equiv) and the mixture was heated to 35° C. for 1 h. To this solution was added (cis-3,5-dimethylpiperazin-1-yl)-5-(trifluoromethyl)pyrazine (150 g, 576.3 mmol, 1 equiv) followed by diisopropylethylamine (200 mL, 1.15 mol, 2 equiv) and this slurry was heated to 45° C. for >16 h. The slurry was cooled to 20° C. and the solids isolated by filtration. After drying, 2-(1-benzylpiperidin-4-yl)ethyl (2R,6S)-2,6-dimethyl-4-[5-(trifluoromethyl)pyrazin-2-yl]piperazine-1-carboxylate (Compound 1) was isolated as a crystalline white solid (235.85 g, 81% yield) with a PXRD pattern consistent with Form II.

Example 14: MDCK-MDR1 Assay

Apparent permeability and efflux ratios were generated by Absorption Systems LLP, Exton, PA MDCK cells transfected with human MDR1 (Multidrug resistance protein 1) were grown as monolayers on microporous membranes in 12-well assay plates. Each compound was evaluated at a single concentration equal to 5 µM. The assay buffer consisted of Hanks' balanced salt solution pH 7.4 containing 10 mM HEPES and 15 mM glucose. Test article diluted in assay buffer was dosed to the apical chambers of cell monolayer plates to determine apical to basolateral (A to B) permeability. Basolateral to apical (B to A) permeability was determined by addition of dosing solution to the basolateral chambers. Assay buffer in the receiver chambers were supplemented with 1% bovine serum albumin to alleviate solubility and nonspecific binding issues. Cell monolayers dosed with test article were incubated for 2 hours at 37° C., 5% $CO_2$ in a humidified incubator. Samples were collected from both donor and receiver chambers at 2 hours then prepared for LC-MS/MS analysis using electrospray ionization. Duplicate measurements of A to B and B to A permeability were collected for each compound. Efflux ratio was calculated using the following formula: $P_{app} B>A/P_{app} A>B$. Controls were incorporated to ensure cell monolayer integrity (lucifer yellow) and activity of MDR1 protein (digoxin). The results for Compounds 1, 2, 3A and 4A are presented in Table 12 below.

TABLE 12

| Cpd No | $P_{app} A > B$ ($10^{-6}$ cm/s) | $P_{app} B > A$ ($10^{-6}$ cm/s) | Efflux Ratio |
|---|---|---|---|
| 1 | 15 | 21.3 | 1.42 |
| 2 | 17.5 | 24.1 | 1.38 |
| 3A | 0.53 | 51.2 | 96.6 |
| 4A | 0.55 | 68.6 | 124.7 |

Example 15: Rat Pharmacokinetics

The pharmacokinetics of Compounds 1, 2, 3A, and 4A were assessed in male Sprague-Dawley rats following either intravenously (IV) or orally (PO) dosing. Sin-life portions of the studies were either conducted internally at Neurocrine Biosciences or contracted to Charles River Laboratories or Agilux Laboratories. All studies were performed according to good scientific principles and internal standard operating procedures (SOPs). However, the studies were exploratory in nature and were not conducted in accordance with the United States Food and Drug Administration (FDA) Good Laboratory Guidance (GLP) regulations.

Adult (8-9 weeks old) male rats were acclimated prior to dose administration. For dosing, rats were either dosed intravenously through the femoral vein or orally via oral gavage. Food and water were provided ad libitum during the acclimation period. The rats were maintained in a controlled temperature and humidity environment with a photoperiod with a 12 hour light to dark cycle. Rats were either dosed fed or fasted. In studies where the rats were fasted, rats were allowed access to food four hours post-dose. Results of the rat pharmacokinetic studies are shown in Table 13.

TABLE 13

| | Dosing and Sampling Routes | | | |
|---|---|---|---|---|
| Compounds | Route | Dosing route | Sampling route | Fed or Fasted |
| 3A | IV bolus | Femoral vein | Jugular vein | Fed |
| | PO | Gavage | Jugular vein | Fasted |
| | PO | Gavage | Tail vein | Fasted |
| 4A | IV bolus | Femoral vein | Jugular vein | Fed |
| | PO | Gavage | Jugular vein | Fed |
| | PO | Gavage | Jugular vein | Fasted |
| 1 | IV bolus | Femoral vein | Jugular vein | Fed |
| | IV infusion (1 hr) | Femoral vein | Jugular vein | Fasted |
| | PO | Gavage | Tail vein | Fed |
| | PO | Gavage | Jugular vein | Fasted |
| | PO | Gavage | Jugular vein | Fasted |
| | PO | Gavage | Jugular vein | Fed |
| 2 | IV infusion (1 hr) | Femoral vein | Jugular vein | Fed |
| | PO | Gavage | Tail vein | Fed |

Formulation Preparation

The dosing formulations were prepared one day prior to dosing and stored at room temperature overnight.

IV Formulations

5% Dextrose in Water

Dextrose was prepared in water at a 5% solution (w/v). Solid compound was weighed into an appropriate glass container. Then dextrose solution (5%) was added to yield the final concentration. Formulation was sonicated and vortexed to mix and then stirred at room temperature until dosing.

10% Hydroxy-Propyl-Beta-Cyclodextrin (HPBCD)

A solution of hydroxy-propyl-beta-cyclodextrin (10%) was prepared (w/v). Solid compound was weighed into an appropriate glass container. Then hydroxy-propyl-beta-cyclodextrin solution (10%) was added to yield the final concentration. Formulation was sonicated and vortexed to mix and then stirred at room temperature until dosing.

Oral Formulations

30% Propylene Glycol (PG), 20% PEG-400, 0.5% Methylcellulose in Water

Methyl cellulose was prepared in water at a 0.5% solution (w/v). On day of preparation, solid compound was weighed into an appropriate glass container. Propylene glycol (30% of total volume (v/v)) was added to solid compound. Compound/propylene glycol mix was vortexed/sonicated and stirred to encourage solubilization. Once well mixed, PEG-400 (20% of total volume (v/v)) was added to the compound/propylene glycol mixture. PEG-400/propylene glycol/compound mixture was further vortexed/sonicated and stirred to encourage further solubilization. Once well mixed, solution of methylcellulose (0.5% w/v) was QC'd to final volume. Formulation was sonicated and vortexed to mix and then stirred at room temperature until dosing. The final formulation was a suspension.

5% Tween-80 in 0.5% Methylcellulose in Water

Methyl cellulose was prepared in water at a 0.5% solution (w/v). To the methyl cellulose stock, tween-80 (5% (v/v)) was added to the stock and vortexed to mix. To prepare final formulation, solid compound was weighed into an appropriate glass container. An appropriate volume of the methyl cellulose/tween-80 mixture was added to the contain to yield the final concentration. Formulation was sonicated and vortexed to mix and then stirred at room temperature until dosing. The final formulation was a suspension.

10% PEG-400 in 0.5% Methyl Cellulose (MC) in Water

Methyl cellulose was prepared in water at a 0.5% solution (w/v). To prepare final formulation, solid compound was weighed into an appropriate glass container. PEG-400 (10% of total volume (v/v)) was added to the solid. Compound/PEG-400 mixture was vortexed/sonicated and stirred to encourage solubilization. Once well mixed, an appropriate volume of the methyl cellulose stock was added to the compound/PEG-400 mixture to yield the final concentration. Formulation was sonicated and vortexed to mix and then stirred at room temperature until dosing. The final formulation was either a solution or suspension.

1% Tween-80 in Water

A solution of tween-80 in water (1%) was prepared (v/v). Solid compound was weighed into an appropriate glass container. Then tween-80 solution (1%) was added to yield the final concentration. Formulation was sonicated and stirred at room temperature until dosing. Final formulation was a suspension.

Results of the formulation studies are shown in Table 14.

TABLE 14

Formulation Summary

| Cpd No | Route | Dose (mg/kg) | version | Formulation |
|---|---|---|---|---|
| 3A | IV bolus | 2.5 | HCl salt | 5% dextrose (solution) |
|  | PO | 10 | HCl salt | 30% Propylene Glycol, 20% PEG-400, 0.5% MC in water (solution) |
|  | PO | 10 | HCl salt | 5% Tween-80 in 0.5% (w/v) MC in water (suspension) |
| 4A | IV bolus | 1 | HCl salt | 5% dextrose (solution) |
|  | PO | 10 | HCl salt | 10% PEG-400 in 0.5% MC in water (solution) |
|  | PO | 10 | HCl salt | 5% Tween-80 in 0.5% (w/v) MC in water (suspension) |
| 1 | IV bolus | 1 | HCl salt | 10% HPBCD in water (solution) |
|  | IV infusion (1 hr) | 2 | HCl salt | 10% HPBCD in water (solution) |
|  | PO | 10 | HCl salt | 10% PEG-400 in 0.5% MC in water (suspension) |
|  | PO | 10 | HCl salt | 10% PEG-400 in 0.5% MC in water (solution) |

TABLE 14-continued

Formulation Summary

| Cpd No | Route | Dose (mg/kg) | version | Formulation |
|---|---|---|---|---|
|  | PO | 10 | FB | 1% Tween-80 in water (suspension) |
|  | PO | 10 | HCl salt | 10% PEG-400 in 0.5% MC in water (suspension) |
| 2 | IV infusion (1 hr) | 2 | HCl salt | 5% dextrose (solution) |
|  | PO | 10 | FB | 10% PEG-400 in 0.5% MC in water (solution) |

MC—Methyl cellulose

Dosing

For the IV bolus dose, compound was administered over a period of approximately 30 seconds using a 1 mL syringe via the femoral vein catheter. The IV dose was followed with a bolus of sterile saline (approximately 100 µL). For IV infusion doses, compound was administered using an IV infusion pump to deliver the total dose volume over 1 hour. Rats were connected to the infusion pump through catheter tubing that was connected to the femoral catheter prior to the infusion start. For the oral dose, compound was administered using flexible, polypropylene-shafted, silicone bulb shaped-tipped gavage (Instech Solomon plastic feeding tubes, 18 gauge×75 mm). Animals were periodically observed for eight hours following the dose administration for potential test article related effects.

Sampling

Serial blood samples from IV and PO dosed rats (N=3 or 4) were collected out to 24 hours post-dose. For the time points up to 8 hours post dose, approximately 200 µL of whole blood was drawn from the jugular catheter or from the tail vein with a 1-mL syringe. The whole blood was transferred to a 600 µL Sarstedt collection tube that contained 1.2-2 mg EDTA-K3/mL of anticoagulant, gently mixed, and then centrifuged for 1.0 min at 13,000 rpm. Approximately 100 µL of plasma was aliquoted. Blood for the terminal time points at 24 hours were collected by cardiogenesis with a syringe containing 1.6 mg EDTA-K3/mL of anticoagulant, transferred to an Eppendorf and immediately centrifuged for 1.0 min at 13,000 rpm. Approximately 300 µL of plasma was aliquoted. The aliquoted plasma samples were stored at −80° C. until analysis.

Pharmacokinetic Analysis

For IV and PO dose groups, descriptive pharmacokinetics were derived and evaluated based on the plasma concentrations from each individual rat. Pharmacokinetic parameters were determined using non-compartmental analysis (NCA) of plasma concentration-time profiles in Phoenix WinNonlin pharmacokinetic modeling software Professional (version 6.3; Pharsight Corporation). Nominal time was used for all timepoints unless otherwise indicated. Descriptive statistics (means, standard deviations and coefficient of variation) were also generated. Mean pharmacokinetic summaries of Compounds 1-4 following intravenous and PO dosing in Sprague Dawley rats were summarized in Tables 15 and 16.

TABLE 15

Summary of IV PK Parameters

| Compounds | Route | Dose (mg/kg) | T½ (hr) | Cl (ml/min/kg) | Vdss (L/kg) | AUClast (ng*hr/ml) | AUCinf (ng*hr/ml) |
|---|---|---|---|---|---|---|---|
| 3A | IV bolus | 2.5 | 1.95 | 47.5 | 4.37 | 854 | 882 |
| 4A | IV bolus | 1 | 5.01 | 56.6 | 16.1 | 288 | 204 |
| 1 | IV bolus | 1 | 9.1 | 40.4 | 28.2 | 357 | 415 |
|  | IV infusion (1 hr) | 2 | 10.2 | 15.8 | 12.1 | 1780 | 1683 |
| 2 | IV infusion (1 hr) | 2 | 11 | 44.9 | 36 | 613 | 747 |

TABLE 16

Summary of Oral PK Parameters

| Compounds | Formulation | Dose (mg/kg) | T½ (hr) | Tmax (hr) range | Cmax (ng/ml) | AUClast (ng*hr/ml) | AUCinf (ng*hr/ml) | % F |
|---|---|---|---|---|---|---|---|---|
| 3A | 30% PG, 20% PEG-400, 0.5% MC in water (solution) | 10 | 3.65 | 0.5-2.0 | 247 | 1400 | 1540 | 43.7 |
|  | 5% Tween-80 in 0.5% (w/v) MC in water (suspension) | 10 | 3.21 | 0.5-4 | 205 | 1500 | 1150 | NC |
| 4A | 10% PEG-400 in 0.5% MC in water (solution) | 10 | 4.2 | 0.5-2.0 | 182 | 1700 | 1740 | 59.2 |
|  | 5% Tween-80 in 0.5% (w/v) MC in water (suspension) | 10 | 7.09 | 1.0-8.0 | 231 | 2530 | 3500 | NC |
| 1 | 10% PEG-400 in 0.5% MC (suspension) | 10 | ND | 2.0-7.5 | 164 | 3180 | ND | 89.1 |
|  | 10% PEG-400 in 0.5% MC in water (solution) | 10 | ND | 0.5-1 | 264 | 3150 | ND | NC |
|  | 1% Tween-80 in water (suspension) | 10 | ND | 1.0-1.0 | 280 | 3950 | ND | NC |
|  | 10% PEG-400 in 0.5% MC (suspension) | 10 | ND | 2.0-7.5 | 164 | 3180 | ND | NC |
| 2 | 10% PEG-400 in 0.50% MC in water (solution) | 10 | 12.9 | 2.0-7.5 | 130 | 2190 | 3040 | 81.4 |

ND—Not determined due to poorly defined terminal phase
NC—Not calculated
MC—methylcellulose
PG—propylene glycol Sample Preparation and Analysis Plasma samples of compounds 1, 2, 3A, and 4A were prepared by protein precipitation. Calibration standards and quality control plasma samples were prepared from the same lot of reference standard to quantify the concentration of the study samples. An aliquot (50 μL) of sample (calibration standards, quality control samples, blanks, and plasma study samples was added to a 96-well plate. Samples were appropriately diluted to within the calibration range. Internal standard spiking solution (200 μL) was added to each well. Samples were vortexed and centrifuged for approximately 30 minutes at 3500-4000 rpm. Supernatant (50 μL) was transferred to a new plate and water (200 μL) was added to each well. The plate was vortex-mixed and stored refrigerated until analysis. Analytes and internal standards were chromatographically separated by a Shimadzu Nexera UHPLC system and detected using an Applied Biosystems Sciex API5000 or API5500 triple quadrupole mass spectrometer as shown in Table 13. The LC parameters are shown in Table 14. Internal standard (propranolol) was closely eluted with the four analytes. The mass spectrometer was equipped with an electrospray ionization source operated in the positive-ion mode. The analyte and internal standards were monitored in the multiple-reaction-monitoring scan mode as indicated in Table 17.

TABLE 17

LCMS systems

| Compounds | LC system | LC column | MS system |
|---|---|---|---|
| 3A | Shimadzu Nexera UHPLC system | Phenomenex Kinetex C18, 2.6 µm, 2.1 × 50 mm | Sciex 5000 Triple Quadrupole |
| 1, 2, and 4A | | Acquity BEH C18 1.7 µm, 2.1 × 50 mm | Sciex 5500 Triple Quadrupole |

TABLE 18

LC Parameters

| Compounds | | | |
|---|---|---|---|
| | Mobile phase A | 0.1% formic acid in water | |
| | Mobile phase B | 0.1% formic acid in acetonitrile | |
| | Flow rate | 0.6 mL/min | |
| | Column temperature | 40° C. | |

| | Time | Mobile Phase B % |
|---|---|---|
| 3A | 0.10 | 20 |
| | 0.50 | 20 |
| | 1.80 | 95 |
| | 2.00 | 95 |
| | 3.00 | 95 |
| | 3.10 | 20 |
| | 3.50 | 20 |
| 1, 2, and 4A | 0.10 | 2 |
| | 0.50 | 2 |
| | 2.00 | 95 |
| | 2.50 | 95 |
| | 2.60 | 2 |
| | 3.10 | 2 |

TABLE 19

MS Parameters

| Compounds | Analyte Compound | ESI Voltage | Q1 (m/z) | Q3 (m/z) | DP | CE |
|---|---|---|---|---|---|---|
| 3A | 3A | 5500 | 462.3 | 245.2 | 60 | 45 |
| | Propranolol | 5500 | 260.2 | 116.1 | 75 | 35 |
| 4A | 4A | 5000 | 505.2 | 245.3 | 150 | 55 |
| | Propranolol | 5000 | 260.2 | 116.1 | 75 | 35 |

TABLE 19-continued

MS Parameters

| Compounds | Analyte Compound | ESI Voltage | Q1 (m/z) | Q3 (m/z) | DP | CE |
|---|---|---|---|---|---|---|
| 1 | 1 | 5000 | 506.2 | 202.1 | 150 | 41 |
| | Propranolol | 5000 | 260.2 | 116.1 | 75 | 35 |
| 2 | 2 | 5500 | 506.2 | 91.0 | 150 | 80 |
| | Propranolol | 5000 | 260.2 | 116.1 | 75 | 35 |

Various modifications of the embodiments, in addition to those described herein, will be apparent to those skilled in the art from the foregoing description. Such modifications are also intended to fall within the scope of the appended claims. Each reference, including all patent, patent applications, and publications, cited in the present application is incorporated herein by reference in its entirety.

What is claimed is:

1. A crystalline Form I of 2-(1-benzylpiperidin-4-yl)ethyl (2R,6S)-2,6-dimethyl-4-[5-(trifluoromethyl) pyrazin-2-yl] piperazine-1-carboxylate; having a Powder X-Ray Diffraction (PXRD) diffractogram with one or more peaks at two-theta angle selected from 6.3±0.2, 17.2±0.2, 18.0±0.2, 18.5±0.2, and 23.4±0.2 degrees; or having a Powder X-Ray Diffraction (PXRD) diffractogram with peaks at two-theta angle of 6.3=0.2, 17.2±0.2, 18.0±0.2, 18.5±0.2, and 23.4±0.2 degrees; and having a differential scanning calorimetry (DSC) thermogram comprising two peaks, one peak with an onset temperature of 91.6±3° C. and a second peak with an onset temperature of 116.0±3° C.; and having a thermal gravimetric analysis (TGA) thermogram with a weight loss of less than 1% up to about 120° C.

2. A crystalline Form II of 2-(1-benzylpiperidin-4-yl)ethyl (2R,6S)-2,6-dimethyl-4-[5-(trifluoromethyl) pyrazin-2-yl] piperazine-1-carboxylate; having a Powder X-Ray Diffraction (PXRD) diffractogram with one or more peaks at two-theta angle selected from 10.8±0.2, 16.0±0.2, 20.8±0.2, 21.7±0.2, and 25.1±0.2 degrees; or having a Powder X-Ray Diffraction (PXRD) diffractogram with peaks at two-theta angle of 10.8=0.2, 16.0±0.2, 20.8±0.2, 21.7±0.2, and 25.1±0.2 degrees; and having a differential scanning calorimetry (DSC) thermogram comprising one peak with an onset temperature of 115.1±3° C. and substantially free of a peak with an onset temperature of 91.6±3° C.; and having a thermal gravimetric analysis (TGA) thermogram with a weight loss of less than 0.1% up to about 135° C.

\* \* \* \* \*